United States Patent
Swahn et al.

(10) Patent No.: US 9,641,123 B2
(45) Date of Patent: May 2, 2017

(54) SYSTEMS FOR MOUNTING PHOTOVOLTAIC MODULES

(75) Inventors: Anders Swahn, Tiburon, CA (US); Neil Morris, Livermore, CA (US); Kevin Hennessy, Walnut Creek, CA (US); Thomas Peter Hunt, Oakland, CA (US); Paul Adriani, Palo Alto, CA (US)

(73) Assignee: Alion Energy, Inc., Richmond, CA (US)

(*) Notice: Subject to any disclaimer, the term of this patent is extended or adjusted under 35 U.S.C. 154(b) by 0 days.

(21) Appl. No.: 13/421,740

(22) Filed: Mar. 15, 2012

(65) Prior Publication Data
US 2013/0068275 A1 Mar. 21, 2013

Related U.S. Application Data

(60) Provisional application No. 61/454,125, filed on Mar. 18, 2011.

(51) Int. Cl.
*H02S 20/30* (2014.01)
*F24J 2/52* (2006.01)
(Continued)

(52) U.S. Cl.
CPC ............ *H02S 20/30* (2014.12); *F24J 2/5237* (2013.01); *F24J 2/5254* (2013.01); *H02S 20/00* (2013.01);
(Continued)

(58) Field of Classification Search
CPC .... H01L 31/0422; F24J 2/5254; F24J 2/5237; F24J 2/541; F24J 2/5252;
(Continued)

(56) References Cited

U.S. PATENT DOCUMENTS

| | | |
|---|---|---|
| 3,267,824 A | 8/1966 | Hudis |
| 3,334,217 A | 8/1967 | Bickler et al. |
| | (Continued) | |

FOREIGN PATENT DOCUMENTS

| | | |
|---|---|---|
| CN | 101858659 | 10/2010 |
| CN | 202019322 | 10/2011 |
| | (Continued) | |

OTHER PUBLICATIONS

Patent Cooperation Treaty, International Search Report for corresponding application PCT/US2012/029345, mailed Oct. 10, 2012.
(Continued)

*Primary Examiner* — Brent W Herring
(74) *Attorney, Agent, or Firm* — Jones Day

(57) ABSTRACT

System and method for mounting one or more photovoltaic modules includes one or more flexible rods, including a first end and a second end opposite the first end, each of the one or more flexible rods further including an inner core and a first jacket surrounding the inner core between the first end and the second end. The first end is configured to be attached to at least one photovoltaic module using one or more first adhesive materials. The second end is configured to be inserted into at least one hole of a modular rail and attached to at least the modular rail using one or more second adhesive materials. The one or more flexible rods are configured to allow at least a lateral movement in a first direction between the photovoltaic module and the modular rail and support at least the photovoltaic module in a second direction.

3 Claims, 30 Drawing Sheets

(51) Int. Cl.
   *H02S 20/00* (2014.01)
   *F24J 2/46* (2006.01)
   *F24J 2/54* (2006.01)

(52) U.S. Cl.
   CPC .. *F24J 2002/467* (2013.01); *F24J 2002/4676* (2013.01); *F24J 2002/4687* (2013.01); *F24J 2002/4692* (2013.01); *F24J 2002/5277* (2013.01); *F24J 2002/5281* (2013.01); *F24J 2002/5489* (2013.01); *Y02E 10/47* (2013.01); *Y02E 10/50* (2013.01); *Y10T 29/49959* (2015.01); *Y10T 29/49966* (2015.01)

(58) Field of Classification Search
   CPC ......... F24J 2002/5281; F24J 2002/4676; F24J 2002/5277; F24J 2002/5486; F24J 2002/4687; F24J 2002/4681; F24J 2002/467; F24J 2002/4692; F24J 2002/5489; Y02E 10/47; Y02E 10/50; H02S 20/30; H02S 20/00; Y10T 29/49959; Y10T 29/49966
   USPC ..... 52/173.3; 136/244; 248/125.9, 130, 133, 248/143, 371, 185.1
   See application file for complete search history.

(56) References Cited

U.S. PATENT DOCUMENTS

| | | | | |
|---|---|---|---|---|
| 3,516,340 | A | 6/1970 | Perkins | |
| 3,540,360 | A | 11/1970 | Snow et al. | |
| 3,951,506 | A | 4/1976 | Bennett et al. | |
| 4,145,021 | A * | 3/1979 | Gaechter et al. | 248/371 |
| 4,219,926 | A | 9/1980 | Bloch et al. | |
| 4,279,347 | A | 7/1981 | Appleman et al. | |
| 4,290,416 | A * | 9/1981 | Maloney | 126/618 |
| 4,296,270 | A | 10/1981 | Kohler et al. | |
| 4,301,322 | A | 11/1981 | Amick et al. | |
| 4,301,409 | A | 11/1981 | Miller et al. | |
| 4,371,139 | A * | 2/1983 | Clark | 248/237 |
| 4,421,943 | A * | 12/1983 | Withjack | 136/246 |
| 4,422,614 | A | 12/1983 | Santos | |
| 4,496,063 | A | 1/1985 | Ishii et al. | |
| 4,664,270 | A | 5/1987 | Voelz | |
| 4,667,834 | A | 5/1987 | Lanigan et al. | |
| 4,676,713 | A | 6/1987 | Voelpel | |
| 4,706,825 | A | 11/1987 | Johnson | |
| 4,876,143 | A | 10/1989 | Sugita et al. | |
| 4,877,365 | A | 10/1989 | Lanigan, Jr. et al. | |
| 4,880,346 | A | 11/1989 | Brassette et al. | |
| 4,995,377 | A * | 2/1991 | Eiden | 126/605 |
| 5,125,608 | A | 6/1992 | McMaster et al. | |
| 5,143,556 | A * | 9/1992 | Matlin | 136/244 |
| 5,152,109 | A * | 10/1992 | Boers | 52/143 |
| D335,541 | S * | 5/1993 | Rosario-Cartagena | D25/56 |
| 5,228,924 | A * | 7/1993 | Barker et al. | 136/246 |
| 5,232,519 | A | 8/1993 | Glatfelter et al. | |
| 5,257,891 | A | 11/1993 | Baumann et al. | |
| 5,361,704 | A | 11/1994 | Bounds | |
| 5,460,660 | A | 10/1995 | Albright et al. | |
| 5,501,744 | A | 3/1996 | Albright et al. | |
| 5,505,788 | A | 4/1996 | Dinwoodie | |
| 5,568,713 | A | 10/1996 | Gagne et al. | |
| 5,593,901 | A | 1/1997 | Oswald et al. | |
| 5,715,958 | A | 2/1998 | Feider et al. | |
| 5,800,631 | A | 9/1998 | Yamada et al. | |
| 5,816,769 | A | 10/1998 | Bauer et al. | |
| 5,826,734 | A | 10/1998 | Baumann et al. | |
| 6,037,578 | A | 3/2000 | Grandjean et al. | |
| 6,046,399 | A * | 4/2000 | Kapner | F24J 2/045 136/244 |
| 6,058,930 | A * | 5/2000 | Shingleton | 126/600 |
| 6,111,189 | A | 8/2000 | Garvison et al. | |
| 6,201,181 | B1 * | 3/2001 | Azzam et al. | 136/244 |
| 6,233,502 | B1 | 5/2001 | Yim | |
| 6,495,750 | B1 | 12/2002 | Dinwoodie | |
| 6,590,363 | B2 * | 7/2003 | Teramoto | F03D 1/04 290/55 |
| 6,639,421 | B1 | 10/2003 | Yoshino et al. | |
| 6,722,357 | B2 * | 4/2004 | Shingleton | F24J 2/5232 126/600 |
| 6,730,841 | B2 | 5/2004 | Heckeroth | |
| 6,809,251 | B2 * | 10/2004 | Dinwoodie | 136/251 |
| 7,086,675 | B2 | 8/2006 | Jacobs | |
| 7,252,083 | B2 * | 8/2007 | Hayden | 126/600 |
| 7,309,850 | B2 | 12/2007 | Sinton et al. | |
| 7,374,137 | B2 * | 5/2008 | Staney | 248/122.1 |
| 7,411,408 | B2 | 8/2008 | Shimotomai et al. | |
| 7,476,832 | B2 * | 1/2009 | Vendig et al. | 250/203.4 |
| 7,492,120 | B2 * | 2/2009 | Benn et al. | 320/101 |
| 7,531,741 | B1 * | 5/2009 | Melton et al. | 136/246 |
| 7,546,929 | B2 | 6/2009 | Wierzba et al. | |
| 7,712,807 | B2 | 5/2010 | Perlman et al. | |
| 7,799,987 | B1 | 9/2010 | Hines | |
| 7,814,899 | B1 | 10/2010 | Port | |
| 7,888,588 | B2 * | 2/2011 | Shingleton | 136/246 |
| 7,898,212 | B2 * | 3/2011 | Benn et al. | 320/101 |
| 7,963,578 | B2 | 6/2011 | Wells et al. | |
| 8,006,624 | B2 | 8/2011 | Sin | |
| 8,203,237 | B1 * | 6/2012 | Cowles | 307/150 |
| 8,245,459 | B2 * | 8/2012 | Belikoff | F24J 2/5205 126/623 |
| 8,371,076 | B2 * | 2/2013 | Jones et al. | 52/173.3 |
| 8,407,950 | B2 * | 4/2013 | Hartelius | 52/173.3 |
| 8,464,496 | B2 * | 6/2013 | Cusson et al. | 52/745.06 |
| 8,492,645 | B1 * | 7/2013 | Strahm | 136/244 |
| 8,500,918 | B1 | 8/2013 | Meller et al. | |
| 8,550,419 | B2 * | 10/2013 | Hausner et al. | 248/370 |
| 8,573,545 | B2 * | 11/2013 | Walquist et al. | 248/122.1 |
| 8,578,928 | B2 * | 11/2013 | Clavijo Lumbreras | 126/600 |
| 8,607,512 | B2 * | 12/2013 | Batut | E04H 6/025 126/621 |
| 8,609,977 | B2 * | 12/2013 | Jones et al. | 136/246 |
| 8,635,818 | B2 * | 1/2014 | Wildes | 52/173.3 |
| 8,657,991 | B2 | 2/2014 | Potter et al. | |
| 8,752,343 | B2 * | 6/2014 | Kuan et al. | 52/173.3 |
| 8,962,972 | B2 * | 2/2015 | Sagayama | H02S 20/00 136/244 |
| 9,192,966 | B2 | 11/2015 | Zanatta | |
| 9,355,873 | B2 | 5/2016 | Eitelhuber | |
| 9,453,660 | B2 | 9/2016 | French et al. | |
| 9,462,734 | B2 | 10/2016 | Swahn et al. | |
| 2003/0075211 | A1 | 4/2003 | Makita et al. | |
| 2004/0250491 | A1 * | 12/2004 | Diaz | F24J 2/5237 52/518 |
| 2005/0061360 | A1 | 3/2005 | Horioka et al. | |
| 2005/0268959 | A1 | 12/2005 | Aschenbrenner et al. | |
| 2006/0054162 | A1 * | 3/2006 | Romeo | 126/600 |
| 2006/0174931 | A1 | 8/2006 | Mapes et al. | |
| 2006/0290344 | A1 | 12/2006 | Shimotomai et al. | |
| 2007/0012352 | A1 | 1/2007 | Wohlgemuth et al. | |
| 2007/0215145 | A1 * | 9/2007 | Hayden | 126/704 |
| 2007/0283996 | A1 | 12/2007 | Hachtmann et al. | |
| 2008/0010915 | A1 | 1/2008 | Liebendorfer | |
| 2008/0023069 | A1 | 1/2008 | Terada et al. | |
| 2008/0040990 | A1 * | 2/2008 | Vendig | F24J 2/405 52/173.3 |
| 2008/0053517 | A1 | 3/2008 | Plaisted et al. | |
| 2008/0087320 | A1 | 4/2008 | Mapes et al. | |
| 2008/0099063 | A1 | 5/2008 | Armstrong et al. | |
| 2008/0121273 | A1 * | 5/2008 | Plaisted et al. | 136/251 |
| 2008/0135084 | A1 | 6/2008 | Scharlack | |
| 2008/0156365 | A1 | 7/2008 | Scholz et al. | |
| 2008/0233429 | A1 | 9/2008 | Oguma et al. | |
| 2008/0271774 | A1 | 11/2008 | Kalkanoglu et al. | |
| 2008/0306700 | A1 | 12/2008 | Kawam et al. | |
| 2009/0014057 | A1 | 1/2009 | Croft et al. | |
| 2009/0032100 | A1 | 2/2009 | Oak | |
| 2009/0114261 | A1 | 5/2009 | Stancel et al. | |
| 2009/0139557 | A1 | 6/2009 | Rose et al. | |
| 2009/0173831 | A1 | 7/2009 | Roseman | |
| 2009/0191030 | A1 | 7/2009 | Bluck et al. | |
| 2009/0205270 | A1 | 8/2009 | Shaw et al. | |
| 2009/0223142 | A1 * | 9/2009 | Shingleton et al. | 52/71 |

(56) References Cited

U.S. PATENT DOCUMENTS

| | | | |
|---|---|---|---|
| 2009/0260671 A1 | 10/2009 | Green et al. | |
| 2009/0282755 A1 | 11/2009 | Abbott et al. | |
| 2009/0293932 A1 | 12/2009 | Augenbraun et al. | |
| 2009/0293941 A1 | 12/2009 | Luch | |
| 2009/0308430 A1 | 12/2009 | Everett et al. | |
| 2010/0031996 A1 | 2/2010 | Basol | |
| 2010/0043781 A1 | 2/2010 | Jones et al. | |
| 2010/0108118 A1 | 5/2010 | Luch | |
| 2010/0127142 A1* | 5/2010 | Genschorek | 248/222.14 |
| 2010/0147286 A1* | 6/2010 | Xiang et al. | 126/600 |
| 2010/0175337 A1* | 7/2010 | Mascolo et al. | 52/173.3 |
| 2010/0175738 A1 | 7/2010 | Huss et al. | |
| 2010/0206294 A1 | 8/2010 | Blair et al. | |
| 2010/0236183 A1 | 9/2010 | Cusson et al. | |
| 2010/0252092 A1 | 10/2010 | Lenox et al. | |
| 2010/0269429 A1* | 10/2010 | Belikoff | F24J 2/5205 52/173.3 |
| 2010/0269888 A1 | 10/2010 | Johnston, Jr. | |
| 2010/0269891 A1 | 10/2010 | Kinard et al. | |
| 2010/0275975 A1* | 11/2010 | Monschke et al. | 136/251 |
| 2010/0281791 A1* | 11/2010 | Intagliata et al. | 52/127.12 |
| 2010/0319277 A1* | 12/2010 | Suarez et al. | 52/173.3 |
| 2010/0325797 A1* | 12/2010 | Horne | 5/611 |
| 2011/0126378 A1 | 6/2011 | Ota | |
| 2011/0126884 A1 | 6/2011 | Dritsas | |
| 2011/0162691 A1* | 7/2011 | Hartelius | 136/246 |
| 2011/0173900 A1* | 7/2011 | Plaisted et al. | 52/97 |
| 2011/0183540 A1 | 7/2011 | Keenihan et al. | |
| 2011/0194900 A1* | 8/2011 | French, Sr. | 405/229 |
| 2011/0264306 A1 | 10/2011 | Bagge | |
| 2011/0284057 A1 | 11/2011 | Swahn et al. | |
| 2011/0309215 A1 | 12/2011 | Lu et al. | |
| 2012/0027550 A1 | 2/2012 | Bellacicco et al. | |
| 2012/0034799 A1 | 2/2012 | Hunt | |
| 2012/0037214 A1 | 2/2012 | Sagayama | |
| 2012/0056638 A1 | 3/2012 | Swahn | |
| 2012/0067738 A1 | 3/2012 | Field | |
| 2012/0090176 A1 | 4/2012 | Stancel et al. | |
| 2012/0131866 A1* | 5/2012 | Batut et al. | 52/173.3 |
| 2012/0132246 A1 | 5/2012 | Hunt et al. | |
| 2012/0132262 A1* | 5/2012 | Sagayama | H02S 20/00 136/251 |
| 2012/0152233 A1 | 6/2012 | Masuda et al. | |
| 2012/0198682 A1 | 8/2012 | Potter et al. | |
| 2012/0198779 A1* | 8/2012 | Tachino | 52/173.3 |
| 2012/0199266 A1 | 8/2012 | Potter et al. | |
| 2012/0223033 A1* | 9/2012 | Molek | F16B 7/18 211/41.1 |
| 2012/0298201 A1 | 11/2012 | Stephan | |
| 2013/0133172 A1 | 5/2013 | Kiener et al. | |
| 2013/0139869 A1 | 6/2013 | Nuernberger et al. | |
| 2013/0180568 A1* | 7/2013 | Hartelius | 136/246 |
| 2013/0206206 A1* | 8/2013 | Bjorneklett et al. | 136/246 |
| 2013/0248478 A1 | 9/2013 | Wheeler et al. | |
| 2013/0263914 A1 | 10/2013 | Crimmins et al. | |
| 2013/0305518 A1 | 11/2013 | Adriani et al. | |
| 2013/0319962 A1* | 12/2013 | Park et al. | 211/41.1 |
| 2013/0340807 A1* | 12/2013 | Gerwing | H01L 31/02 136/246 |
| 2014/0033511 A1 | 2/2014 | Swahn et al. | |
| 2014/0069483 A1* | 3/2014 | Wolter et al. | 136/246 |
| 2015/0069001 A1 | 3/2015 | French et al. | |
| 2015/0144156 A1 | 5/2015 | French et al. | |
| 2015/0200619 A1* | 7/2015 | Worden | H02S 20/10 136/251 |
| 2015/0316639 A1* | 11/2015 | Russ | F24J 2/541 250/203.4 |
| 2015/0330040 A1* | 11/2015 | Dobbs | E01F 9/016 404/6 |
| 2016/0044843 A1 | 2/2016 | Swahn et al. | |

FOREIGN PATENT DOCUMENTS

| | | | |
|---|---|---|---|
| CN | 203055930 U * | 7/2013 | Y02E 10/50 |
| DE | 102009049926 | 4/2011 | |
| EA | 200970984 | 6/2010 | |
| EP | 2505934 | 10/2012 | |
| FR | 2959555 | 11/2011 | |
| WO | WO 2006/117551 | 9/2006 | |
| WO | WO 2006/117551 | 11/2006 | |
| WO | WO 2010/054274 | 5/2010 | |
| WO | WO 2010/136468 | 12/2010 | |
| WO | WO 2010/145844 | 12/2010 | |
| WO | WO 2012/003585 | 1/2012 | |
| WO | WO 2012/107671 | 8/2012 | |

OTHER PUBLICATIONS

Patent Cooperation Treaty, Written Opinion of the International Searching Authority for corresponding application PCT/US2012/029345, mailed Oct. 10, 2012.
Patent Cooperation Treaty, International Search Report for PCT/US11/027700 mailed May 3, 2011 (2 pages).
Patent Cooperation Treaty, Written Opinion of the International Searching Authority for PCT/US11/027700 mailed May 3, 2011 (4 pages).
Patent Cooperation Treaty, International Search Report for PCT/US11/033722 mailed Jul. 28, 2011 (2 pages).
Patent Cooperation Treaty, Written Opinion of the International Searching Authority for PCT/US11/033722 mailed Jul. 28, 2011 (9 pages).
Patent Cooperation Treaty, International Search Report for PCT/US11/038094 mailed Sep. 2, 2011 (2 pages).
Patent Cooperation Treaty, Written Opinion of the International Searching Authority for PCT/US11/038094 mailed Sep. 2, 2011 (12 pages).
Patent Cooperation Treaty, International Search Report for PCT/US11/046175 mailed Dec. 9, 2011 (2 pages).
Patent Cooperation Treaty, Written Opinion of the International Searching Authority for PCT/US11/046175 mailed Dec. 9, 2011 (8 pages).
Patent Cooperation Treaty, International Search Report for PCT/US12/029345 mailed Oct. 10, 2012 (4 pages).
Patent Cooperation Treaty, International Search Report for PCT/US13/30416 mailed Jun. 17, 2013 (2 pages).
Patent Cooperation Treaty, Written Opinion of the International Searching Authority for PCT/US13/30416 mailed Jun. 17, 2013 (6 pages).
Patent Cooperation Treaty, International Search Report for PCT/US13/40500 mailed Sep. 4, 2013 (2 pages).
Patent Cooperation Treaty, Written Opinion of the International Searching Authority for PCT/US13/40500 mailed Sep. 4, 2013 (9 pages).
United States Patent and Trademark Office, Non final office action dated Nov. 8, 2012 for U.S. Appl. No. 13/043,286 (14 pages).
United States Patent and Trademark Office, Non final office action dated Jan. 10, 2014 for U.S. Appl. No. 13/091,960 (21 pages).
United States Patent and Trademark Office, Non final office action dated Sep. 6, 2013 for U.S. Appl. No. 13/195,562 (15 pages).
United States Patent and Trademark Office, Non final office action dated Mar. 24, 2014 for U.S. Appl. No. 13/195,562 (24 pages).
United States Patent and Trademark Office, Final office action dated Oct. 7, 2014 for U.S. Appl. No. 13/195,562 (17 pages).
United States Patent and Trademark Office, Non final office action dated Sep. 24, 2014 for U.S. Appl. No. 13/421,740 (15 pages).
United States Patent and Trademark Office, Non final office action dated Nov. 19, 2014 for U.S. Appl. No. 13/091,960 (26 pages).
Patent Cooperation Treaty, International Search Report for PCT/US14/54916 mailed Dec. 24, 2014 (2 pages).
Patent Cooperation Treaty, International Search Report for PCT/US14/53787 mailed Jan. 12, 2015 (2 pages).
Patent Cooperation Treaty, Written Opinion of the International Searching Authority for PCT/US14/54916 mailed Dec. 24, 2014 (9 pages).

(56) References Cited

OTHER PUBLICATIONS

Patent Cooperation Treaty, Written Opinion of the International Searching Authority for PCT/US14/53787 mailed Jan. 12, 2015 (7 pages).
Chinese Patent Office, First Office Action for CN 201280023942.0, mailed Mar. 20, 2015.
European Patent Office, Extended European Search Report for EP 12760313.2-1605 mailed Mar. 25, 2015 (6 pages).
United States Patent and Trademark Office, Final office action dated Aug. 26, 2015 for U.S. Appl. No. 13/091,960 (24 pages).
United States Patent and Trademark Office, Non final office action dated May 7, 2015 for U.S. Appl. No. 13/195,562 (17 pages).
United States Patent and Trademark Office, Non final office action dated Mar. 25, 2015 for U.S. Appl. No. 13/794,217 (16 pages).
Chinese Patent Office, First Office Action for CN 201380035248.5, mailed Oct. 20, 2015, with English Translation.
United States Patent and Trademark Office, Non-final office action dated Jan. 12, 2016 for U.S. Appl. No. 13/091,960 (22 pages).
United States Patent and Trademark Office, Notice of allowance dated Nov. 23, 2015 for U.S. Appl. No. 13/195,562 (17 pages).
United States Patent and Trademark Office, Notice of Allowance dated Nov. 3, 2015 for U.S. Appl. No. 13/794,217 (5 pages).
United States Patent and Trademark Office, Non final office action dated Dec. 7, 2015 for U.S. Appl. No. 14/481,678 (7 pages).
United States Patent and Trademark Office, Non final office action dated Dec. 31, 2015 for U.S. Appl. No. 14/050,237 (7 pages).
Chinese Patent Office, Second Office Action for CN 201280023942.0, mailed Feb. 14, 2016, with English translation.
Australian Patent Office, Patent Examination Report No. 1 for Application 2013263123, mailed Jun. 30, 2016 (4 pages).
Kazakhstan Patent Office, Official Action for Application 2014/2546.1, date stamped Jul. 22, 2016.
Patent Office of the Cooperation Counsel of The Arab States of The Gulf, Examination Report for GC 2012-22216, mailed Mar. 7, 2016 (5 pages).
Patent Cooperation Treaty, International Search Report for PCT/US2016/032459 mailed Sep. 8, 2016 (4 pages).
Patent Cooperation Treaty, Written Opinion of the International Searching Authority for PCT/US2016/032459 mailed Sep. 8, 2016 (7 pages).
Patent Cooperation Treaty, International Search Report for PCT/US2016/032464 mailed Oct. 4, 2016 (4 pages).
Patent Cooperation Treaty, Written Opinion of the International Searching Authority for PCT/US2016/032464 mailed Oct. 4, 2016 (7 pages).
United States Patent and Trademark Office, Notice of Allowance dated Mar. 1, 2016 for U.S. Appl. No. 13/195,562 (15 pages).
United States Patent and Trademark Office, Notice of Allowance dated Mar. 28, 2016 for U.S. Appl. No. 13/794,217 (6 pages).
United States Patent and Trademark Office, Office Action dated Jun. 28, 2016 for U.S. Appl. No. 14/050,237 (13 pages).
United States Patent and Trademark Office, Office Action dated Jul. 12, 2016 for U.S. Appl. No. 13/892,140 (12 pages).
United States Patent and Trademark Office, Notice of Allowance dated Jun. 14, 2016 for U.S. Appl. No. 13/091,960 (9 pages).
United States Patent and Trademark Office, Notice of Allowance dated Jun. 7, 2016 for U.S. Appl. No. 14/481,678 (5 pages).
Youtube, "Soluzioni per lavaggio e pulizia fotovoltaico/Solar panel cleaning solutions/Lavaggio pannelli," 3:22 minute video uploaded to *YouTube* by Wash Panel, published on May 3, 2013, https://www.youtube.com/watch?v=b6duSZH1C9o , 7 pages (screen shots obtained on Aug. 11, 2016).

\* cited by examiner

SYSTEMS FOR MOUNTING PHOTOVOLTAIC MODULES

1. CROSS-REFERENCES TO RELATED APPLICATIONS

This application claims priority to U.S. Provisional Application No. 61/454,125, filed Mar. 18, 2011, commonly assigned, incorporated by reference herein for all purposes.

Additionally, this application is related to U.S. patent application Ser. No. 13/091,960, commonly assigned, incorporated by reference herein for all purposes.

2. BACKGROUND OF THE INVENTION

The present invention is directed to photovoltaic systems. More particularly, the invention provides systems and methods for mounting photovoltaic modules. Merely by way of example, the invention has been applied to the mounting of photovoltaic modules onto concrete rails. But it would be recognized that the invention has a much broader range of applicability.

Photovoltaics convert sunlight into electricity, providing a desirable source of clean energy. A conventional photovoltaic (PV) module includes a semiconductor layer divided up into a series of interconnected light-sensitive cells. In order to increase the amount of sun light that is converted into electricity, a photovoltaic module needs to be correctly oriented relative to the sun. For example, the orientation will vary depending upon the location of the PV module (e.g., its latitude and longitude). In another example, a mounting system is utilized to provide the orientation of the PV module.

Hence, it is highly desirable to improve techniques for the mounting of PV modules.

3. BRIEF SUMMARY OF THE INVENTION

The present invention is directed to photovoltaic systems. More particularly, the invention provides systems and methods for mounting photovoltaic modules. Merely by way of example, the invention has been applied to the mounting of photovoltaic modules onto concrete rails. But it would be recognized that the invention has a much broader range of applicability.

According to one embodiment, a system for mounting one or more photovoltaic modules includes one or more flexible rods, each of the one or more flexible rods including a first end and a second end opposite the first end, each of the one or more flexible rods further including an inner core and a first jacket surrounding the inner core between the first end and the second end. The first end is configured to be attached to at least one photovoltaic module using one or more first adhesive materials. The second end is configured to be inserted into at least one hole of a modular rail and attached to at least the modular rail using one or more second adhesive materials. The one or more flexible rods are configured to allow at least a lateral movement in a first direction between the photovoltaic module and the modular rail and support at least the photovoltaic module in a second direction.

According to another embodiment, a method for mounting one or more photovoltaic modules includes preparing one or more flexible rods, each of the one or more flexible rods including a first end and a second end opposite the first end, each of the one or more flexible rods further including an inner core and a first jacket surrounding the inner core between the first end and the second end, forming at least one hole in a modular rail, attaching the first end to at least one photovoltaic module using one or more first adhesive materials, placing one or more second adhesive materials in the at least one hole, inserting the second end into the at least one hole, allowing at least a lateral movement in a first direction between the photovoltaic module and the modular rail, and supporting at least the photovoltaic module in a second direction.

According to yet another embodiment, a system for mounting one or more photovoltaic modules includes one or more foldable mounts, each of the one or more foldable mounts including a mounting flange, a rotatable joint, and a mounting post. The rotatable joint is attached to the mounting flange and the mounting post. The mounting flange is configured to be rotated relative to the mounting post using the rotatable joint. The mounting flange is configured to be attached to at least one photovoltaic module and the mounting post is configured to be attached to at least one modular rail. The one or more foldable mounts are configured to allow at least a lateral movement in a first direction between the photovoltaic module and the modular rail and support at least the photovoltaic module in a second direction.

According to yet another embodiment, a method for mounting one or more photovoltaic modules includes attaching one or more foldable mounts, each of the one or more foldable mounts including a mounting flange, a rotatable joint, and a mounting post, to at least a photovoltaic module using the mounting flange; rotating the mounting flange relative to the mounting post using the rotatable joint; attaching the mounting post to a modular rail; allowing at least a lateral movement in a first direction between the photovoltaic module and the modular rail; and supporting at least the photovoltaic module in a second direction.

In yet another embodiment, a system for mounting one or more photovoltaic modules includes one or more angled mounts, each of the one or more angled mounts including a mounting post with a mounting face, the mounting post extending in a first direction. The mounting face is not perpendicular to the first direction. The mounting face is configured to be attached to at least one photovoltaic module using one or more first adhesive materials. The mounting post is configured to be attached to a modular rail. The one or more angled mounts are configured to allow at least a lateral movement in a second direction between the photovoltaic module and the modular rail and support at least the photovoltaic module in the first direction.

According to yet another embodiment, a method for mounting one or more photovoltaic modules includes providing one or more angled mounts, each of the one or more angled mounts including a mounting post with a mounting face, the mounting post extending in a first direction; attaching the mounting face to at least a photovoltaic module using one or more adhesive materials; and attaching the mounting post to a modular rail, allowing at least a lateral movement in a second direction between the photovoltaic module and the modular rail, and supporting at least the photovoltaic module in the first direction.

According to yet another embodiment, a system for mounting one or more photovoltaic modules includes one or more notched mounts and one or more ribbed posts. Each of the one or more notched mounts including a mounting flange, a rotatable joint, and a mounting post. Each of the one or more ribbed posts including one or more ribs alternating with one or more grooves. The rotatable joint is attached to the mounting flange and the mounting post. The mounting flange is configured to be rotated relative to the mounting post using the rotatable joint. The mounting flange includes a receiving notch, the receiving notch including an opening at a first end configured to receive at least one of the one or more grooves. Each of the one or more ribbed posts is configured to be attached to at least one photovoltaic module using one or more first adhesive materials. The mounting post is configured to be attached to at least one modular rail. The one or more notched mounts and the one or more ribbed posts are configured to allow at least a lateral movement in a first direction between the photovoltaic module and the modular rail and support at least the photovoltaic module in a second direction.

According to yet another embodiment, a method for mounting one or more photovoltaic modules includes attaching one or more ribbed posts, each of the one or more ribbed posts including one or more ribs alternating with one or more grooves, to at least a photovoltaic module using one or more first adhesive materials; providing one or more notched mounts, each of the one or more notched mounts including a mounting flange, a rotatable joint, and a mounting post; attaching the mounting post to at least a modular rail; rotating the mounting flange relative to the mounting post using the rotatable joint; inserting at least one or the one or more grooves into the receiving notch; allowing at least a lateral movement in a first direction between the photovoltaic module and the modular rail; and supporting at least the photovoltaic module in a second direction.

According to yet another embodiment, a system for mounting one or more photovoltaic modules includes one or more flanged beams and one or more spacers. Each of the one or more flanged beams including a first flange and a second flange opposite the first flange. The one or more spacers include one or more slots respectively. The first flange is configured to be attached to at least one photovoltaic module. The second flange is configured to be inserted into the one or more slots. The one or more spacers are configured to be attached to at least one modular rail using one or more first adhesive materials. The one or more flanged beams and the one or more spacers are configured to allow at least a lateral movement in a first direction between the photovoltaic module and the modular rail and support at least the photovoltaic module in a second direction.

According to yet another embodiment, a method for mounting one or more photovoltaic modules includes providing one or more flanged beams, each of the one or more flanged beams including a first flange and a second flange opposite the first flange; attaching the first flange to at least a photovoltaic module; attaching one or more spacers, each including one or more slots respectively, to a modular rail using one or more adhesive materials; inserting the second flange into the one or more slots; allowing at least a lateral movement in a first direction between the photovoltaic module and the modular rail; and supporting at least the photovoltaic module in a second direction.

According to yet another embodiment, a system for mounting one or more photovoltaic modules includes one or more flexible spacers. Each of the one or more flexible spacers including a first surface and a second surface opposite the first surface. The first surface is configured to be attached to at least one glass panel of a photovoltaic module using one or more first adhesive materials. The second surface is configured to be attached to at least one or more concrete materials of one modular rail using one or more second adhesive materials. The one or more flexible spacers are configured to allow at least a lateral movement in a first direction between the photovoltaic module and the modular rail and support at least the photovoltaic module in a second direction. Each of the one or more flexible spacers includes one selected from a group consisting of polyvinyl chloride (PVC), chlorinated polyvinyl chloride (CPVC), polysulphone (PSU), polystyrene-butadiene-styrene (SBS), ethylene propylene diene monomer (EPDM), polyolefins, and elastomeric polymers.

According to yet another embodiment, a method for mounting one or more photovoltaic modules includes forming a modular rail including one or more concrete materials; providing one or more flexible spacers, each of the one or more flexible spacers including a first surface and a second surface opposite the first surface, each of the one or more flexible spacers including one selected from a group consisting of polyvinyl chloride (PVC), chlorinated polyvinyl chloride (CPVC), polysulphone (PSU), polystyrene-butadiene-styrene (SBS), ethylene propylene diene monomer (EPDM), polyolefins, and elastomeric polymers; attaching the first surface to at least a glass panel using one or more first adhesive materials; attaching the second surface to at least the one or more concrete materials of the modular rail using one or more second adhesive materials; allowing at least a lateral movement in a first direction between the photovoltaic module and the modular rail; and supporting at least the photovoltaic module in a second direction.

Depending upon the embodiment, one or more of these benefits may be achieved. These benefits and various additional objects, features, and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to photovoltaic systems. More particularly, the invention provides systems and methods for mounting photovoltaic modules. Merely by way of example, the invention has been applied to the mounting of photovoltaic modules onto concrete rails. But it would be recognized that the invention has a much broader range of applicability.

In order to orient a photovoltaic (PV) module (e.g., a photovoltaic panel, a solar module, a solar panel, a glass module, a glass panel, a glass-to-glass module, and/or a glass-to-glass panel) relative to the sun, a mounting system is required. For example, the mounting system requires a mechanical substrate to which the photovoltaic module is mounted. In other example, the mechanical substrate includes a mechanical frame. In yet another example, the mechanical substrate includes a modular concrete rail.

Figure 1:
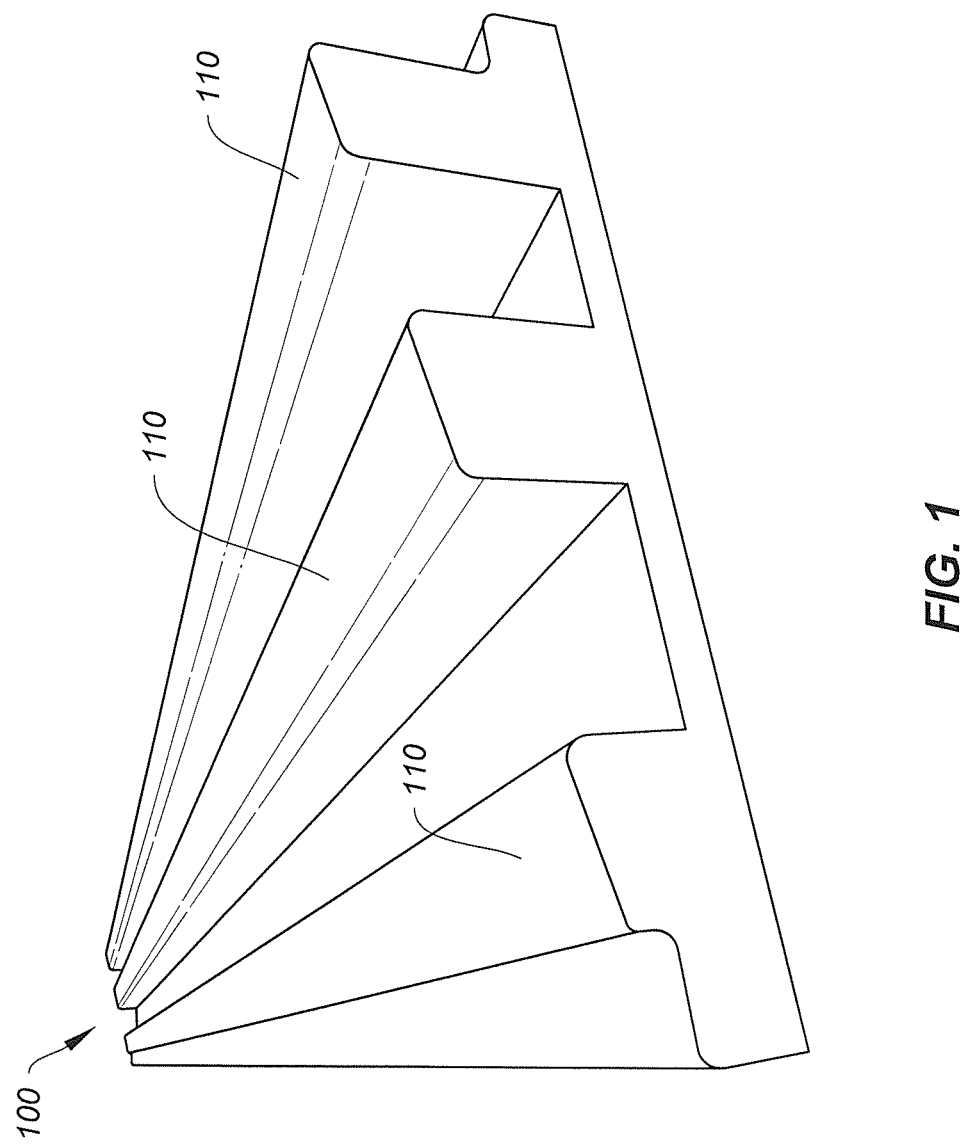
FIG. 1 is a simplified diagram showing a modular rail upon which a PV module may be mounted.

FIG. 1 is a simplified diagram showing a modular rail upon which a PV module may be mounted. This diagram is merely an example, which should not unduly limit the scope of the claims. One of ordinary skill in the art would recognize many variations, alternatives, and modifications. As shown in FIG. 1, the modular rail 100 includes one or more mounting surfaces 110. For example, the one or more mounting surfaces 110 serve as the mechanical substrate for the mounting of one or more PV modules. In another example, the mounting surfaces 110 are substantially coplanar.

Figure 2:
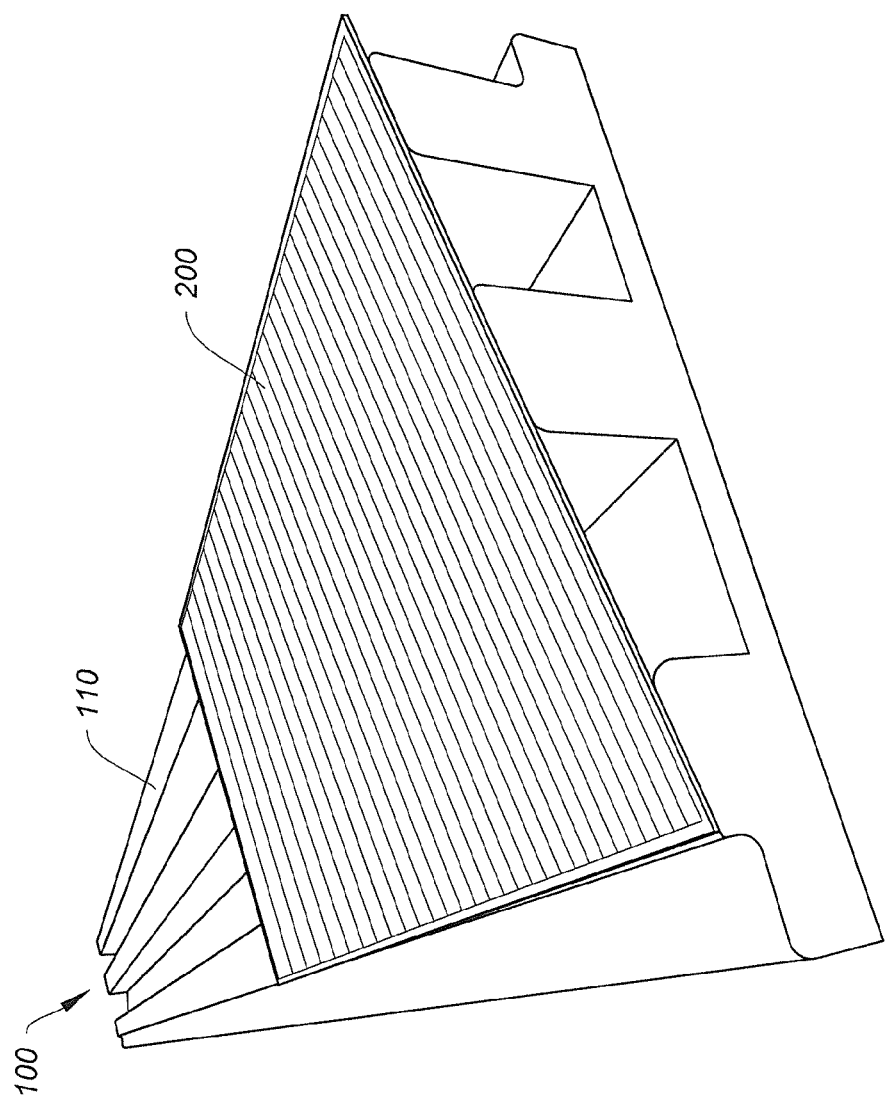
FIG. 2 is a simplified diagram showing a PV module mounted on the modular rail.

FIG. 2 is a simplified diagram showing a PV module mounted on the modular rail 100. This diagram is merely an example, which should not unduly limit the scope of the claims. One of ordinary skill in the art would recognize many variations, alternatives, and modifications. In one embodiment, a PV module 200 is mounted to the one or more mounting surfaces 110 by using at least one or more mechanical mounts. For example, the PV module 200 is a glass-to-glass module. In another embodiment, the one or more mounting surfaces 110 of the modular rail 100 are implemented with a tilt angle. For example, the tilt angle varies depending upon the geographic location (e.g. latitude or orientation) of the PV module so that the affixed PV module 200 is oriented for optimal energy capture from the light source (e.g., the sun).

The use of the one or more mounting surfaces 100 provides certain advantages over conventional technology for the mounting of PV modules. In one embodiment, the PV modules 200 are fixed along their entire length to the one or more mounting surfaces 110 using one or more mechanical mounts. In another embodiment, the PV modules 200 do not have to be as strong as required by certain conventional technology. For example, the mechanical mounting along the one or more surfaces 110 provides a shorter span between the contact points of the PV modules 200 and the one or more mounting surfaces 110; therefore, the PV modules 200 are exposed to less mechanical stress due to wind loads than the PV modules mounted using conventional edge-mounted brackets. In another example, the PV modules 200 is made of thinner material than the conventional edge-mounted PV modules; therefore, the PV modules 200 is manufactured and transported at lower cost due to their lighter weight.

In yet another embodiment, the PV modules 200 benefit from the "heat sink" effect due to the proximity of the PV modules 200 to the modular rails 110. For example, the PV modules 200 can stay slightly cooler than conventional modules and can operate more efficiently (e.g., due to the negative temperature coefficient). In yet another embodiment, the use of mechanical mounts between the PV modules 200 and the one or more surfaces 110 can provide the PV modules 200 with additional air cooling that can significantly reduce negative effects caused by the "heat sink" effect of the modular rails 100.

Figure 3:
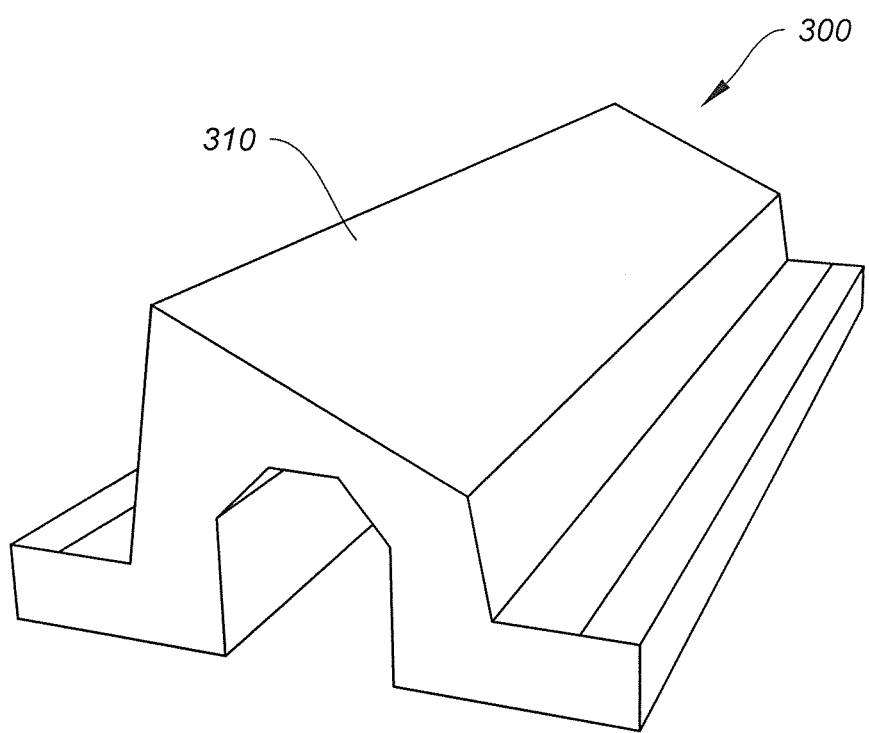
FIG. 3 is a simplified diagram showing another modular rail upon which a PV module may be mounted.
Figure 4:
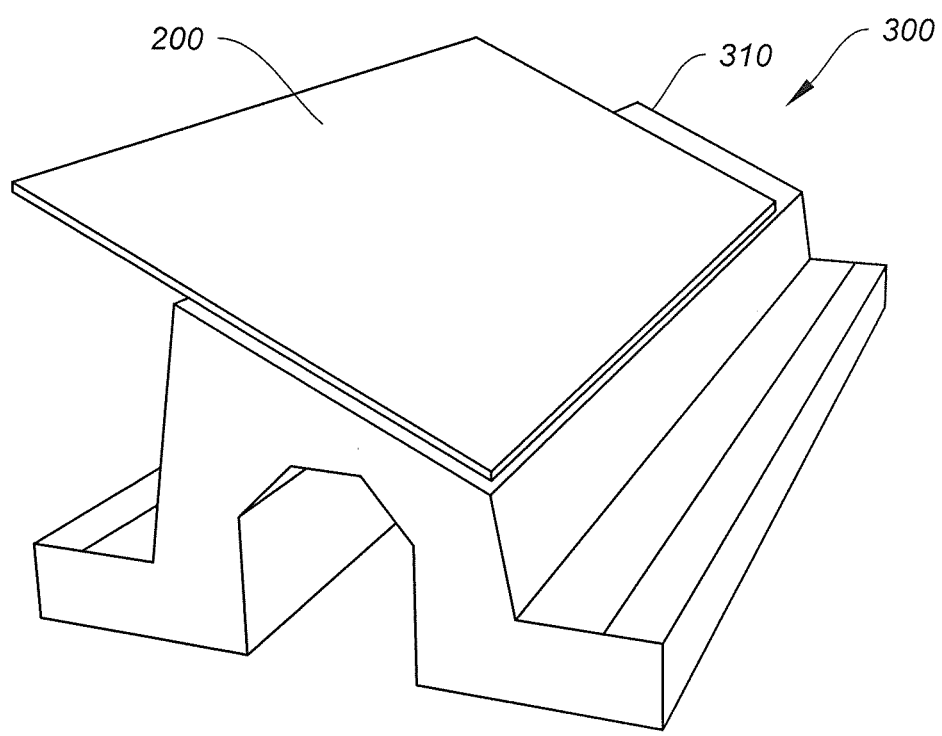
FIG. 4 is a simplified diagram showing a PV module mounted on the another modular rail.

FIG. 3 is a simplified diagram showing another modular rail upon which a PV module may be mounted. FIG. 4 is a simplified diagram showing a PV module mounted on the another modular rail. These diagrams are merely examples, which should not unduly limit the scope of the claims. One of ordinary skill in the art would recognize many variations, alternatives, and modifications. As shown in FIGS. 3 and 4, a modular rail 300 includes only a single mounting surface 310 for the PV module 200 according to one embodiment.

In one example, the modular rail 100 and/or the modular rail 300 is constructed from concrete. In yet another example, the modular rail 100 and/or the modular rail 300 is constructed on site (e.g., being extruded in place using a slip-form extrusion machine). In another example, the extrusion speed of the slip-form extrusion machine is varied. In yet another example, the extrusion speed should be slow enough to produce the one or more mounting surfaces 110 and/or the mounting surface 310 with a high planarity and little sagging to allow for uniformity of a PV module mounting system. In yet another example, if a large planarity tolerance for the one or more mounting surfaces 110 and/or the mounting surface 310 could be allowed, a much higher extrusion speed of slip-form extrusion machine could be achieved, causing reduction of the construction cost of the finished rail.

When mounting one or more PV modules 200 to the modular rail 100 and/or the modular rail 300, the mounting system must meet one or more complex requirements. For example, the mounting system must provide sufficient mechanical strength to prevent the PV module 200 from being blown off the modular rail 100 and/or the modular rail 300 in the presence of wind forces. In another example, the mounting system is resistant to upward wind force on the PV module 200. In yet another example, the mounting system is resistant to downward wind force on the PV module 200. In yet another example, the mounting system is resistant to wind force equivalent to a uniform load of +/−2400 Pa across the PV module 200. In yet another example, the mounting system is able to last in an outdoor environment with extremes of weather for at least 25 years. In yet another example, the mounting system is resistant to hail of up to 2.5 cm in diameter traveling at speeds of up to 23 m/s. In yet another example, the mounting system is resistant to heavy snow loads on top of the PV module 200. In yet another example, the snow loads vary from 200 Pa to 5400 Pa across the PV module. In yet another example, the mounting system remains attached to the one or more mounting surfaces 110 and/or the mounting surface 310 at various temperatures. In yet another example, the mounting system functions at air temperatures ranging from −40° C. to +60° C. In yet another example, the mounting system functions at air temperatures ranging from −60° C. to +90° C. In yet another example, the mounting system functions with PV modules 200 at temperatures of up to +85° C. In yet another example, the mounting system functions with PV modules 200 at temperatures of up to +110° C. In yet another example, the mounting system remains attached to the one or more mounting surfaces 110 and/or the mounting surface 310 under various moisture conditions. In yet another example, the mounting functions after being subjected to +85° C. air at 85% relative humidity for 1000 hours. In yet another example, the mounting system is resistant to ultra-violet (UV) light. In yet another example, the mounting system is not highly flammable. In yet another example, the mounting system is resistant to one or more of salt air, carbonic acid rain, sulfuric acid rain, oily contamination, oxidation, galvanic corrosion, agricultural airborne ammonia, and the like.

In yet another example, the mounting system does not have exposed conductive surfaces to eliminate the need for electrical bonding and/or grounding. In yet another example, the mounting system remains attached to the one or more mounting surfaces 110 and/or the mounting surface 310 with the varying textures. In yet another example, the varying textures include differences in a surface height from 1 nm to 10 mm. In yet another example, the mounting system remains attached to the one or more mounting surfaces 110 and/or the mounting surface 310 during different stages of curing of the concrete material. In yet another example, the one or more mounting surfaces 110 and/or the mounting surface 310 cure within 5 days. In yet another example, the one or more mounting surfaces 110 and/or the mounting surface 310 cure within 30 days. In yet another example, the mounting system must be able to attach well to the one or more mounting surfaces 110 and/or the mounting surface 310 that may vary in planarity (e.g., due to sagging) by as much as 20 mm across the area to which the PV module 200 is mounted.

In yet another example, the mounting system must be able to attach well to the glass surface of the PV module 200. In yet another example, the mounting system must be flexible enough to be able to reduce the stress on the PV module 200 caused by the heating of the PV module 200 while the modular rail 100 and/or the modular rail 300 to which it is mounted remains colder. In yet another example, the mounting system is flexible enough to allow up to 2 mm of differential movement between the PV module 200 and the modular rail 100 and/or the modular rail 300. In yet another example, the mounting system is flexible enough to support the PV module 200 without damage when a temperature differential between the PV module 200 and the modular rail 100 and/or the modular rail 300 is as high as 100° C. In yet another example, the mounting system allows lateral movement (e.g., in a direction substantially parallel to the face of the PV module 200) between the PV module 200 and the modular rail 100 and/or the modular rail 300 to which it is mounted. In yet another example, the mounting system must be able to support the weight of the PV module 200 in a substantially vertical direction. In yet another example, the weight of the PV module 200 varies between 5 kg and 50 kg. In yet another example, if the mounting system includes one or more adhesive materials that are applied in the field, the one or more adhesive materials must have a rapid curing time under the weather conditions (e.g., temperature, moisture, wind load) at the time of application of the one or more adhesive materials in the field. In yet another example, the one or more adhesive materials cure within 5 days. In yet another example, the one or more adhesive materials cure within 30 days. In yet another example, any portion of the mounting system attached to the PV module 200 in the factory needs to have a low profile so as not to significantly reduce the number of PV modules 200 that is packed in a single shipping crate.

Figure 5:
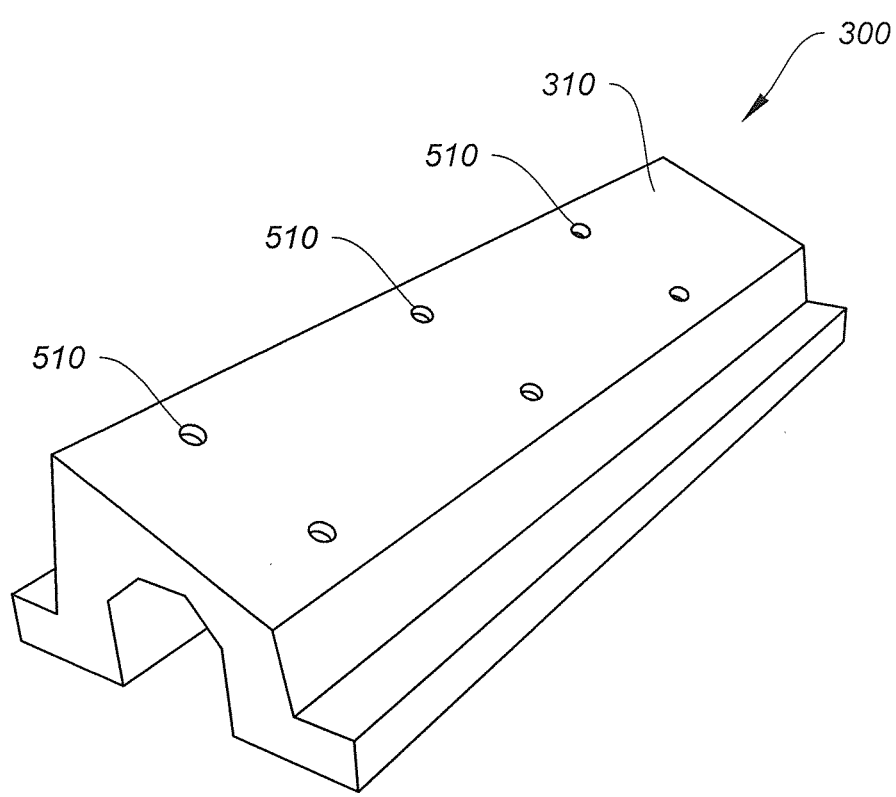
FIG. 5 is a simplified diagram showing the modular rail prepared for the mounting of a PV module according to one embodiment of the present invention.

FIG. 5 is a simplified diagram showing the modular rail 300 prepared for the mounting of a PV module according to one embodiment of the present invention. This diagram is merely an example, which should not unduly limit the scope of the claims. One of ordinary skill in the art would recognize many variations, alternatives, and modifications. In FIG. 5, the modular rail 300 is shown with its mounting surface 310 prepared for the mounting of a PV module. For example, the mounting surface 310 has one or more holes 510 located at intervals along the length of the mounting surface 310. In another example, the one or more holes 510 have a substantially uniform size. In yet another example, the one or more holes 510 have a substantially uniform depth. In yet another example, the one or more holes 510 vary in size from 5 mm to 100 mm. In yet another example, the one or more holes 510 vary in depth from 5 mm to 500 mm. In yet another example, the one or more holes 510 vary in depth from 5 mm to 100 mm. In yet another example, the one or more holes 510 are arranged using a predetermined pattern and spacing.

Figure 6:
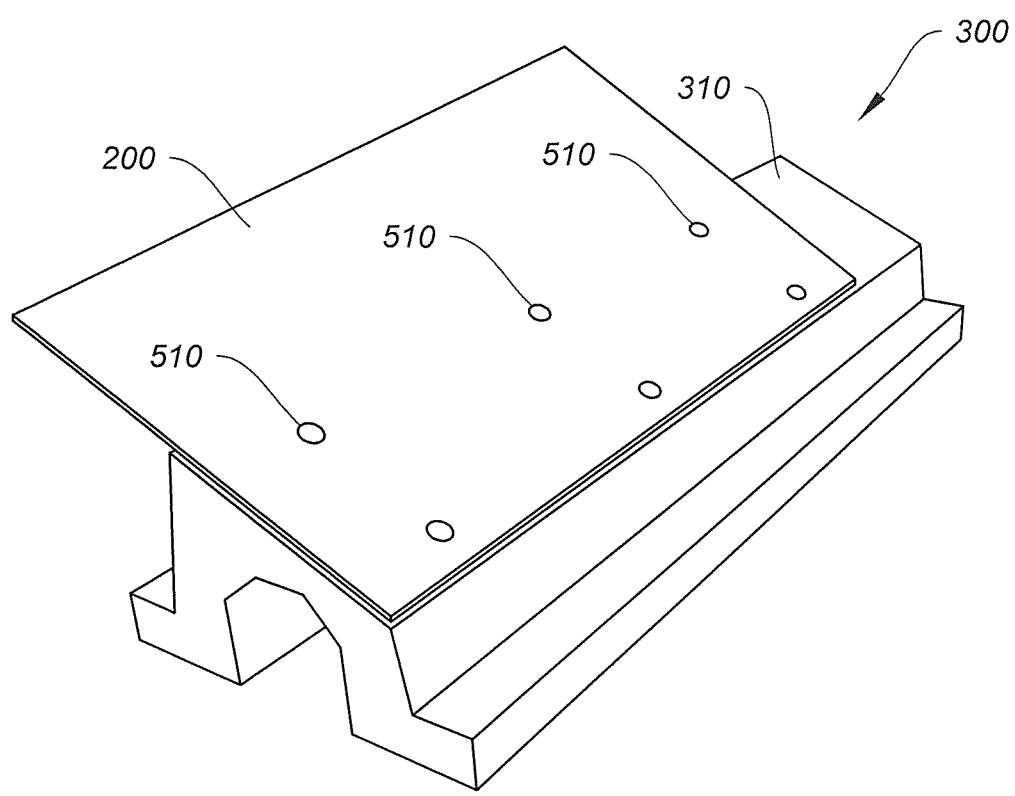
FIG. 6 is a simplified diagram showing the PV module mounted on the prepared modular rail according to one embodiment of the present invention.

FIG. 6 is a simplified diagram showing the PV module 200 mounted on the prepared modular rail 300 according to one embodiment of the present invention. This diagram is merely an example, which should not unduly limit the scope of the claims. One of ordinary skill in the art would recognize many variations, alternatives, and modifications. As shown in FIG. 6, the PV module 200 is mounted on the mounting surface 310 above the one or more holes 510 according to some embodiments.

As discussed above and further emphasized here, FIGS. 5 and 6 are merely examples, which should not unduly limit the scope of the claims. One of ordinary skill in the art would recognize many variations, alternatives, and modifications. For example, the modular rail 100 is substituted for the modular rail 300. In another example, the one or more holes 510 are located at regular intervals along the length of the one or more mounting surfaces 110.

Figure 7:
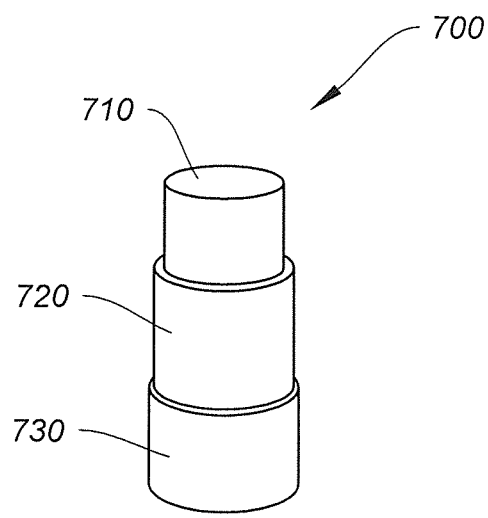
FIG. 7 is a simplified diagram showing a partial cut-away view of a flexible rod used as part of the PV module mounting system according to one embodiment of the present invention.

FIG. 7 is a simplified diagram showing a partial cut-away view of a flexible rod used as part of the PV module mounting system according to one embodiment of the present invention. This diagram is merely an example, which should not unduly limit the scope of the claims. One of ordinary skill in the art would recognize many variations, alternatives, and modifications. As shown in FIG. 7, a flexible rod (e.g., a flexible joining material) 700 includes an inner core 710. For example, the inner core 710 includes one or more fibers. In another example, the one or more fibers are substantially parallel. In yet another example, the one or more fibers are braided. In yet another example, the one or more fibers are each selected from a group consisting of Aramid (Kevlar), polyester, ultrahigh molecular weight polyethylene (UHMWPE), nylon, viscose rayon, cotton, and the like. In yet another example, the one or more fibers do not include any brittle materials (e.g., certain ceramics, certain metals, and/or certain plastics). In yet another example, the one or more fibers do not include any stiffer fiber materials (e.g., certain carbon materials, certain fiberglass materials, and/or Polybenzobisoxazole (PBO)).

In some embodiments, the inner core 710 is surrounded by an inner jacket 720. For example, the inner jacket 720 runs the entire length of the flexible rod 700. In another example, the inner jacket 720 completely surrounds the inner core 710 except at each of the ends of the flexible rod 700. In yet another example, the inner jacket 720 is cross-braided. In yet another example, the inner jacket 720 includes one or more materials selected from a group consisting of Aramid (Kevlar), polyester, ultrahigh molecular weight polyethylene (UHMWPE), nylon, viscose rayon, cotton, and the like. In yet another example, the inner jacket 720 includes an ultraviolet (UV) light stable material. In yet another example, the inner jacket 720 protects the one or more fibers in the inner core 710 from moisture and/or UV light. In yet another example, the inner jacket 720 extends the practical lifetime of the flexible rod 700. In yet another example, the inner jacket 720 adds stiffness to the flexible rod 700. In yet another example, the inner jacket 720 increases the weight that the flexible rod 700 can support.

In some embodiments, the inner jacket 720 is surrounded by an outer jacket 730. For example, the outer jacket 730 runs the entire length of the flexible rod 700. In another example, the outer jacket 730 completely surrounds the inner jacket 720 except at each of the ends of the flexible rod 700. In yet another example, the outer jacket 730 is cross-braided. In yet another example, the outer jacket 730 includes one or more materials selected from a group consisting of Aramid (Kevlar), polyester, ultrahigh molecular weight polyethylene (UHMWPE), nylon, viscose rayon, cotton, and the like. In yet another example, the outer jacket 730 is omitted. In yet another example, the outer jacket 730 adds stiffness to the flexible rod 700. In yet another example, the outer jacket 730 increases the weight that the flexible rod 700 can support. In yet another example, a tightness of the outer jacket 730 is adjusted to control the amount of weight that the flexible rod 700 can support. In yet another example, the outer jacket 730 provides abrasion and/or chafing resistance to the flexible rod 700.

According to some embodiments, a size and/or materials included in the flexible rod 700 are chosen to meet one or more desirable properties. For example, the size and/or materials are selected to provide suitable pull strength to withstand the wind loads to which the PV module will be subjected. In another example, the size and/or materials are selected to provide sufficient stiffness so that the flexible rod 700 supports its share of the weight of the PV module 200. In yet another example, the size and/or materials are selected to provide the lateral flexibility due to lateral movement between the PV module 200 and the modular rail to which it is mounted. In yet another example, the size and/or materials are selected to provide the lateral flexibility and lateral strength needed to withstand the large amount of bending movement that occurs many times and/or for many cycles as the mounting system is subjected to thermal and/or wind loads. In yet another example, the size and/or materials are selected to withstand a large amount of sheer movement and sheer stresses that occurs many times and/or for many cycles as the mounting system is subjected to thermal and/or wind loads.

Figure 8:
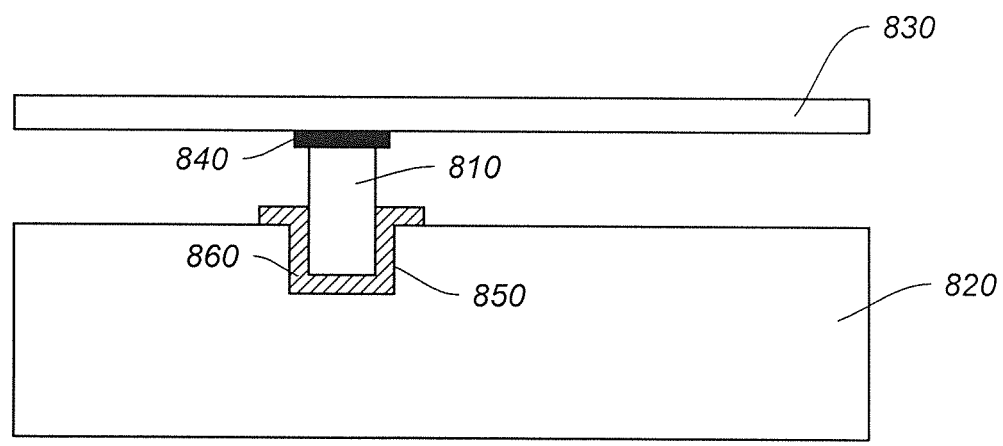
FIG. 8 is a simplified diagram showing a side view of a PV module mounting system using a flexible rod according to one embodiment of the present invention.

FIG. 8 is a simplified diagram showing a side view of a PV module mounting system using a flexible rod according to one embodiment of the present invention. This diagram is merely an example, which should not unduly limit the scope of the claims. One of ordinary skill in the art would recognize many variations, alternatives, and modifications. As shown in FIG. 8, the PV module mounting system includes a flexible rod 810 attached between a modular rail 820 and a PV module 830. For example, the flexible rod 810 is the flexible rod 700. In another example, the modular rail 820 is the modular rail 100 and/or the modular rail 300. In yet another example, the PV module 830 is the PV module 200.

In yet another example, the flexible rod 810 is attached to the PV module 830. In yet another example, the flexible rod 810 is attached to the PV module 830 using one or more adhesive materials 840. In yet another example, the one or more adhesive materials 840 are fast curing. In yet another example, the one or more adhesive materials 840 form a flexible bond between the flexible rod 810 and the PV module 830. In yet another example, the one or more adhesive materials 840 are each selected from a group consisting silicone, organo-silane modified ethylene-vinyl acetate (EVA), organo-silane modified thermoplastic polyolefin (TPO), epoxy, organo-silane modified epoxy, polyurethane, polyacrylic, organo-silane modified polyurethane, organo-silane modified acrylic, polydimethylsiloxane (PDMS), poly(methyl-phenylsiloxane) (PMPS), ether-type polyurethane, ester-type polyurethane, poly(methyl methacrylate) (PMMA), and the like. In yet another example, the PV module 830 is first primed with an organo-silane-containing primer and the one or more adhesive materials further include one or more general-purpose adhesive materials.

In yet another example, the flexible rod 810 is placed into a hole 850 in the modular rail 820. In yet another example, the hole 850 is one of the one or more holes 510. In yet another example, the flexible rod 810 is held in place in the hole 850 using one or more adhesive materials 860. In yet another example, the one or more adhesive materials 850 are fast curing. In yet another example, the one or more adhesive materials 850 form a rigid bond between the flexible rod 810 and the modular rail 820. In yet another example, the one or more adhesive materials 860 are each selected from a group consisting of silicone, ethylene-vinyl acetate (EVA), thermoplastic polyolefin (TPO), epoxy, polyurethane, polydimethylsiloxane (PDMS), poly(methyl-phenylsiloxane) (PMPS), ether-type polyurethane, ester-type polyurethane, poly(methyl methacrylate) (PMMA), and the like. In yet another example, the modular rail 820 is first primed. In yet another example, the one or more adhesive materials 860 are different from the one or more adhesive materials 840. In yet another example, excess of the one or more adhesive materials 860 is displaced from the top of the hole 850. In yet another example, the excess of the one or more adhesive materials 860 displaced from the top of the hole 850 acts as a self-leveling mechanism that accounts for variations in the planarity of the one or more mounting surfaces of the modular rail 820, the length of the flexible rod 810, and/or the depth of the hole 850.

In yet another example, a diameter of the flexible rod 810 is selected to provide sufficient pull strength of the mounting system based on the wind loads to which the PV module 830 is subjected. In yet another example, the diameter of the flexible rod 810 is selected to provide sufficient surface area between the flexible rod 810 and the PV module 830 and/or surface area between the flexible rod 810 and the modular rail 820 to provide sufficient attachment strength between the flexible rod 810 and the PV module 830 and between the flexible rod 810 and the modular rail 820 to withstand the wind loads to which the PV module 830 is subjected. In yet another example, the flexible rod 810 varies in diameter from 10 mm to 100 mm. In yet another example, the flexible rod 810 varies in length from 25 mm to 250 mm.

As discussed above and further emphasized here, FIG. 8 is merely an example, which should not unduly limit the scope of the claims. One of ordinary skill in the art would recognize many variations, alternatives, and modifications. For example, each PV module 830 is mounted to the modular rail 820 using more than one hole 850 and flexible rod 810. In another example, four holes 850 and four corresponding flexible rods 810 are used. In yet another example, six or more holes 850 and six or more corresponding flexible rods 810 are used.

Figure 9:
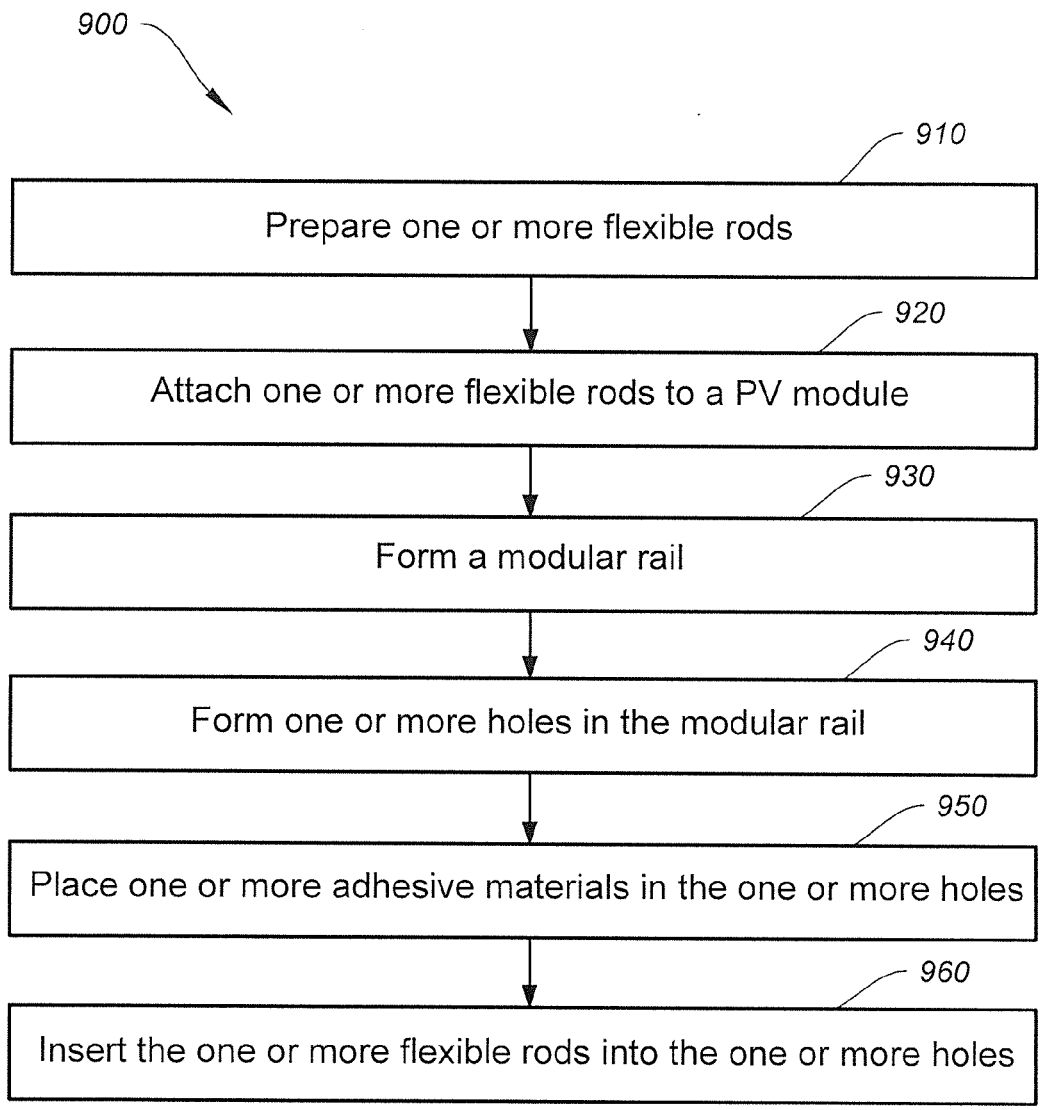
FIG. 9 is a simplified diagram showing a method of mounting a PV module to a modular rail using one or more flexible rods according to one embodiment of the present invention.

FIG. 9 is a simplified diagram showing a method of mounting a PV module to a modular rail using one or more flexible rods according to one embodiment of the present invention. This diagram is merely an example, which should not unduly limit the scope of the claims. One of ordinary skill in the art would recognize many variations, alternatives, and modifications. As shown in FIG. 9, the method 900 includes a process 910 for preparing one or more flexible rods, a process 920 for attaching one or more flexible rods to a PV module, a process 930 for forming a modular rail, a process 940 for forming one or more holes in the modular rail, a process 950 for placing one or more adhesive materials in the one or more holes, and a process 960 for inserting one or more flexible rods into the one or more holes. According to certain embodiments, the method 900 of mounting a PV module to a modular rail using one or more flexible rods is performed using variations among the processes 910-960 as would be recognized by one of ordinary skill in the art.

At the process 910, one or more flexible rods are prepared. For example, each of the one or more flexible rods is the flexible rod 700. In another example, each of the one or more flexible rods are cut from a longer piece of flexible rod material. In yet another example, the flexible rod material is taken from a spool. In yet another example, each of the one or more flexible rods is between 25 mm and 250 mm in length. In yet another example, each of the one or more flexible rods are substantially the same length. In yet another example, each of the one or more flexible rods is a different length.

At the process 920, the one or more flexible rods are attached to a PV module. For example, the PV module is the PV module 830. In another example, the PV module is the PV module 200. In yet another example, the one or more flexible rods are attached to the PV module using one or more adhesive materials. In yet another example, the one or more adhesive materials are the one or more adhesive materials 840. In yet another example, the one or more adhesive materials form a flexible bond between each of the one or more flexible rods and the PV module. In yet another example, the one or more flexible rods are attached to the PV module using a predetermined pattern and spacing. In yet another example, the surface of the PV module 830 is chemically modified using an atmospheric corona discharge and/or an atmospheric plasma discharge. In yet another example, the process 920 is performed in the factory. In yet another example, the process 920 is performed in the field.

At the process 930, the modular rail is formed. For example, the modular rail is the modular rail 820, the modular rail 100, and/or the modular rail 200. In another example, the modular rail is formed in-situ in the field using a slip-form extrusion machine. In yet another example, the extrusion speed of the slip-form extrusion machine is varied. In yet another example, the extrusion speed should be slow enough to produce one or more mounting surfaces which are substantially planar. In yet another example, the extrusion speed should be slow enough to produce the one or more mounting surfaces with a high planarity and little sagging to allow for uniformity in the PV module mounting system. In yet another example, if a large planarity variability in the one or more mounting surfaces could be allowed, a much higher extrusion speed of slip-form extrusion machine could be achieved, causing reduction of the construction cost of the finished rail. In yet another example, the modular rail is preformed in the factory and transported to the installation site.

At the process 940, one or more holes are formed in to the modular rail. For example, the one or more holes are the one or more holes 510. In another example, each of the one or more holes is the hole 850. In yet another example, the one or more holes are arranged using the predetermined pattern and spacing for the one or more flexible rods attached to the PV module. In yet another example, the one or more holes are formed by using a hole punch tool. In yet another example, the hole punch tool is used with the slip-form extrusion machine. In yet another example, the one or more holes are formed before the modular rail has been allowed to cure. In yet another example, the one or more holes are formed by drilling a previously formed and cured modular rail.

At the process 950, one or more adhesive materials are placed into the one or more holes. For example, the one or more adhesive materials are the one or more adhesive materials 860. In another example, the one or more adhesive materials are fast curing. In yet another example, the one or more adhesive materials partially fill the one or more holes. In yet another example, the one or more adhesive materials substantially fill the one or more holes. In yet another example, the one or more adhesive materials are placed in the one or more holes manually. In yet another example, the one or more adhesive materials are placed in the one or more holes using an automated robotic arm with one or more adhesive dispensers.

At the process 960, the one or more flexible rods are inserted into the one or more holes. For example, the one or more flexible rods are aligned with the one or more holes and then inserted into the one or more holes. In another example, the one or more adhesive materials in the one or more holes form rigid bonds between the one or more flexible rods and the modular rail. In yet another example, excess of the one or more adhesive materials is displaced from the top of one or more of the one or more holes. In yet another example, the excess of the one or more adhesive materials displaced from the top of one or more of the one or more holes acts as a self-leveling mechanism that accounts for variations in the planarity of the one or more mounting surfaces of the modular rail, the length of the one or more flexible rods, and/or the depth of the one or more holes.

Figure 10A:
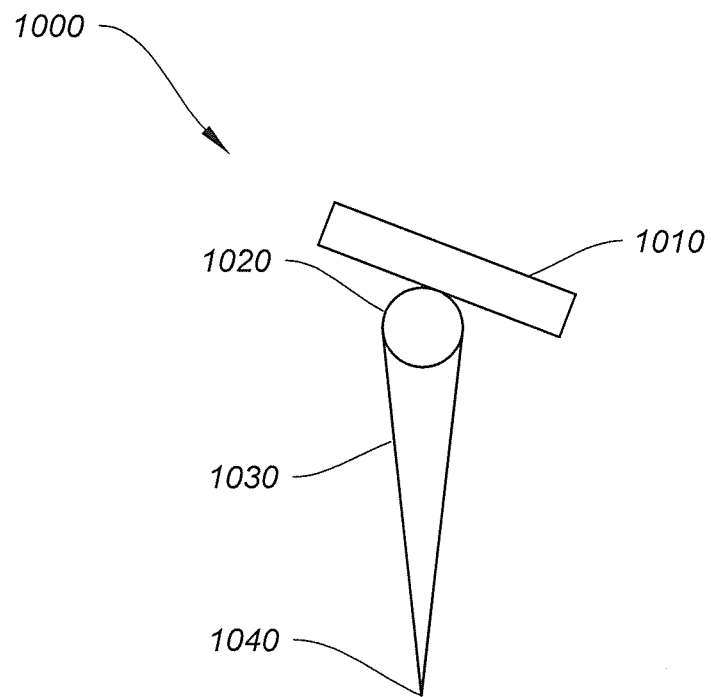
FIG. 10A is a simplified diagram showing a side view of a foldable mount as used in a PV module mounting system according to one embodiment of the present invention.

FIG. 10A is a simplified diagram showing a side view of a foldable mount as used in a PV module mounting system according to one embodiment of the present invention. This diagram is merely an example, which should not unduly limit the scope of the claims. One of ordinary skill in the art would recognize many variations, alternatives, and modifications. As shown in FIG. 10A, the foldable mount 1000 includes a mounting flange 1010, a rotatable joint 1020, and an insertable end (e.g., a mounting post) 1030. For example, the rotatable joint 1020 allows the mounting flange 1010 and the insertable end 1030 to be rotated relative to each other. In another example, the rotatable joint 1020 includes a hinge. In yet another example, the rotatable joint 1020 includes a ball-and-socket joint. In yet another example, the insertable end 1030 is tapered to provide a point 1040 distal to the rotatable joint 1020. In yet another example, the insertable end 1030 varies in length from 0.25 cm to 50 cm. In yet another example, the intertable end 1030 is shaped like a wedge. In yet another example, the insertable end 1030 is shaped like a cone. In yet another example, the insertable end 1030 is shaped like an arrow head. In yet another example, the insertable end 1030 is shaped like a spear head. In yet another example, the insertable end 1030 includes one or more barbs. In yet another example, the insertable end 1030 includes one or more ribs In yet another example, the foldable mount 1000 includes one or more materials. In yet another example, the insertable end 1030 is flexible. In yet another example, the insertable end 1030 is sufficiently stiff to support part of the weight of a PV module. In yet another example, the one or more materials are selected from a group consisting of polyvinyl chloride (PVC), chlorinated polyvinyl chloride (CPVC), high-density polyethylene (HDPE), low-density polyethylene (LDPE), polypropylene (PP), poly(ethylene terephthalate) (PET), polycarbonate (PC), polyamide (PA), poly(methyl methacrylate) (PMMA), polyoxymethylene (POM), polyphenylene oxide (PPO), polyphenylene sulfide (PPS), polysulphone (PSU), polystyrene-butadiene-styrene (SBS), ethylene propylene diene monomer (EPDM), poly(ethylene terephthalate) (Rynite), polyphenylene ether (PPE) modified by polystyrene (PS) or polyamide (PA) (Xyron), acrylonitrile butadiene styrene (ABS), polyphenylene oxide (PPO) blended with polystyrene (PS) (Noryl), engineering polymers, non-engineering plastics, polyolefins, elastomeric polymers, hot-dipped zinc-coated steel, anodized aluminum, powder-coated metal, painted metal, polymeric over molded metal, polymer over extruded metal, and the like. In yet another example, the foldable mount 1000 is coated with a non-conductive coating.

Figure 10B:
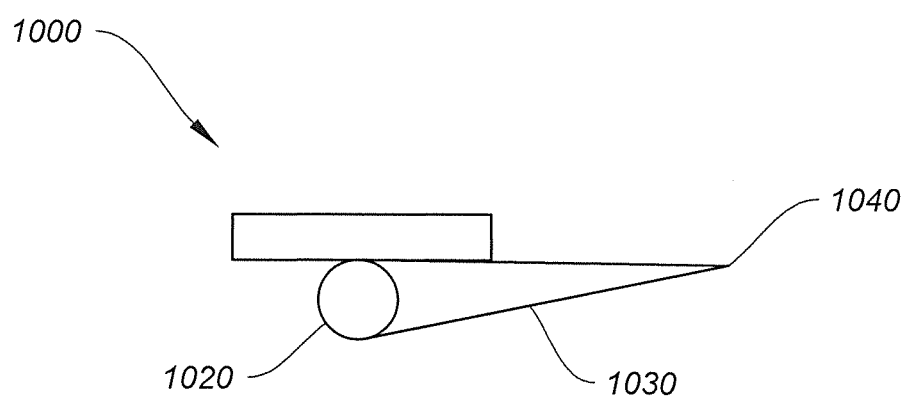
FIG. 10B is a simplified diagram showing a side view of the foldable mount in folded position as used in a PV module mounting system according to one embodiment of the present invention.

FIG. 10B is a simplified diagram showing a side view of the foldable mount 1000 in folded position as used in a PV module mounting system according to one embodiment of the present invention. This diagram is merely an example, which should not unduly limit the scope of the claims. One of ordinary skill in the art would recognize many variations, alternatives, and modifications. As shown in FIG. 10B, the rotatable joint 1020 is rotated so that the mounting flange 1010 and the insertable end 1030 are substantially parallel. In another example, when the foldable mount 1000 is in folded position, it provides as small a cross-sectional footprint as possible. In yet another example, the small cross-sectional footprint allows for maximum density when packing multiple foldable mounts 1000.

Figure 11:
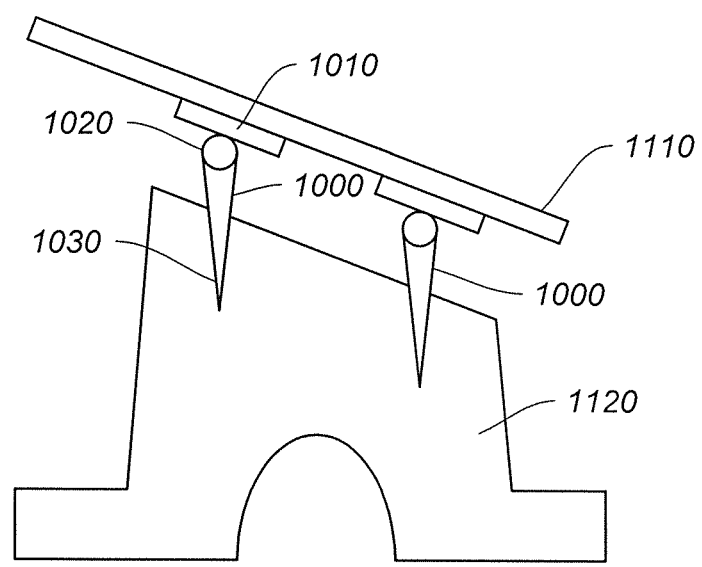
FIG. 11 is a simplified diagram showing a side view of a PV module mounting system using one or more foldable mounts according to one embodiment of the present invention.

FIG. 11 is a simplified diagram showing a side view of a PV module mounting system using one or more foldable mounts 1000 according to one embodiment of the present invention. This diagram is merely an example, which should not unduly limit the scope of the claims. One of ordinary skill in the art would recognize many variations, alternatives, and modifications. As shown in FIG. 11, a PV module 1110 is mounted to a modular rail 1120 using one or more foldable mounts 1000. For example, each of the one or more foldable mounts 1000 is attached to the PV module 1110 using a respective mounting flange 1010. For example, the mounting flange 1010 of each of the one or more foldable mounts 1000 is attached to the PV module 1110 using one or more adhesive materials. In yet another example, the one or more adhesive materials are fast curing. In yet another example, the one or more adhesive materials form a flexible bond between the mounting flange 1010 of each of the one or more foldable mounts 1000 and the PV module 1110. In yet another example, the one or more adhesive materials are each selected from a group consisting of silicone, organo-silane modified ethylene-vinyl acetate (EVA), organo-silane modified thermoplastic polyolefin (TPO), epoxy, organo-silane modified epoxy, polyurethane, polyacrylic, organo-silane modified polyurethane, organo-silane modified acrylic, polydimethylsiloxane (PDMS), poly(methyl-phenylsiloxane) (PMPS), ether-type polyurethane, ester-type polyurethane, poly(methyl methacrylate) (PMMA), and the like. In yet another example, the PV module 1110 is first primed with an organo-silane-containing primer and the one or more adhesive materials further include one or more general-purpose adhesive materials. In yet another example, the mounting flange 1010 of each of the one or more foldable mounts 1000 is attached to the PV module 1110 using bolts, screws, and/or other mechanical fasteners. In yet another example, one or more gasket materials are used between the mounting flange 1010 of each of the one or more foldable mounts 1000 and the PV module 1110. In yet another example, each of the one or more gasket materials is selected from a list consisting of ethylene propylene diene monomer (EPDM), UV-resistant rubber, and the like.

In yet another example, the modular rail 1120 is the modular rail 100 and/or the modular rail 200. In yet another example, the insertable end 1030 of each of the one or more foldable mounts 1000 is inserted into the modular rail 1120. In yet another example, the insertable end 1030 of each of the one or more foldable mounts 1000 is inserted into the modular rail 1120 to a depth between 5 mm and 500 mm.

According to some embodiments, the angle of the PV module 1110 relative to the sun is controlled through use of the one or more foldable mounts 1000. For example, each of the one or more foldable mounts 1000 is rotated at the respective rotatable joint 1020 to account for variations in the height of the modular rail 1120 and/or the desired angle of the PV module 1110 relative to the sun. In another example, the depth to which the insertable end 1030 of each of the one or more foldable mounts 1000 is inserted into the modular rail 1120 is adjusted to account for variations in the height of the modular rail 1120 and/or the desired angle of the PV module 1110 relative to the sun. In yet another example, a length and a size of the insertable end 1030 of each of the one or more foldable mounts 1000 is selected to provide sufficient pull strength for the mounting system based on the wind loads to which the PV module 1110 is subjected.

As discussed above and further emphasized here, FIG. 11 is merely an example, which should not unduly limit the scope of the claims. One of ordinary skill in the art would recognize many variations, alternatives, and modifications. In some embodiments, the number of foldable mounts 1000 is varied. For example, the PV module 1110 is mounted to the modular rail 1120 using only one foldable mount 1100. In another example, four foldable mounts 1000 are used. In yet another example, six or more foldable mounts 1000 are used. In some embodiments, a different style of modular rail 1120 is used. For example, an insertable end 1030 is inserted into one of the one or more mounting surfaces 110 of the modular rail 100 and another insertable end 1030 is inserted into another one of the one or more mouting surfaces 110 of the modular rail 100 as shown in FIG. 1.

Figure 12:
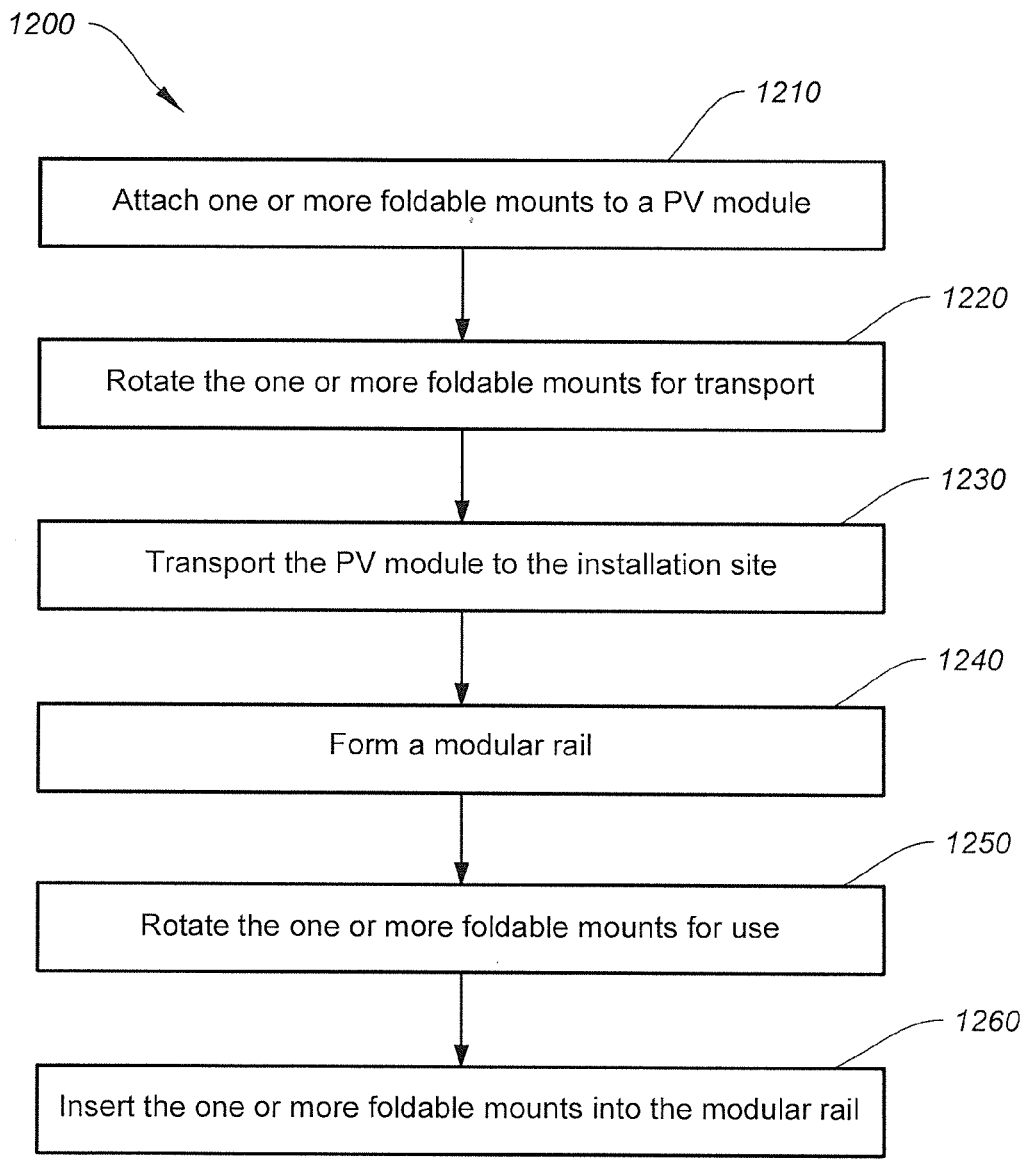
FIG. 12 is a simplified diagram showing a method of mounting a PV module to a modular rail using one or more foldable mounts according to one embodiment of the present invention.

FIG. 12 is a simplified diagram showing a method of mounting a PV module 1110 to a modular rail 1120 using one or more foldable mounts 1000 according to one embodiment of the present invention. This diagram is merely an example, which should not unduly limit the scope of the claims. One of ordinary skill in the art would recognize many variations, alternatives, and modifications. As shown in FIG. 12, the method 1200 includes a process 1210 for attaching one or more foldable mounts to a PV module, a process 1220 for rotating the one or more foldable mounts for transport, a process 1230 for transporting the PV module to the installation site, a process 1240 for forming a modular rail, a process 1250 for rotating the one or more foldable mounts for use, and a process 1260 for inserting the one or more foldable mounts into the modular rail. According to certain embodiments, the method 1200 of mounting a PV module to a modular rail using one or more foldable mounts is performed using variations among the processes 1210-1260 as would be recognized by one of ordinary skill in the art. According to some embodiments, one or more of the processes 1220 and/or 1230 are optional.

At the process 1210, one or more foldable mounts 1000 are attached to a PV module 1110. For example, the PV module 1110 is the PV module 200. In another example, the one or more foldable mounts 1000 are attached to the PV module 1110 using the respective mounting flange 1010 of each of the one or more foldable mounts 1000. In yet another example, the one or more foldable mounts 1000 are attached to the PV module 1110 using one or more adhesive materials. In yet another example, the one or more adhesive materials form a flexible bond between the mounting flange 1010 of each of the one or more foldable mounts 1000 and the PV module 1110. In yet another example, the mounting flange 1010 of each of the one or more foldable mounts 1000 is attached to the PV module 1110 using bolts, screws, and/or other mechanical fasteners. In yet another example, one or more gasket materials is placed on the PV module 1110 before each of the one or more foldable mounts 1000 is attached. In yet another example, the one or more foldable mounts 1000 are attached to the PV module 1110 using a predetermined pattern and spacing. In yet another example, the PV module 1110 is primed before each of the one or more foldable mounts 1000 is attached. In yet another example, the surface of the PV module 1110 is roughened before the one or more foldable mounts 1000 is attached. In yet another example, the surface of the PV module 1110 is chemically modified using an atmospheric corona discharge and/or an atmospheric plasma discharge. In yet another example, the process 1210 is performed in the factory. In yet another example, the process 1210 is performed in the field.

At the optional process 1220, the one or more foldable mounts 1000 are rotated for transport. For example, the one or more foldable mounts 1000 are rotated using the respective rotatable joint 1010 as shown in FIG. 10B. In another example, during the process 1220, each insertable end 1030 of each of the one or more foldable mounts 1000 is rotated to provide as small a cross-sectional footprint as possible relative to the PV module 1110. In yet another example, each insertable end 1020 of each of the one or more foldable mounts 1000 is rotated so that each each insertable end 1020 of each of the one or more foldable mounts 1000 is substantially parallel to the PV module 1110.

At the optional process 1230, the PV module 1110 is transported to the installation site. For example, the PV module 1110 is placed in a crate and/or a rack for transportation. In another example, more than one PV module 1110 is placed in the same crate and/or rack for transportation, taking advantage of the small cross-sectional footprint made possible by the rotation of each of the foldable mounts 1000.

At the process 1240, the modular rail 1120 is formed. For example, the modular rail 1020 is the modular rail 100, and/or the modular rail 300. In another example, the modular rail 1120 is formed in-situ in the field using a slip-form extrusion machine. In yet another example, the extrusion speed of the slip-form extrusion machine is varied. In yet another example, the extrusion speed should be slow enough to produce one or more mounting surfaces which are substantially planar. In yet another example, the extrusion speed should be slow enough to produce the one or more mounting surfaces with a high planarity and little sagging to allow for uniformity in the PV module mounting system. In yet another example, if a large planarity variability in the one or more mounting surfaces could be allowed, a much higher extrusion speed of slip-form extrusion machine could be achieved, causing reduction of the construction cost of the finished rail. In yet another example, the modular rail 1120 is preformed in the factory and transported to the installation site.

At the process 1250, the one or more foldable mounts 1000 are rotated for use. For example, the angle of the PV module 1110 relative to the sun is controlled through use of the rotatable joint 1020 of each of the one or more foldable mounts 1000. For example, each of the one or more foldable mounts 1000 is rotated at the respective rotatable joint 1020 to account for variations in the height of the modular rail 1120 and/or the desired angle of the PV module 1110 relative to the sun.

At the process 1260, the one or more foldable mounts 1000 are inserted into the modular rail 1120. For example, the insertable end 1030 of each of the one or more foldable mounts 1000 is inserted into the modular rail 1120. In another example, the process 1260 occurs before the modular rail 1120 is substantially cured. In yet another example, the process 1260 is controlled so that the depth to which the insertable end 1030 of each of the one or more foldable mounts 1000 is inserted into the modular rail 1120 is adjusted to account for variations in the height of the modular rail 1120 and/or the desired angle of the PV module 1110 relative to the sun. In yet another example, the process 1260 is controlled so that the insertable end 1030 of each of the one or more foldable mounts 1000 is inserted a suitable distance into the modular rail 1120 so that after the modular rail 1120 substantially cures, the one or more foldable mounts 1000 provide sufficient pull strength to account for the wind loads to which the PV module 1110 is subjected.

Figure 13A:
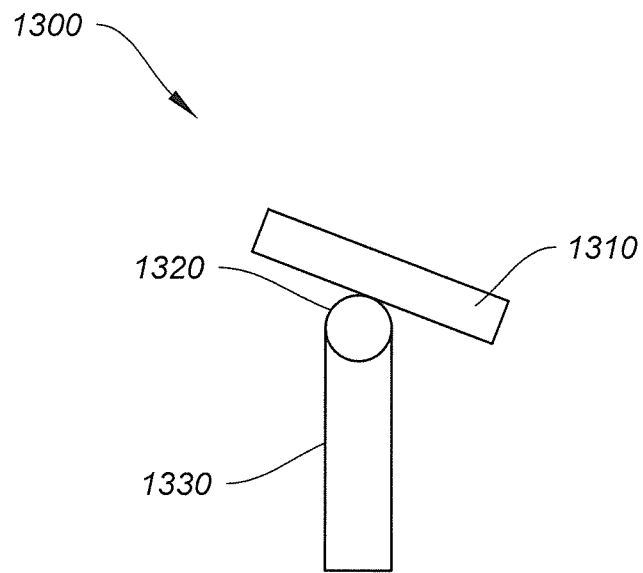
FIG. 13A is a simplified diagram showing a side view of a foldable mount as used in a PV module mounting system according to another embodiment of the present invention.

FIG. 13A is a simplified diagram showing a side view of a foldable mount as used in a PV module mounting system according to another embodiment of the present invention. This diagram is merely an example, which should not unduly limit the scope of the claims. One of ordinary skill in the art would recognize many variations, alternatives, and modifications. As shown in FIG. 13A, the foldable mount 1300 includes a mounting flange 1310, a rotatable joint 1320, and an mounting rod 1330. For example, the rotatable joint 1320 allows the mounting flange 1310 and the mounting rod 1330 to be rotated relative to each other. In another example, the rotatable joint 1320 includes a hinge. In yet another example, the rotatable joint 1320 includes a ball-and-socket joint. In yet another example, the foldable mount 1330 varies in length from 0.25 cm to 50 cm. In yet another example, the foldable mount 1300 includes one or more materials. In yet another example, the foldable mount 1300 is flexible. In yet another example, the mounting rod 1330 is sufficiently stiff to support part of the weight of a PV module. In yet another example, the one or more materials are selected from a group consisting of polyvinyl chloride (PVC), chlorinated polyvinyl chloride (CPVC), high-density polyethylene (HDPE), low-density polyethylene (LDPE), polypropylene (PP), poly(ethylene terephthalate) (PET), polycarbonate (PC), polyamide (PA), poly(methyl methacrylate) (PMMA), polyoxymethylene (POM), polyphenylene oxide (PPO), polyphenylene sulfide (PPS), polysulphone (PSU), polystyrene-butadiene-styrene (SBS), ethylene propylene diene monomer (EPDM), poly(ethylene terephthalate) (Rynite), polyphenylene ether (PPE) modified by polystyrene (PS) or polyamide (PA) (Xyron), acrylonitrile butadiene styrene (ABS), polyphenylene oxide (PPO) blended with polystyrene (PS) (Noryl), engineering polymers, non-engineering plastics, polyolefins, elastomeric polymers, hot-dipped zinc-coated steel, anodized aluminum, powder-coated metal, painted metal, polymeric over molded metal, polymer over extruded metal, and the like. In yet another example, the foldable mount 1300 is coated with a non-conductive coating.

Figure 13B:
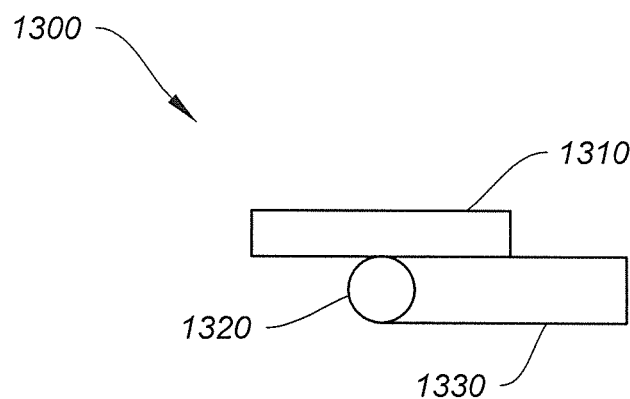
FIG. 13B is a simplified diagram showing a side view of the foldable mount in folded position as used in a PV module mounting system according to another embodiment of the present invention.

FIG. 13B is a simplified diagram showing a side view of the foldable mount 1300 in folded position as used in a PV module mounting system according to another embodiment of the present invention. This diagram is merely an example, which should not unduly limit the scope of the claims. One of ordinary skill in the art would recognize many variations, alternatives, and modifications. As shown in FIG. 13B, the rotatable joint 1320 is rotated so that the mounting flange 1310 and the mounting rod 1330 are substantially parallel. In another example, when the foldable mount 1300 is in folded position, it provides as small a cross-sectional footprint as possible. In yet another example, the small cross-sectional footprint allows for maximum density when packing multiple foldable mounts 1300.

Figure 14:
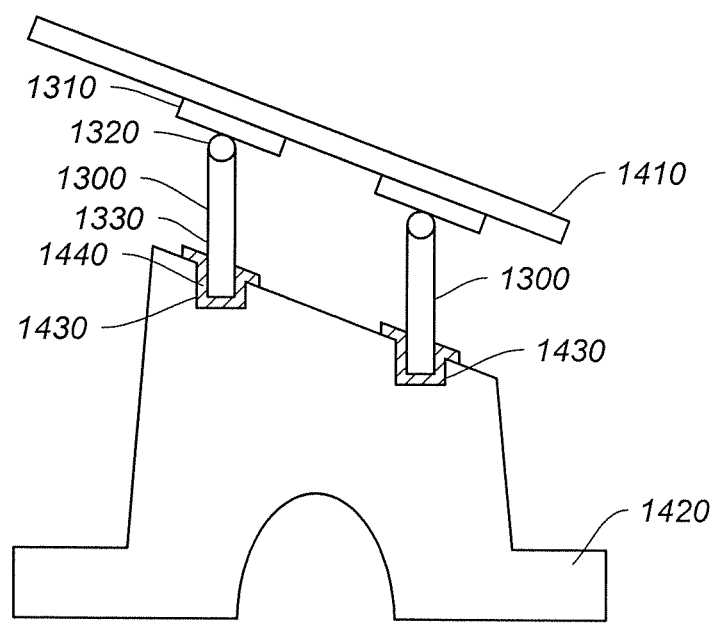
FIG. 14 is a simplified diagram showing a side view of a PV module mounting system using one or more foldable mounts according to another embodiment of the present invention.

FIG. 14 is a simplified diagram showing a side view of a PV module mounting system using one or more foldable mounts 1300 according to another embodiment of the present invention. This diagram is merely an example, which should not unduly limit the scope of the claims. One of ordinary skill in the art would recognize many variations, alternatives, and modifications. As shown in FIG. 14, a PV module 1410 is mounted to a modular rail 1420 using one or more foldable mounts 1300. For example, each of the one or more foldable mounts 1300 is attached to the PV module 1410 using a respective mounting flange 1310. For example, the mounting flange 1310 of each of the one or more foldable mounts 1300 is attached to the PV module 1410 using one or more adhesive materials. In yet another example, the one or more adhesive materials are fast curing. In yet another example, the one or more adhesive materials form a flexible bond between the mounting flange 1310 of each of the one or more foldable mounts 1300 and the PV module 1330. In yet another example, the one or more adhesive materials are each selected from a group consisting of silicone, organo-silane modified ethylene-vinyl acetate (EVA), organo-silane modified thermoplastic polyolefin (TPO), epoxy, organo-silane modified epoxy, polyurethane, polyacrylic, organo-silane modified polyurethane, organo-silane modified acrylic, polydimethylsiloxane (PDMS), poly (methyl-phenylsiloxane) (PMPS), ether-type polyurethane, ester-type polyurethane, poly(methyl methacrylate) (PMMA), and the like. In yet another example, the PV module 1410 is first primed with an organo-silane-containing primer and the one or more adhesive materials further include one or more general-purpose adhesive materials. In yet another example, the mounting flange 1310 of each of the one or more foldable mounts 1300 is attached to the PV module 1410 using bolts, screws, and/or other mechanical fasteners. In yet another example, one or more gasket materials are used between the mounting flange 1310 of each of the one or more foldable mounts 1300 and the PV module 1110. In yet another example, each of the one or more gasket materials is selected from a list consisting of ethylene propylene diene monomer (EPDM), UV-resistant rubber, and the like.

In yet another example, the modular rail 1420 is the modular rail 100 and/or the modular rail 300. In yet another example, the modular rail 1420 includes one or more holes 1430. In yet another example, the one or more holes 1430 substantially line up with the one or more foldable mounts 1300. In yet another example, the mounting rod 1330 of each of the one or more foldable mounts 1300 is placed into a respective hole 1430 in the modular rail 1420. In yet another example, the mounting rod 1330 of each of the one or more foldable mounts 1300 is held in place in the respective hole 1430 using one or more adhesive materials 1440. In yet another example, the one or more adhesive materials 1440 are fast curing. In yet another example, the one or more adhesive materials 1440 form a rigid bond between the mounting rod 1330 of each of the one or more foldable mounts 1300 and the modular rail 1420. In yet another example, the one or more adhesive materials 1440 are each selected from a group consisting of silicone, ethylene-vinyl acetate (EVA), thermoplastic polyolefin (TPO), epoxy, polyurethane, polydimethylsiloxane (PDMS), poly(methyl-phenylsiloxane) (PMPS), ether-type polyurethane, ester-type polyurethane, poly(methyl methacrylate) (PMMA), and the like. In yet another example, the modular rail 1420 is first primed. In yet another example, the one or more adhesive materials 1440 are different from the one or more adhesive materials used to attach the mouting flange 1310 of each of the one or more foldable mounts 1300 to the PV module 1410. In yet another example, excess of the one or more adhesive materials 1440 is displaced from the top of the one or more holes 1430. In yet another example, the excess of the one or more adhesive materials 1440 displaced from the top of the one or more holes 1430 acts as a self-leveling mechanism that accounts for variations in the planarity of the one or more mounting surfaces of the modular rail 1420, the length of the mounting rod 1330 of each of the one or more foldable mounts 1300, and/or the depth of the one or more holes 1430.

In yet another example, a cross-sectional area of the mounting rod 1330 of each of the one or more foldable mounts 1300 is selected to provide sufficient pull strength of the mounting system based on the wind loads to which the PV module 1410 is subjected. In yet another example, the cross-sectional area of the mounting rod 1330 of each of the one or more foldable mounts 1300 is selected to provide sufficient surface area between the mounting rod 1330 of each of the one or more foldable mounts 1300 and the modular rail 1420 to provide sufficient attachment strength between the mounting rod 1330 of each of the one or more foldable mounts 1300 to withstand the wind loads to which the PV module 1410 is subjected. In yet another example, the mounting rod 1330 of each of the one or more foldable mounts 1300 varies in cross-sectional area from 25 $mm^2$ to 30,000 $mm^2$. In yet another example, the mounting rod 1330 of each of the one or more foldable mounts 1300 varies in length from 25 mm to 250 mm.

As discussed above and further emphasized here, FIG. 14 is merely an example, which should not unduly limit the scope of the claims. One of ordinary skill in the art would recognize many variations, alternatives, and modifications. In some embodiments, the number of holes 1430 and corresponding foldable mounts 1300 is varied. For example, the PV module 1410 is mounted to the modular rail 1420 using only one hole 1430 and one foldable mount 1300. In another example, four holes 1430 and four corresponding foldable mounts 1300 are used. In yet another example, six or more holes 1430 and six or more corresponding foldable mounts 1300 are used. In some embodiments, a different style of modular rail 1420 is used. For example, the mounting rod 1330 of each of the one or more foldable mounts 1300 is inserted into one of the one or more mounting surfaces 110 of the modular rail 100 as shown in FIG. 1. In another example, a mounting rod 1300 is inserted into one of the one or more mounting surfaces 110 and another mounting rod 1300 is inserted into another one of the one or more mounting surfaces 110.

Figure 15:
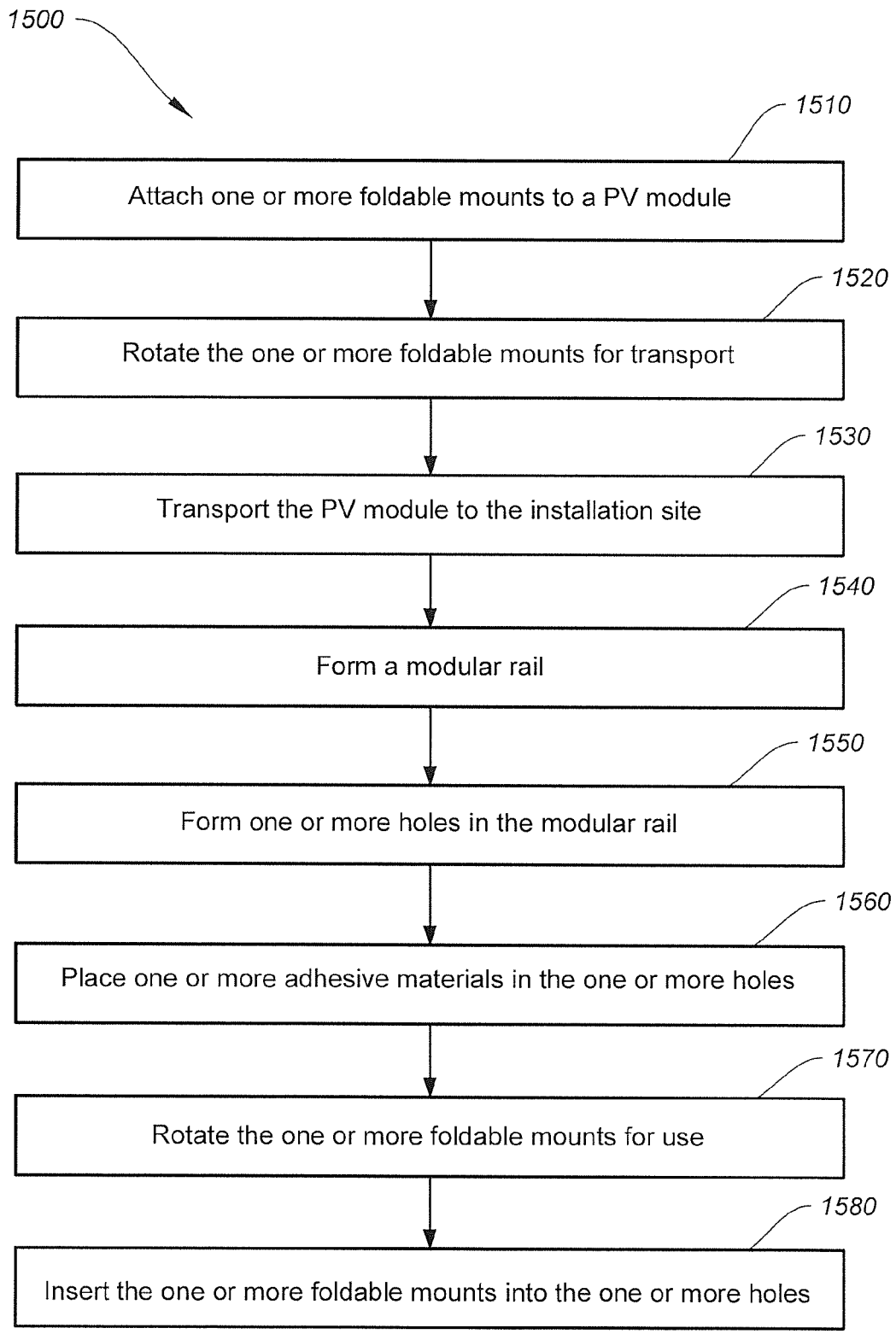
FIG. 15 is a simplified diagram showing a method of mounting a PV module to a modular rail using one or more foldable mounts according to another embodiment of the present invention.

FIG. 15 is a simplified diagram showing a method of mounting a PV module 1410 to a modular rail 1420 using one or more foldable mounts 1300 according to another embodiment of the present invention. This diagram is merely an example, which should not unduly limit the scope of the claims. One of ordinary skill in the art would recognize many variations, alternatives, and modifications. As shown in FIG. 15, the method 1500 includes a process 1510 for attaching one or more foldable mounts to a PV module, a process 1520 for rotating the one or more foldable mounts for transport, a process 1530 for transporting the PV module to the installation site, a process 1540 for forming a modular rail, a process 1550 for forming one or more holes in the modular rail, a process 1560 for placing one or more adhesive materials in the one or more holes, a process 1570 for rotating the one or more foldable mounts for use, and a process 1580 for inserting one or more foldable mounts into the one or more holes. According to certain embodiments, the method 1500 of mounting a PV module to a modular rail using one or more foldable mounts is performed using variations among the processes 1510-1580 as would be recognized by one of ordinary skill in the art. According to some embodiments, one or more of the processes 1520 and/or 1530 are optional.

At the process 1510, one or more foldable mounts 1300 are attached to a PV module 1410. For example, the PV module 1410 is the PV module 200. In another example, the one or more foldable mounts 1300 are attached to the PV module 1410 using the respective mounting flange 1310 of each of the one or more foldable mounts 1300. In yet another example, the one or more foldable mounts 1300 are attached to the PV module 1410 using one or more adhesive materials. In yet another example, the one or more adhesive materials form a flexible bond between the mounting flange 1310 of each of the one or more foldable mounts 1300 and the PV module 1410. In yet another example, the mounting flange 1310 of each of the one or more foldable mounts 1300 is attached to the PV module 1410 using bolts, screws, and/or other mechanical fasteners. In yet another example, one or more gaskets materials is placed on the PV module 1410 before each of the one or more foldable mounts 1300 is attached. In yet another example, the one or more foldable mounts 1300 are attached to the PV module 1410 using a predetermined pattern and spacing. In yet another example, the PV module 1410 is primed before each of the one or more foldable mounts 1300 is attached. In yet another example, the surface of the PV module 1410 is roughened before the one or more foldable mounts 1300 is attached. In yet another example, the surface of the PV module 1410 is chemically modified using an atmospheric corona discharge and/or an atmospheric plasma discharge. In yet another example, the process 1510 is performed in the factory. In yet another example, the process 1510 is performed in the field.

At the optional process 1520, the one or more foldable mounts 1300 are rotated for transport. For example, the one or more foldable mounts 1300 are rotated using the respective rotatable joint 1310 as shown in FIG. 13B. In another example, during the process 1520, each mounting rod 1330 of each of the one or more foldable mounts 1300 is rotated to provide as small a cross-sectional footprint as possible relative to the PV module 1410. In yet another example, each mounting rod 1320 of each of the one or more foldable mounts 1300 is rotated so that each mounting rod 1320 of each of the one or more foldable mounts 1300 is substantially parallel to the PV module.

At the optional process 1530, the PV module 1410 is transported to the installation site. For example, the PV module 1410 is placed in a crate and/or a rack for transportation. In another example, more than one PV module 1410 is placed in the same crate and/or rack for transportation, taking advantage of the small cross-sectional footprint made possible by the rotation of each of the foldable mounts 1300.

At the process 1540, the modular rail 1420 is formed. For example, the modular rail 1420 is the modular rail 100, and/or the modular rail 300. In another example, the modular rail 1420 is formed in-situ in the field using a slip-form extrusion machine. In yet another example, the extrusion speed of the slip-form extrusion machine is varied. In yet another example, the extrusion speed should be slow enough to produce one or more mounting surfaces which are substantially planar. In yet another example, the extrusion speed should be slow enough to produce the one or more mounting surfaces with a high planarity and little sagging to allow for uniformity in the PV module mounting system. In yet another example, if a large planarity variability in the one or more mounting surfaces could be allowed, a much higher extrusion speed of slip-form extrusion machine could be achieved, causing reduction of the construction cost of the finished rail. In yet another example, the modular rail 1420 is preformed in the factory and transported to the installation site.

At the process 1550, one or more holes 1430 are formed in to the modular rail 1420. For example, the one or more holes 1430 are the one or more holes 510. In yet another example, the one or more holes 1430 are arranged using the predetermined pattern and spacing for the one or more foldable mounts 1300 attached to the PV module 1410. In yet another example, the one or more holes 1430 are formed by using a hole punch tool. In yet another example, the hole punch tool is used with the slip-form extrusion machine. In yet another example, the one or more holes 1430 are formed before the modular rail 1420 has been allowed to cure. In yet another example, the one or more holes 1430 are formed by drilling a previously formed and cured modular rail 1420.

At the process 1560, one or more adhesive materials 1440 are placed into the one or more holes 1430. For example, the one or more adhesive materials 1440 are fast curing. In another example, the one or more adhesive materials 1440 partially fill the one or more holes 1430. In yet another example, the one or more adhesive materials 1440 substantially fill the one or more holes 1430. In yet another example, the one or more adhesive materials 1440 are placed in the one or more holes 1430 manually. In yet another example, the one or more adhesive materials 1440 are placed in the one or more holes 1430 using an automated robotic arm with one or more adhesive dispensers.

At the process 1570, the one or more foldable mounts 1300 are rotated for use. For example, the angle of the PV module 1410 relative to the sun is controlled through use of the rotatable joint 1320 of each of the one or more foldable mounts 1300. For example, each of the one or more foldable mounts 1300 is rotated at the respective rotatable joint 1320 to account for variations in the height of the modular rail 1420 and/or the desired angle of the PV module 1410 relative to the sun.

At the process 1580, the one or more foldable mounts 1300 are inserted into the one or more holes 1430. For example, the mounting rod 1330 of each of the one or more foldable mounts 1300 is are aligned with a respective one of the one or more holes 1430 and then inserted into the respective hole 1430. In another example, the one or more adhesive materials 1440 in the one or more holes 1430 form a rigid bond between the mounting rod 1330 of each of the one or more foldable mounts 1300 and the modular rail 1420. In yet another example, excess of the one or more adhesive materials 1440 is displaced from the top of one or more of the one or more holes 1430. In yet another example, the excess of the one or more adhesive materials 1440 displaced from the top of one or more of the one or more holes 1430 acts as a self-leveling mechanism that accounts for variations in the planarity of the one or more mounting surfaces of the modular rail 1420, the length of the mounting rod 1330 of each of the one or more foldable mounts 1300, and/or the depth of the one or more holes 1430.

Figure 16:
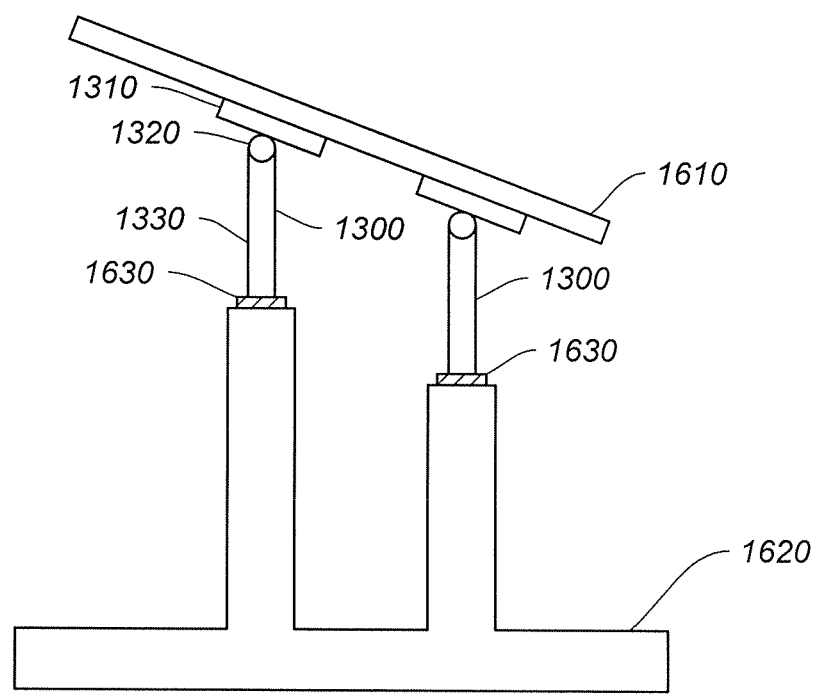
FIG. 16 is a simplified diagram showing a side view of a PV module mounting system using one or more foldable mounts according to another embodiment of the present invention.

FIG. 16 is a simplified diagram showing a side view of a PV module mounting system using one or more foldable mounts 1300 according to another embodiment of the present invention. This diagram is merely an example, which should not unduly limit the scope of the claims. One of ordinary skill in the art would recognize many variations, alternatives, and modifications. As shown in FIG. 16, a PV module 1610 is mounted to a modular rail 1620 using one or more foldable mounts 1300. For example, each of the one or more foldable mounts 1300 is attached to the PV module 1610 using a respective mounting flange 1310. For example, the mounting flange 1310 of each of the one or more foldable mounts 1300 is attached to the PV module 1610 using one or more adhesive materials. In yet another example, the one or more adhesive materials are fast curing. In yet another example, the one or more adhesive materials form a flexible bond between the mounting flange 1310 of each of the one or more foldable mounts 1300 and the PV module 1610. In yet another example, the one or more adhesive materials are each selected from a group consisting of silicone, organo-silane modified ethylene-vinyl acetate (EVA), organo-silane modified thermoplastic polyolefin (TPO), epoxy, organo-silane modified epoxy, polyurethane, polyacrylic, organo-silane modified polyurethane, organo-silane modified acrylic, polydimethylsiloxane (PDMS), poly (methyl-phenylsiloxane) (PMPS), ether-type polyurethane, ester-type polyurethane, poly(methyl methacrylate) (PMMA), and the like. In yet another example, the PV module 1610 is first primed with an organo-silane-containing primer and the one or more adhesive materials further include one or more general-purpose adhesive materials. In yet another example, the mounting flange 1310 of each of the one or more foldable mounts 1300 is attached to the PV module 1610 using bolts, screws, and/or other mechanical fasteners. In yet another example, one or more gasket materials are used between the mounting flange 1310 of each of the one or more foldable mounts 1300 and the PV module 1110. In yet another example, each of the one or more gasket materials is selected from a list consisting of ethylene propylene diene monomer (EPDM), UV-resistant rubber, and the like.

In yet another example, the modular rail 1620 is the modular rail 100 and/or the modular rail 300. In yet another example, the mounting rod 1330 of each of the one or more foldable mounts 1300 is attached to the modular rail 1620 using one or more adhesive materials 1630. In yet another example, the one or more adhesive materials 1630 are fast curing. In yet another example, the one or more adhesive materials 1630 form a rigid bond between the mounting rod 1330 of each of the one or more foldable mounts 1300 and the modular rail 1620. In yet another example, the one or more adhesive materials 1630 are each selected from a group consisting of silicone, ethylene-vinyl acetate (EVA), thermoplastic polyolefin (TPO), epoxy, polyurethane, polydimethylsiloxane (PDMS), poly(methyl-phenylsiloxane) (PMPS), ether-type polyurethane, ester-type polyurethane, poly(methyl methacrylate) (PMMA), and the like. In yet another example, the modular rail 1620 is first primed. In yet another example, the one or more adhesive materials 1630 are different from the one or more adhesive materials uses to attach the mounting flange 1310 of each of the one or more foldable mounts 1300 to the PV module 1610.

In yet another example, a cross-sectional area of the mounting rod 1330 of each of the one or more foldable mounts 1300 is selected to provide sufficient pull strength of the mounting system based on the wind loads to which the PV module 1610 is subjected. In yet another example, the cross-sectional area of the mounting rod 1330 of each of the one or more foldable mounts 1300 is selected to provide sufficient surface area between the mounting rod 1330 of each of the one or more foldable mounts 1300 and the modular rail 1620 to provide sufficient attachment strength between the mounting rod 1330 of each of the one or more foldable mounts 1300 to withstand the wind loads to which the PV module 1610 is subjected. In yet another example, the mounting rod 1330 of each of the one or more foldable mounts 1300 varies in cross-sectional area from 25 mm$^2$ to 30,000 mm$^2$. In yet another example, the mounting rod 1330 of each of the one or more foldable mounts 1300 varies in length from 25 mm to 250 mm.

As discussed above and further emphasized here, FIG. 16 is merely an example, which should not unduly limit the scope of the claims. One of ordinary skill in the art would recognize many variations, alternatives, and modifications. In some embodiments, the number of foldable mounts 1300 is varied. For example, the PV module 1610 is mounted to the modular rail 1620 using only one foldable mount 1300. In another example, four foldable mounts 1300 are used. In yet another example, six or more foldable mounts 1300 are used. In some embodiments, a different style of modular rail 1620 is used. For example, the mounting rod 1330 of each of the one or more foldable mounts 1300 is inserted into one of the one or more mounting surfaces 110 of the modular rail 100 as shown in FIG. 1. In another example, a mounting rod 1300 is inserted into one of the one or more mounting surfaces 110 and another mounting rod 1300 is inserted into another one of the one or more mounting surfaces 110.

Figure 17:
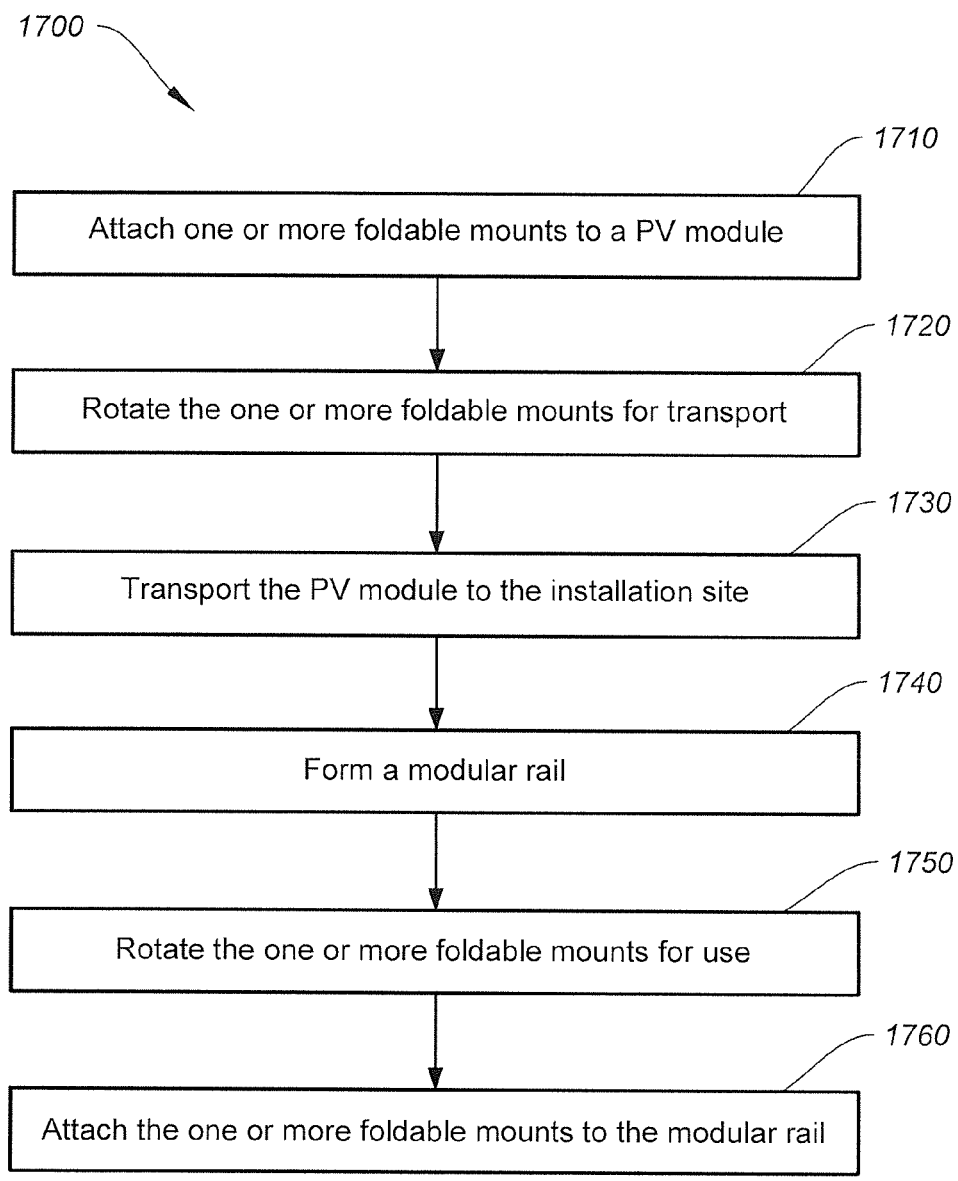
FIG. 17 is a simplified diagram showing a method of mounting a PV module to a modular rail using one or more foldable mounts according to another embodiment of the present invention.

FIG. 17 is a simplified diagram showing a method of mounting a PV module 1610 to a modular rail 1620 using one or more foldable mounts 1300 according to another embodiment of the present invention. This diagram is merely an example, which should not unduly limit the scope of the claims. One of ordinary skill in the art would recognize many variations, alternatives, and modifications. As shown in FIG. 17, the method 1700 includes a process 1710 for attaching one or more foldable mounts to a PV module, a process 1720 for rotating the one or more foldable mounts for transport, a process 1730 for transporting the PV module to the installation site, a process 1740 for forming a modular rail, a process 1750 for rotating the one or more foldable mounts for use, and a process 1760 for attaching one or more foldable mounts to the modular rail. According to certain embodiments, the method 1700 of method of mounting a PV module to a modular rail using one or more foldable mounts is performed using variations among the processes 1710-1760 as would be recognized by one of ordinary skill in the art. According to some embodiments, one or more of the processes 1720 and/or 1730 are optional.

At the process 1710, one or more foldable mounts 1300 are attached to a PV module 1610. For example, the PV module 1610 is the PV module 200. In another example, the one or more foldable mounts 1300 are attached to the PV module 1610 using the respective mounting flange 1310 of each of the one or more foldable mounts 1300. In yet another example, the one or more foldable mounts 1300 are attached to the PV module 1610 using one or more adhesive materials. In yet another example, the one or more adhesive materials form a flexible bond between the mounting flange 1310 of each of the one or more foldable mounts 1300 and the PV module 1610. In yet another example, the mounting flange 1310 of each of the one or more foldable mounts 1300 is attached to the PV module 1610 using bolts, screws, and/or other mechanical fasteners. In yet another example, one or more gasket materials is placed on the PV module 1610 before the mounting flange 1310 of each of the one or more foldable mounts 1300 is attached. In yet another example, the one or more foldable mounts 1300 are attached to the PV module 1610 using a predetermined pattern and spacing. In yet another example, the PV module 1610 is primed before each of the one or more foldable mounts 1300 is attached. In yet another example, the surface of the PV module 1610 is roughened before the one or more foldable mounts 1300 is attached. In yet another example, the surface of the PV module 1610 is chemically modified using an atmospheric corona discharge and/or an atmospheric plasma discharge. In yet another example, the process 1710 is performed in the factory. In yet another example, the process 1710 is performed in the field.

At the optional process 1720, the one or more foldable mounts 1300 are rotated for transport. For example, the one or more foldable mounts 1300 are rotated using the respective rotatable joint 1310 as shown in FIG. 13B. In another example, during the process 1720, each mounting rod 1330 of each of the one or more foldable mounts 1300 is rotated to provide as small a cross-sectional footprint as possible relative to the PV module 1610. In yet another example, each mounting rod 1320 of each of the foldable mounts 1300 is rotated so that each each mounting rod 1320 of each of the one or more foldable mounts 1300 is substantially parallel to the PV module.

At the optional process 1730, the PV module 1610 is transported to the installation site. For example, the PV module 1610 is placed in a crate and/or a rack for transportation. In another example, more than one PV module 1610 is placed in the same crate and/or rack for transportation, taking advantage of the small cross-sectional footprint made possible by the rotation of each of the foldable mounts 1300.

At the process 1740, the modular rail 1620 is formed. For example, the modular rail 1620 is the modular rail 100, and/or the modular rail 300. In another example, the modular rail 1620 is formed in-situ in the field using a slip-form extrusion machine. In yet another example, the extrusion speed of the slip-form extrusion machine is varied. In yet another example, the extrusion speed should be slow enough to produce one or more mounting surfaces which are substantially planar. In yet another example, the extrusion speed should be slow enough to produce the one or more mounting surfaces with a high planarity and little sagging to allow for uniformity in the PV module mounting system. In yet another example, if a large planarity variability in the one or more mounting surfaces could be allowed, a much higher extrusion speed of slip-form extrusion machine could be achieved, causing reduction of the construction cost of the finished rail. In yet another example, the modular rail 1620 is preformed in the factory and transported to the installation site.

At the process 1750, the one or more foldable mounts 1300 are rotated for use. For example, the angle of the PV module 1610 relative to the sun is controlled through use of the rotatable joint 1320 of each of the one or more foldable mounts 1300. For example, each of the one or more foldable mounts 1300 is rotated at the respective rotatable joint 1320 to account for variations in the height of the modular rail 1620 and/or the desired angle of the PV module 1610 relative to the sun.

At the process 1760, the one or more foldable mounts 1300 are attached to the modular rail 1620. For example, the mounting rod 1330 of each of the one or more foldable mounts 1300 is attached to the modular rail 1620 using one or more adhesive materials 1630. In another example, the one or more adhesive materials 1630 form a rigid bond between the mounting rod 1330 of each of the one or more foldable mounts 1300 and the modular rail 1620. In yet another example, the mounting surface of the modular rail 1620 is roughened before the one or more foldable mounts 1300 is attached.

Figure 18:
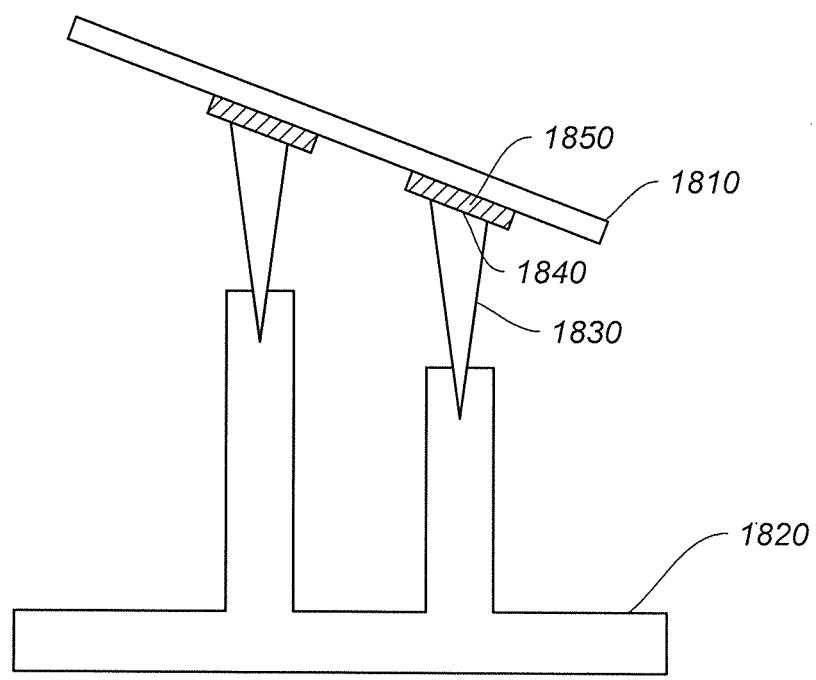
FIG. 18 is a simplified diagram showing a side view of a PV module mounting system using one or more angled mounts according to one embodiment of the present invention.

FIG. 18 is a simplified diagram showing a side view of a PV module mounting system using one or more angled mounts according to one embodiment of the present invention. This diagram is merely an example, which should not unduly limit the scope of the claims. One of ordinary skill in the art would recognize many variations, alternatives, and modifications. As shown in FIG. 18, a PV module 1810 is mounted to a modular rail 1820 using one or more angled mounts 1830. For example, each of the one or more angled mounts 1830 is attached to the PV module 1810 using a respective mounting face 1840. In another example, each of the one or more angled mounts 1830 varies in length from 0.25 cm to 50 cm. In yet another example, each mounting face 1840 of each of the one or more angled mounts 1830 is attached to the PV module 1810 using one or more adhesive materials 1850. In yet another example, the one or more adhesive materials 1850 are fast curing. In yet another example, the one or more adhesive materials 1850 form a flexible bond between the mounting face 1840 of each of the one or more angled mounts 1830 and the PV module 1810. In yet another example, the one or more adhesive materials 1850 are each selected from a group consisting of silicone, organo-silane modified ethylene-vinyl acetate (EVA), organo-silane modified thermoplastic polyolefin (TPO), epoxy, organo-silane modified epoxy, polyurethane, polyacrylic, organo-silane modified polyurethane, organo-silane modified acrylic, polydimethylsiloxane (PDMS), poly(methyl-phenylsiloxane) (PMPS), ether-type polyurethane, ester-type polyurethane, poly(methyl methacrylate) (PMMA), and the like. In yet another example, the PV module 1810 is first primed with an organo-silane-containing primer and the one or more adhesive materials 1850 further include one or more general-purpose adhesive materials.

In yet another example, each of the one or more angled mounts 1830 (e.g., a mounting post end distal to the mounting face 1840) is shaped like a wedge. In yet another example, each of the one or more angled mounts 1830 is shaped like a cone. In yet another example, each of the one or more angled mounts 1830 is shaped like an arrow head. In yet another example, each of the one or more angled mounts 1830 is shaped like a spear head. In yet another example, each of the one or more angled mounts 1830 includes one or more barbs. In yet another example, each of the one or more angled mounts 1830 includes one or more ribs. In yet another example, each of the one or more angled mounts 1830 includes one or more materials. In yet another example, each of the one or more angled mounts 1830 is flexible. In yet another example, each of the one or more angled mounts 1830 is sufficiently stiff to support part of the weight of a PV module. In yet another example, the one or more materials are selected from a group consisting of polyvinyl chloride (PVC), chlorinated polyvinyl chloride (CPVC), high-density polyethylene (HDPE), low-density polyethylene (LDPE), polypropylene (PP), poly(ethylene terephthalate) (PET), polycarbonate (PC), polyamide (PA), poly(methyl methacrylate) (PMMA), polyoxymethylene (POM), polyphenylene oxide (PPO), polyphenylene sulfide (PPS), polysulphone (PSU), polystyrene-butadiene-styrene (SBS), ethylene propylene diene monomer (EPDM), poly (ethylene terephthalate) (Rynite), polyphenylene ether (PPE) modified by polystyrene (PS) or polyamide (PA) (Xyron), acrylonitrile butadiene styrene (ABS), polyphenylene oxide (PPO) blended with polystyrene (PS) (Noryl), engineering polymers, non-engineering plastics, polyolefins, elastomeric polymers, hot-dipped zinc-coated steel, anodized aluminum, powder-coated metal, painted metal, polymeric over molded metal, polymer over extruded metal, and the like. In yet another example, each of the one or more angled mounts 1830 is coated with a non-conductive coating.

In yet another example, the modular rail 1820 is the modular rail 100 and/or the modular rail 300. In yet another example, each of the one or more angled mounts 1830 is inserted into the modular rail 1820. In yet another example, each of the one or more angled mounts 1830 is inserted into the modular rail 1820 to a depth between 5 mm and 500 mm.

According to some embodiments, the angle of the PV module 1810 relative to the sun is controlled through use of the one or more angled mounts 1830. For example, the angled face 1840 of each of the one or more angled mounts 1830 is angled relative to a direction of the rest of the respective one or more angled mounts 1830 to control the mounting angle of the PV module 1810. In another example, the angled face 1840 of each of the one or more angled mounts 1830 is not perpendicular to the direction of the rest of the respective one or more angled mounts. In yet another example, the depth to which the one or more angled mounts 1830 is inserted into the modular rail 1820 is adjusted to account for variations in the height of the modular rail 1820 and/or the desired angle of the PV module 1810 relative to the sun. In yet another example, a length and a size of the one or more angled mounts 1830 is selected to provide sufficient pull strength for the mounting system based on the wind loads to which the PV module 1810 is subjected.

As discussed above and further emphasized here, FIG. 18 is merely an example, which should not unduly limit the scope of the claims. One of ordinary skill in the art would recognize many variations, alternatives, and modifications. In some embodiments, the number of angled mounts 1830 is varied. For example, the PV module 1810 is mounted to the modular rail 1820 using only one angled mount 1830. In another example, four angled mounts 1830 are used. In yet another example, six or more angled mounts 1830 are used. In some embodiments, a different style of modular rail 1820 is used. For example, the insertable end 1830 of each of the one or more angled mounts 1830 is inserted into the mounting surface 310 of the modular rail 300 as shown in FIG. 3.

Figure 19:
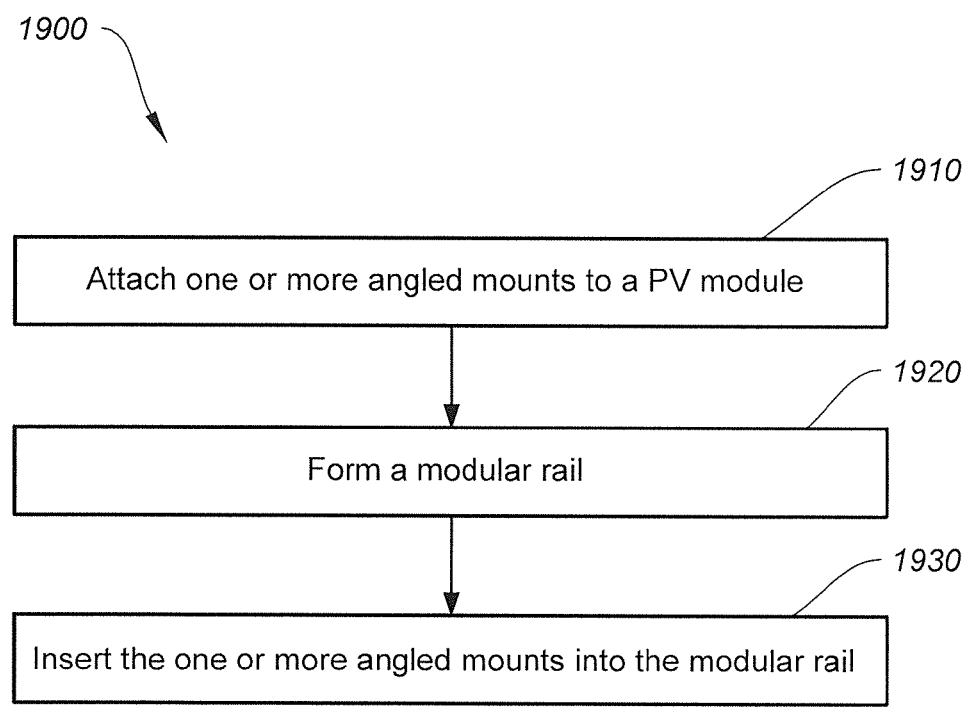
FIG. 19 is a simplified diagram showing a method of mounting a PV module to a modular rail using one or more angled mounts according to one embodiment of the present invention.

FIG. 19 is a simplified diagram showing a method of mounting a PV module 1810 to a modular rail 1820 using one or more angled mounts 1830 according to one embodiment of the present invention. This diagram is merely an example, which should not unduly limit the scope of the claims. One of ordinary skill in the art would recognize many variations, alternatives, and modifications. As shown in FIG. 19, the method 1900 includes a process 1910 for attaching one or more angled mounts to a PV module, a process 1920 for forming a modular rail, and a process 1930 for inserting the one or more foldable mounts into the modular rail. According to certain embodiments, the method 1900 of mounting a PV module to a modular rail using one or more angled mounts is performed using variations among the processes 1910-1930 as would be recognized by one of ordinary skill in the art.

At the process 1910, one or more angled mounts 1830 are attached to a PV module 1810. For example, the PV module 1810 is the PV module 200. In another example, the one or more angled mounts 1830 are attached to the PV module 1810 using the respective mounting face 1840 of the one or more angled mounts 1830. In yet another example, the one or more angled mounts 1830 are attached to the PV module 1810 using one or more adhesive materials 1840. In yet another example, the one or more adhesive materials 1840 form a flexible bond between the mounting face 1840 of each of the one or more angled mounts 1830 and the PV module 1810. In yet another example, each of the one or more angled mounts 1830 is selected to have a same angle between the mounting face 1840 and the respective one or more angled mounts 1830. In yet another example, the same angle is selected to control the angle between the PV module 1810 and the sun. In yet another example, the one or more angled mounts 1830 are attached to the PV module 1810 using a predetermined pattern and spacing. In yet another example, the PV module 1810 is primed before each of the one or more angled mounts 1830 is attached. In yet another example, the surface of the PV module 1810 is roughened before the one or more foldable mounts 1830 is attached. In yet another example, the surface of the PV module 1810 is chemically modified using an atmospheric corona discharge and/or an atmospheric plasma discharge. In yet another example, the process 1910 is performed in the factory. In yet another example, the process 1910 is performed in the field.

At the process 1920, the modular rail 1820 is formed. For example, the modular rail 1820 is the modular rail 100, and/or the modular rail 300. In another example, the modular rail 1820 is formed in-situ in the field using a slip-form extrusion machine. In yet another example, the extrusion speed of the slip-form extrusion machine is varied. In yet another example, the extrusion speed should be slow enough to produce one or more mounting surfaces which are substantially planar. In yet another example, the extrusion speed should be slow enough to produce the one or more mounting surfaces with a high planarity and little sagging to allow for uniformity in the PV module mounting system. In yet another example, if a large planarity variability in the one or more mounting surfaces could be allowed, a much higher extrusion speed of slip-form extrusion machine could be achieved, causing reduction of the construction cost of the finished rail. In yet another example, the modular rail 1820 is preformed in the factory and transported to the installation site.

At the process 1930, the one or more angled mounts 1830 are inserted into the modular rail 1820. For example, the process 1930 occurs before the modular rail 1820 is substantially cured. In yet another example, the process 1930 is controlled so that the depth to which the one or more angled mounts 1830 is inserted into the modular rail 1820 is adjusted to account for variations in the height of the modular rail 1820 and/or the desired angle of the PV module 1810 relative to the sun. In yet another example, the process 1930 is controlled so that the one or more angled mounts 1830 is inserted a suitable distance into the modular rail 1820 so that after the modular rail 1820 substantially cures, the one or more angled mounts 1830 provide sufficient pull strength to account for the wind loads to which the PV module 1810 is subjected.

Figure 20:
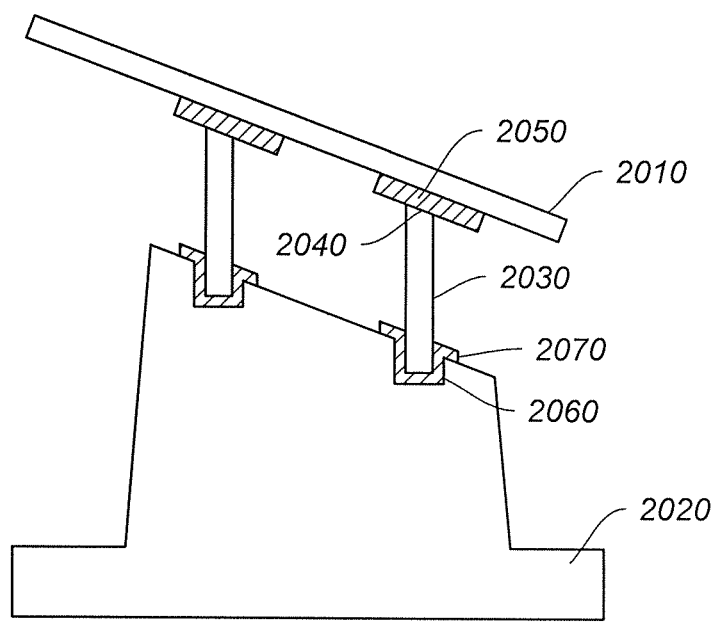
FIG. 20 is a simplified diagram showing a side view of a PV module mounting system using one or more angled mounts according to another embodiment of the present invention.

FIG. 20 is a simplified diagram showing a side view of a PV module mounting system using one or more angled mounts according to another embodiment of the present invention. This diagram is merely an example, which should not unduly limit the scope of the claims. One of ordinary skill in the art would recognize many variations, alternatives, and modifications. As shown in FIG. 20, a PV module 2010 is mounted to a modular rail 2020 using one or more angled mounts 2030. For example, each of the one or more angled mounts 2030 is attached to the PV module 2010 using a respective mounting face 2040. In another example, each of the one or more angled mounts 2030 varies in length from 0.25 cm to 50 cm. In yet another example, each mounting face 2040 of each of the one or more angled mounts 2030 is attached to the PV module 2010 using one or more adhesive materials 2050. In yet another example, the one or more adhesive materials 2050 are fast curing. In yet another example, the one or more adhesive materials 2050 form a flexible bond between the mounting face 2040 of each of the one or more angled mounts 2030 and the PV module 2010. In yet another example, the one or more adhesive materials 2050 are each selected from a group consisting of silicone, organo-silane modified ethylene-vinyl acetate (EVA), organo-silane modified thermoplastic polyolefin (TPO), epoxy, organo-silane modified epoxy, polyurethane, polyacrylic, organo-silane modified polyurethane, organo-silane modified acrylic, polydimethylsiloxane (PDMS), poly(methyl-phenylsiloxane) (PMPS), ether-type polyurethane, ester-type polyurethane, poly(methyl methacrylate) (PMMA), and the like. In yet another example, the PV module 2010 is primed with an organo-silane-containing primer and the one or more adhesive materials 2050 further include one or more general-purpose adhesive materials.

In yet another example, each of the one or more angled mounts 2030 includes one or more materials. In yet another example, each of the one or more angled mounts 2030 is flexible. In yet another example, each of the one or more angled mounts 2030 is sufficiently stiff to support part of the weight of a PV module. In yet another example, the one or more materials are selected from a group consisting of polyvinyl chloride (PVC), chlorinated polyvinyl chloride (CPVC), high-density polyethylene (HDPE), low-density polyethylene (LDPE), polypropylene (PP), poly(ethylene terephthalate) (PET), polycarbonate (PC), polyamide (PA), poly(methyl methacrylate) (PMMA), polyoxymethylene (POM), polyphenylene oxide (PPO), polyphenylene sulfide (PPS), polysulphone (PSU), polystyrene-butadiene-styrene (SBS), ethylene propylene diene monomer (EPDM), poly (ethylene terephthalate) (Rynite), polyphenylene ether (PPE) modified by polystyrene (PS) or polyamide (PA) (Xyron), acrylonitrile butadiene styrene (ABS), polyphenylene oxide (PPO) blended with polystyrene (PS) (Noryl), engineering polymers, non-engineering plastics, polyolefins, elastomeric polymers, hot-dipped zinc-coated steel, anodized aluminum, powder-coated metal, painted metal, polymeric over molded metal, polymer over extruded metal, and the like. In yet another example, each of the one or more angled mounts 2030 is coated with a non-conductive coating.

In yet another example, the modular rail 2020 is the modular rail 100 and/or the modular rail 300. In yet another example, the modular rail 2020 includes one or more holes 2060. In yet another example, the one or more holes 2060 substantially line up with the one or more angled mounts 2030. In yet another example, each of the one or more angled mounts 2030 is placed into a respective hole 2060 in the modular rail 2020. In yet another example, each of the one or more angled mounts 2030 is held in place in the respective hole 2060 using one or more adhesive materials 2070. In yet another example, the one or more adhesive materials 2070 are fast curing. In yet another example, the one or more adhesive materials 2070 form a rigid, bond between each of the one or more angled mounts 2030 and the modular rail 2020. In yet another example, the one or more adhesive materials 2070 are each selected from a group consisting of silicone, ethylene-vinyl acetate (EVA), thermoplastic polyolefin (TPO), epoxy, polyurethane, polydimethylsiloxane (PDMS), poly(methyl-phenylsiloxane) (PMPS), ether-type polyurethane, ester-type polyurethane, poly(methyl methacrylate) (PMMA), and the like. In yet another example, the modular rail 2020 is first primed. In yet another example, the one or more adhesive materials 2070 are different from the one or more adhesive materials 2050. In yet another example, excess of the one or more adhesive materials 2070 is displaced from the top of the one or more holes 2060. In yet another example, the excess of the one or more adhesive materials 2070 displaced from the top of the one or more holes 2060 acts as a self-leveling mechanism that accounts for variations in the planarity of the one or more mounting surfaces of the modular rail 2020, the length of each of the one or more angled mounts 2030, and/or the depth of the one or more holes 2060.

In yet another example, a cross-sectional area of each of the one or more angled mounts 2030 is selected to provide sufficient pull strength of the mounting system based on the wind loads to which the PV module 2010 is subjected. In yet another example, the cross-sectional area of each of the one or more angled mounts 2030 is selected to provide sufficient surface area between each of the one or more angled mounts 2030 and the PV module 2010 and/or the modular rail 2020 to provide sufficient attachment strength between each of the one or more angled mounts 2030 to withstand the wind loads to which the PV module 2010 is subjected. In yet another example, each of the one or more angled mounts 2030 varies in cross-sectional area from 25 mm² to 30,000 mm². In yet another example, each of the one or more angled mounts 2030 varies in length from 25 mm to 250 mm.

As discussed above and further emphasized here, FIG. 20 is merely an example, which should not unduly limit the scope of the claims. One of ordinary skill in the art would recognize many variations, alternatives, and modifications. In some embodiments, the number of holes 2060 and corresponding angled mounts 2030 is varied. For example, the PV module 2010 is mounted to the modular rail 2020 using only one hole 2060 and one angled mount 2030. In another example, four holes 2060 and four corresponding angled mounts 2030 are used. In yet another example, six or more holes 2060 and six or more corresponding angled mounts 2030 are used. In some embodiments, a different style of modular rail 2020 is used. For example, each of the one or more angled mounts 2030 is inserted into one of the one or more mounting surfaces 110 of the modular rail 100 as shown in FIG. 1. In another example, an angled mount 2030 is inserted into one of the one or more mounting surfaces 110 and another angled mount 2030 is inserted into another one of the one or more mounting surfaces 110.

Figure 21:
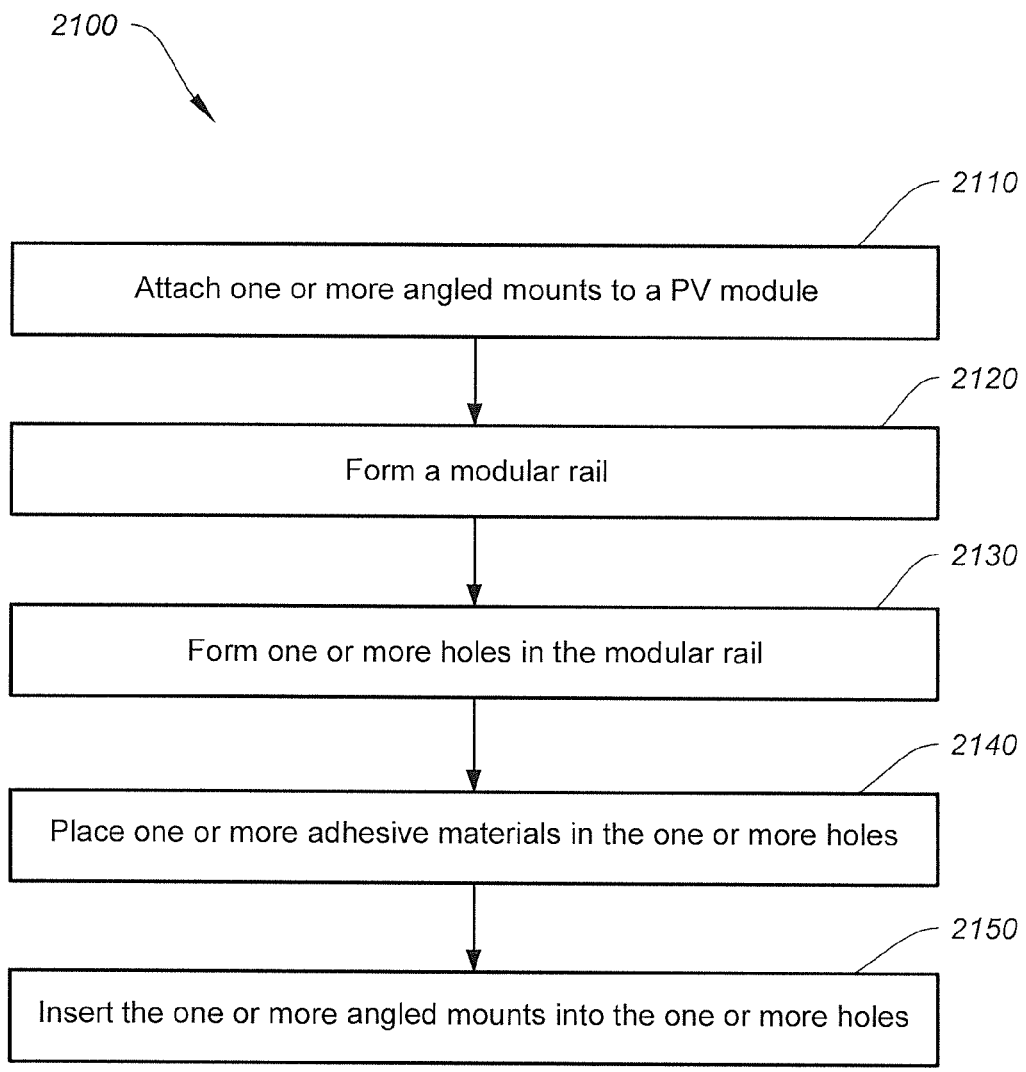
FIG. 21 is a simplified diagram showing a method of mounting a PV module to a modular rail using one or more angled mounts according to another embodiment of the present invention.

FIG. 21 is a simplified diagram showing a method of mounting a PV module 2010 to a modular rail 2020 using one or more angled mounts 2030 according to another embodiment of the present invention. This diagram is merely an example, which should not unduly limit the scope of the claims. One of ordinary skill in the art would recognize many variations, alternatives, and modifications. As shown in FIG. 21, the method 2100 includes a process 2110 for attaching one or more angled mounts to a PV module, a process 2120 for forming a modular rail, a process 2130 for forming one or more holes in the modular rail, a process 2140 for placing one or more adhesive materials in the one or more holes, and a process 2150 for inserting one or more angled mounts into the one or more holes. According to certain embodiments, the method 2100 of method of mounting a PV module to a modular rail using one or more angled mounts is performed using variations among the processes 2110-2150 as would be recognized by one of ordinary skill in the art.

At the process 2110, one or more angled mounts 2030 are attached to a PV module 2010. For example, the PV module 2010 is the PV module 200. In another example, the one or more angled mounts 2030 are attached to the PV module 2010 using the respective mounting face 2040 of the one or more angled mounts 2030. In yet another example, the one or more angled mounts 2030 are attached to the PV module 2010 using one or more adhesive materials 2040. In yet another example, the one or more adhesive materials 2040 form a flexible bond between the mounting face 2040 of each of the one or more angled mounts 2030 and the PV module 2010. In yet another example, each of the one or more angled mounts 2030 is selected to have a same angle between the mounting face 2040 and the respective one or more angled mounts 2030. In yet another example, the same angle is selected to control the angle between the PV module 2010 and the sun. In yet another example, the one or more angled mounts 2030 are attached to the PV module 2010 using a predetermined pattern and spacing. In yet another example, the PV module 2010 is primed before each of the one or more angled mounts 2030 is attached. In yet another example, the surface of the PV module 2010 is roughened before the one or more foldable mounts 2030 is attached. In yet another example, the surface of the PV module 1210 is chemically modified using an atmospheric corona discharge and/or an atmospheric plasma discharge. In yet another example, the process 2110 is performed in the factory. In yet another example, the process 2110 is performed in the field.

At the process 2120, the modular rail 2020 is formed. For example, the modular rail 2020 is the modular rail 100, and/or the modular rail 300. In another example, the modular rail 2020 is formed in-situ in the field using a slip-form extrusion machine. In yet another example, the extrusion speed of the slip-form extrusion machine is varied. In yet another example, the extrusion speed should be slow enough to produce one or more mounting surfaces which are substantially planar. In yet another example, the extrusion speed should be slow enough to produce the one or more mounting surfaces with a high planarity and little sagging to allow for uniformity in the PV module mounting system. In yet another example, if a large planarity variability in the one or more mounting surfaces could be allowed, a much higher extrusion speed of slip-form extrusion machine could be achieved, causing reduction of the construction cost of the finished rail. In yet another example, the modular rail 2020 is preformed in the factory and transported to the installation site.

At the process 2130, one or more holes 2060 are formed in to the modular rail 2020. For example, the one or more holes 2060 are the one or more holes 510. In another example, the one or more holes 2060 are arranged using the predetermined pattern and spacing for the one or more angled mounts 2060 attached to the PV module 2010. In yet another example, the one or more holes 2060 are formed by using a hole punch tool. In yet another example, the hole punch tool is used with the slip-form extrusion machine. In yet another example, the one or more holes 2060 are formed before the modular rail 2020 has been allowed to cure. In yet another example, the one or more holes 2060 are formed by drilling a previously formed and cured modular rail 2020.

At the process 2140, one or more adhesive materials 2070 are placed into the one or more holes 2060. For example, the one or more adhesive materials 2070 are fast curing. In another example, the one or more adhesive materials 2070 partially fill the one or more holes 2060. In yet another example, the one or more adhesive materials 2070 substantially fill the one or more holes 2060. In yet another example, the one or more adhesive materials 2070 are placed in the one or more holes 2060 manually. In yet another example, the one or more adhesive materials 2070 are placed in the one or more holes 2060 using an automated robotic arm with one or more adhesive dispensers.

At the process 2150, the one or more angled mounts 2030 are inserted into the one or more holes 2060. For example, the mounting rod 1330 of each of the one or more angled mounts 2030 is are aligned with a respective one of the one or more holes 2060 and then inserted into the respective hole 2060. In another example, the one or more adhesive materials 2070 in the one or more holes 2060 form a rigid bond between the mounting rod 1330 of each of the one or more angled mounts 2030 and the modular rail 2020. In yet another example, excess of the one or more adhesive materials 2070 is displaced from the top of one or more of the one or more holes 2060. In yet another example, the excess of the one or more adhesive materials 2070 displaced from the top of one or more of the one or more holes 2060 acts as a self-leveling mechanism that accounts for variations in the planarity of the one or more mounting surfaces of the modular rail 2020, the length of the mounting rod 1330 of each of the one or more angled mounts 2030, and/or the depth of the one or more holes 2060.

Figure 22:
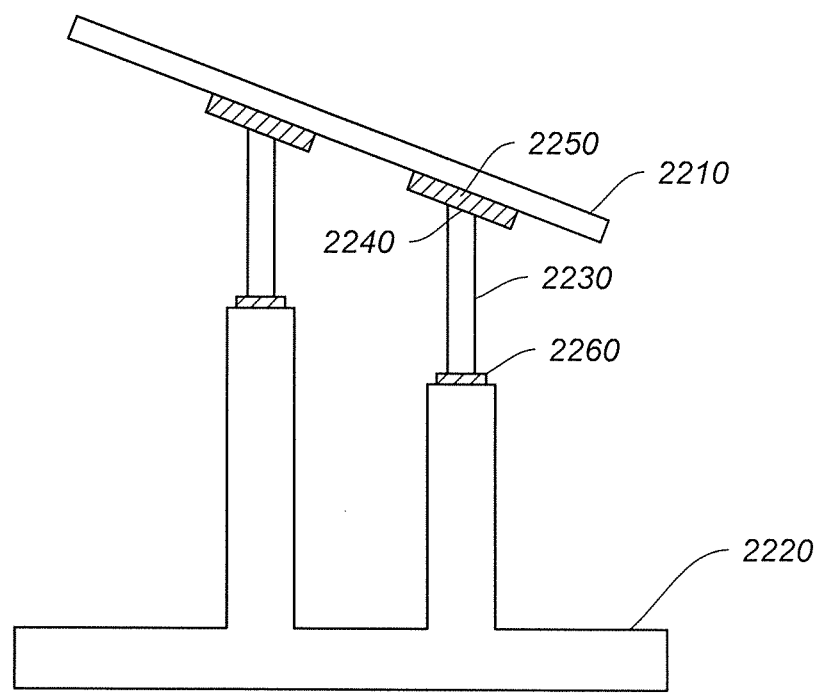
FIG. 22 is a simplified diagram showing a side view of a PV module mounting system using one or more angled mounts according to another embodiment of the present invention.

FIG. 22 is a simplified diagram showing a side view of a PV module mounting system using one or more angled mounts according to another embodiment of the present invention. This diagram is merely an example, which should not unduly limit the scope of the claims. One of ordinary skill in the art would recognize many variations, alternatives, and modifications. As shown in FIG. 22, a PV module 2210 is mounted to a modular rail 2220 using one or more angled mounts 2230. For example, each of the one or more angled mounts 2230 is the angled mount 2030. In another example, each of the one or more angled mounts 2230 is attached to the PV module 2210 using a respective mounting face 2240. In yet another example, each of the one or more angled mounts 2230 varies in length from 0.25 cm to 50 cm.

In yet another example, the mounting face 2240 of each of the one or more angled mounts 2230 is attached to the PV module 2210 using one or more adhesive materials 2250. In yet another example, the one or more adhesive materials 2250 are fast curing. In yet another example, the one or more adhesive materials 2250 form a flexible bond between the mounting face 2240 of each of the one or more angled mounts 2230 and the PV module 2210. In yet another example, the one or more adhesive materials 2250 are each selected from a group consisting of silicone, organo-silane modified ethylene-vinyl acetate (EVA), organo-silane modified thermoplastic polyolefin (TPO), epoxy, organo-silane modified epoxy, polyurethane, polyacrylic, organo-silane modified polyurethane, organo-silane modified acrylic, polydimethylsiloxane (PDMS), poly(methyl-phenylsiloxane) (PMPS), ether-type polyurethane, ester-type polyurethane, poly(methyl methacrylate) (PMMA), and the like. In yet another example, the PV module 2210 is first primed with an organo-silane-containing primer and the one or more adhesive materials 2250 further include one or more general-purpose adhesive materials.

In yet another example, each of the one or more angled mounts 2230 includes one or more materials. In yet another example, each of the one or more angled mounts 2230 is flexible. In yet another example, each of the one or more angled mounts 2230 is sufficiently stiff to support part of the weight of a PV module. In yet another example, the one or more materials are selected from a group consisting of polyvinyl chloride (PVC), chlorinated polyvinyl chloride (CPVC), high-density polyethylene (HDPE), low-density polyethylene (LDPE), polypropylene (PP), poly(ethylene terephthalate) (PET), polycarbonate (PC), polyamide (PA), poly(methyl methacrylate) (PMMA), polyoxymethylene (POM), polyphenylene oxide (PPO), polyphenylene sulfide (PPS), polysulphone (PSU), polystyrene-butadiene-styrene (SBS), ethylene propylene diene monomer (EPDM), poly (ethylene terephthalate) (Rynite), polyphenylene ether (PPE) modified by polystyrene (PS) or polyamide (PA) (Xyron), acrylonitrile butadiene styrene (ABS), polyphenylene oxide (PPO) blended with polystyrene (PS) (Noryl), engineering polymers, non-engineering plastics, polyolefins, elastomeric polymers, hot-dipped zinc-coated steel, anodized aluminum, powder-coated metal, painted metal, polymeric over molded metal, polymer over extruded metal, and the like. In yet another example, each of the one or more angled mounts 2230 is coated with a non-conductive coating.

In yet another example, the modular rail 2220 is the modular rail 100 and/or the modular rail 300. In yet another example, each of the one or more angled mounts 2230 is attached to the modular rail 2220 using one or more adhesive materials 2260. In yet another example, the one or more adhesive materials 2260 are fast curing. In yet another example, the one or more adhesive materials 2260 form a rigid bond between each of the one or more angled mounts 2230 and the modular rail 2220. In yet another example, the one or more adhesive materials 2260 are each selected from a group consisting of silicone, ethylene-vinyl acetate (EVA), thermoplastic polyolefin (TPO), epoxy, polyurethane, polydimethylsiloxane (PDMS), poly(methyl-phenylsiloxane) (PMPS), ether-type polyurethane, ester-type polyurethane, poly(methyl methacrylate) (PMMA), and the like. In yet another example, the modular rail 2220 is first primed. In yet another example, the one or more adhesive materials 2260 are different from the one or more adhesive materials 2250.

In yet another example, a cross-sectional area of each of the one or more angled mounts 2230 is selected to provide sufficient pull strength of the mounting system based on the wind loads to which the PV module 2210 is subjected. In yet another example, the cross-sectional area of each of the one or more angled mounts 2230 is selected to provide sufficient surface area between the each of the one or more angled mounts 2230 and the PV module 2210 and/or the modular rail 2220 to provide sufficient attachment strength to withstand the wind loads to which the PV module 2210 is subjected. In yet another example, each of the one or more angled mounts 2230 varies in cross-sectional area from 25 mm$^2$ to 30,000 mm$^2$. In yet another example, each of the one or more angled mounts 2230 varies in length from 25 mm to 250 mm.

According to some embodiments, the angle of the PV module 2210 relative to the sun is controlled through use of the one or more angled mounts 2230. For example, the angled face 2240 of each of the one or more angled mounts 2230 is angled relative to the rest of the respective one or more angled mounts to control the mounting angle of the PV module 2210. In yet another example, a size of the one or more angled mounts 2230 is selected to provide sufficient pull strength for the mounting system based on the wind loads to which the PV module 2210 is subjected.

As discussed above and further emphasized here, FIG. 22 is merely an example, which should not unduly limit the scope of the claims. One of ordinary skill in the art would recognize many variations, alternatives, and modifications. In some embodiments, the number of angled mounts 2230 is varied. For example, the PV module 2210 is mounted to the modular rail 2220 using only one angled mount 2230. In another example, four angled mounts 2230 are used. In yet another example, six or more angled mounts 2230 are used. In some embodiments, a different style of modular rail 2220 is used. For example, each of the one or more angled mounts 2230 is inserted into the mounting surface 310 of the modular rail 300 as shown in FIG. 3.

Figure 23:
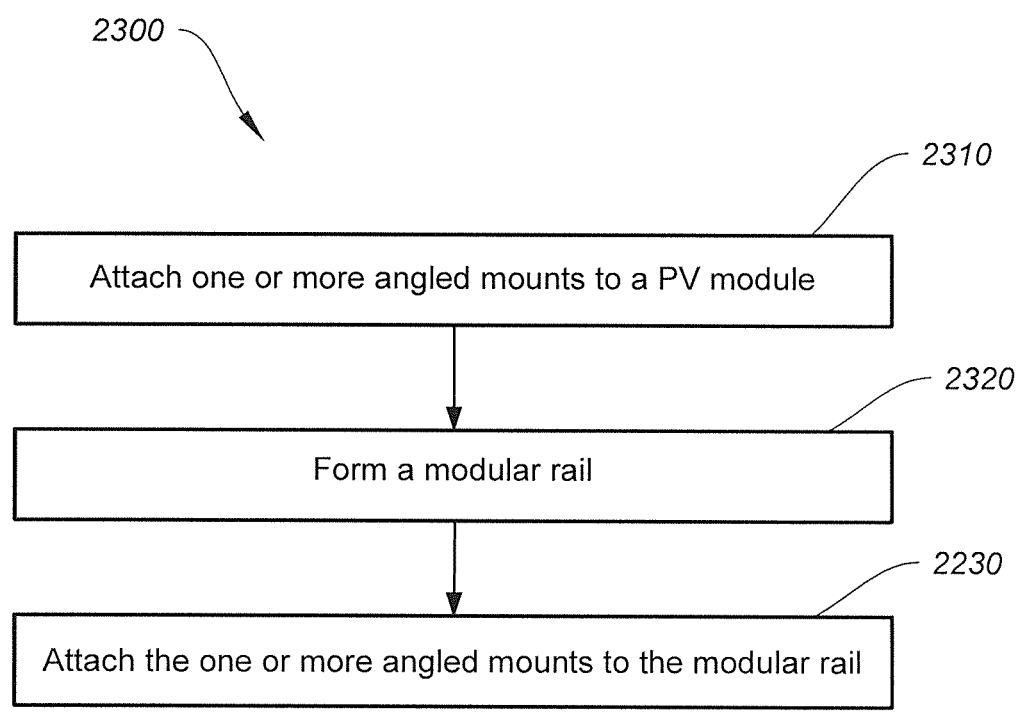
FIG. 23 is a simplified diagram showing a method of mounting a PV module to a modular rail using one or more angled mounts according to another embodiment of the present invention.

FIG. 23 is a simplified diagram showing a method of mounting a PV module 2210 to a modular rail 2220 using one or more angled mounts 2230 according to another embodiment of the present invention. This diagram is merely an example, which should not unduly limit the scope of the claims. One of ordinary skill in the art would recognize many variations, alternatives, and modifications. As shown in FIG. 23, the method 2300 includes a process 2310 for attaching one or more angled mounts to a PV module, a process 2320 for forming a modular rail, and a process 2330 for attaching one or more angled mounts to the modular rail. According to certain embodiments, the method 2300 of method of mounting a PV module to a modular rail using one or more angled mounts is performed using variations among the processes 2310-2330 as would be recognized by one of ordinary skill in the art.

At the process 2310, one or more angled mounts 2230 are attached to a PV module 2210. For example, the PV module 2210 is the PV module 200. In another example, the one or more angled mounts 2230 are attached to the PV module 2210 using the respective mounting face 2240 of the one or more angled mounts 2230. In yet another example, the one or more angled mounts 2230 are attached to the PV module 2210 using one or more adhesive materials 2240. In yet another example, the one or more adhesive materials 2240 form a flexible bond between the mounting face 2240 of each of the one or more angled mounts 2230 and the PV module 2210. In yet another example, each of the one or more angled mounts 2230 is selected to have a same angle between the mounting face 2240 and the respective one or more angled mounts 2230. In yet another example, the same angle is selected to control the angle between the PV module 2210 and the sun. In yet another example, the one or more angled mounts 2230 are attached to the PV module 2210 using a predetermined pattern and spacing. In yet another example, the PV module 2210 is primed before each of the one or more angled mounts 2230 is attached. In yet another example, the surface of the PV module 2210 is roughened before the one or more angled mounts 2230 is attached. In yet another example, the surface of the PV module 1210 is chemically modified using an atmospheric corona discharge and/or an atmospheric plasma discharge. In yet another example, the process 2310 is performed in the factory. In yet another example, the process 2310 is performed in the field.

At the process 2320, the modular rail 2220 is formed. For example, the modular rail 2220 is the modular rail 100, and/or the modular rail 300. In another example, the modular rail 2220 is formed in-situ in the field using a slip-form extrusion machine. In yet another example, the extrusion speed of the slip-form extrusion machine is varied. In yet another example, the extrusion speed should be slow enough to produce one or more mounting surfaces which are substantially planar. In yet another example, the extrusion speed should be slow enough to produce the one or more mounting surfaces with a high planarity and little sagging to allow for uniformity in the PV module mounting system. In yet another example, if a large planarity variability in the one or more mounting surfaces could be allowed, a much higher extrusion speed of slip-form extrusion machine could be achieved, causing reduction of the construction cost of the finished rail. In yet another example, the modular rail 2220 is preformed in the factory and transported to the installation site.

At the process 2330, the one or more angled mounts 2230 are attached to the modular rail 2220. For example, each of the one or more angled mounts 2230 is attached to the modular rail 2220 using one or more adhesive materials 2260. In another example, the one or more adhesive materials 2260 form a rigid bond between each of the one or more angled mounts 2230 and the modular rail 2220. In yet another example, the mounting surface of the modular rail 2220 is roughened before the one or more angled mounts 2230 is attached.

Figure 24A:
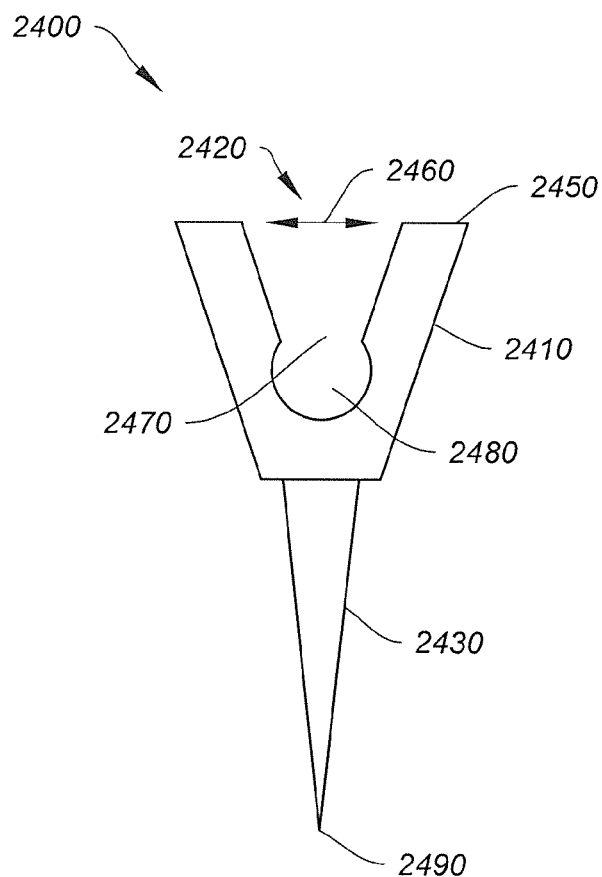
FIGS. 24A and 24B are simplified diagrams showing two views of a notched mount as used in a PV module mounting system according to certain embodiments of the present invention.
Figure 24B:
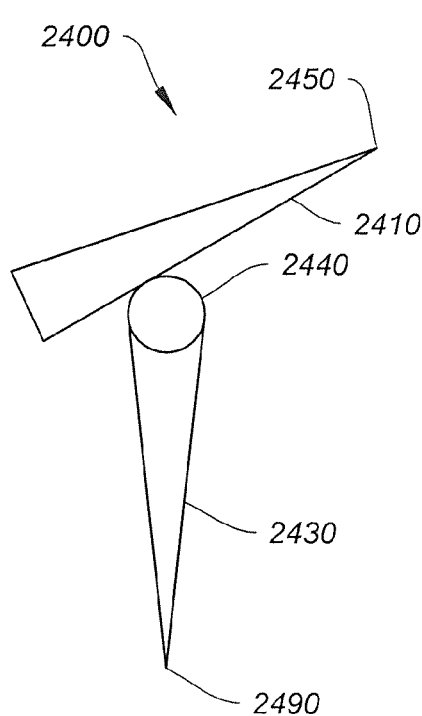

FIGS. 24A and 24B are simplified diagrams showing two views of a notched mount as used in a PV module mounting system according to certain embodiments of the present invention. These diagrams are merely an example, which should not unduly limit the scope of the claims. One of ordinary skill in the art would recognize many variations, alternatives, and modifications. As shown in FIGS. 24A and 24B, the notched mount 2400 includes a mounting flange 2410. For example, the mounting flange 2410 includes a receiving notch 2420. In another example, the mounting flange 2410 is attached to an insertable end (e.g., a mounting post) 2430. In yet another example, the insertable end 2430 varies in length from 0.25 cm to 50 cm. In yet another example, the mounting flange 2410 is attached to the insertable end 2430 using a rotatable joint 2440. In yet another example, the mounting flange 2410 is thinner at an end 2450 distal to the rotatable joint 2440. In yet another example, the receiving notch 2420 includes an opening 2460 at the end 2450. In yet another example, the opening 2460 is flared. In yet another example, the opening 2460 is wider at the end 2450. In yet another example, the receiving notch 2420 includes a neck 2470. In yet another example, the neck 2470 forms a narrowing point in the receiving notch 2420. In yet another example, the receiving notch 2420 includes a post retaining end 2480.

In yet another example, the rotatable joint 2440 allows the mounting flange 2410 and the insertable end 2430 to be rotated relative to each other. In another example, the rotatable joint 2440 includes a hinge. In yet another example, the rotatable joint 2440 includes a ball-and-socket joint. In yet another example, the insertable end 2430 is tapered to provide a point 2490 distal to the rotatable joint 2440. In yet another example, the intertable end 2430 is shaped like a wedge. In yet another example, the insertable end 2430 is shaped like a cone. In yet another example, the insertable end 2430 is shaped like an arrow head. In yet another example, the insertable end 2430 is shaped like a spear head. In yet another example, the insertable end 2430 includes one or more barbs. In yet another example, the insertable end 2430 includes one or more ribs. In yet another example, the notched mount 2400 includes one or more materials. In yet another example, the insertable end 2430 is flexible. In yet another example, the insertable end 2430 is sufficiently stiff to support part of the weight of a PV module. In yet another example, the one or more materials are selected from a group consisting of polyvinyl chloride (PVC), chlorinated polyvinyl chloride (CPVC), high-density polyethylene (HDPE), low-density polyethylene (LDPE), polypropylene (PP), poly(ethylene terephthalate) (PET), polycarbonate (PC), polyamide (PA), poly(methyl methacrylate) (PMMA), polyoxymethylene (POM), polyphenylene oxide (PPO), polyphenylene sulfide (PPS), polysulphone (PSU), polystyrene-butadiene-styrene (SBS), ethylene propylene diene monomer (EPDM), poly(ethylene terephthalate) (Rynite), polyphenylene ether (PPE) modified by polystyrene (PS) or polyamide (PA) (Xyron), acrylonitrile butadiene styrene (ABS), polyphenylene oxide (PPO) blended with polystyrene (PS) (Noryl), engineering polymers, non-engineering plastics, polyolefins, elastomeric polymers, hot-dipped zinc-coated steel, anodized aluminum, powder-coated metal, painted metal, polymeric over molded metal, polymer over extruded metal, and the like. In yet another example, the notched mount 2400 is coated with a non-conductive coating.

As discussed above and further emphasized here, FIGS. 24A and 24B are merely an example, which should not unduly limit the scope of the claims. One of ordinary skill in the art would recognize many variations, alternatives, and modifications. In some embodiments, the rotatable joint 2440 is omitted. For example, the insertable end 2430 is fixedly attached to the mounting flange 2410.

Figure 25:
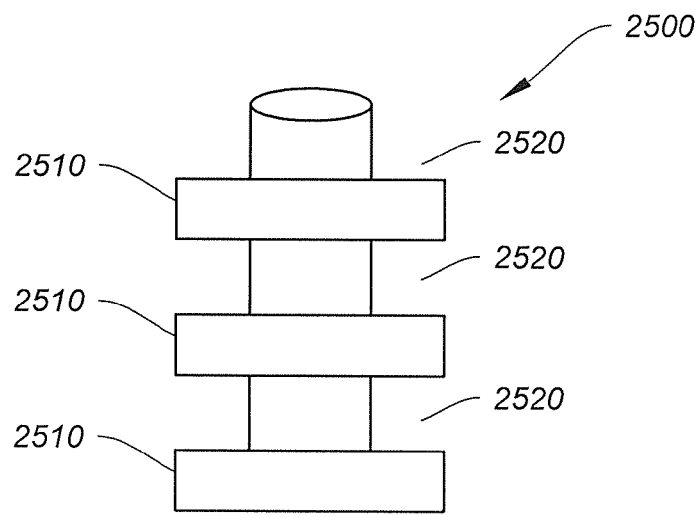
FIG. 25 is a simplified diagram showing a ribbed post as used in a PV module mounting system according to one embodiment of the present invention.

FIG. 25 is a simplified diagram showing a ribbed post as used in a PV module mounting system according to one embodiment of the present invention. This diagram is merely an example, which should not unduly limit the scope of the claims. One of ordinary skill in the art would recognize many variations, alternatives, and modifications. As shown in FIG. 25, the ribbed post 2500 includes one or more ribs 2510. For example, the one or more ribs 2510 create one or more grooves 2520 in the ribbed post 2500. In another example, the one or more grooves 2520 are areas along the ribbed post 2500 that are smaller than the areas along the ribbed post 2500 where the one or more ribs 2510 are located. In yet another example, the ribbed post 2500 includes one or more materials each selected from a group consisting of polyvinyl chloride (PVC), chlorinated polyvinyl chloride (CPVC), high-density polyethylene (HDPE), low-density polyethylene (LDPE), polypropylene (PP), poly(ethylene terephthalate) (PET), polycarbonate (PC), polyamide (PA), poly(methyl methacrylate) (PMMA), polyoxymethylene (POM), polyphenylene oxide (PPO), polyphenylene sulfide (PPS), polysulphone (PSU), polysty-rene-butadiene-styrene (SBS), ethylene propylene diene monomer (EPDM), poly(ethylene terephthalate) (Rynite), polyphenylene ether (PPE) modified by polystyrene (PS) or polyamide (PA) (Xyron), acrylonitrile butadiene styrene (ABS), polyphenylene oxide (PPO) blended with polystyrene (PS) (Noryl), engineering polymers, non-engineering plastics, polyolefins, elastomeric polymers, hot-dipped zinc-coated steel, anodized aluminum, powder-coated metal, painted metal, polymeric over molded metal, polymer over extruded metal, and the like. In yet another example, ribbed post 2500 is coated with a non-conductive coating. In yet another example, a length of the ribbed post 2500 is selected to provide as small a cross-sectional footprint. In yet another example, the ribbed post 2500 varies in length from 0.25 cm to 15 cm.

As discussed above and further emphasized here, FIG. 25 is merely an example, which should not unduly limit the scope of the claims. One of ordinary skill in the art would recognize many variations, alternatives, and modifications. In some embodiments, the number of ribs 2510 and corresponding grooves 2520 is varied. For example, a ribbed post 2500 includes only one rib 2510 and one corresponding groove 2520. In another example, a ribbed post 2500 includes two ribs 2510 and two corresponding grooves 2520. In yet another example, the ribbed post 2500 includes more than three ribs 2510 and corresponding grooves 2520.

Figure 26:
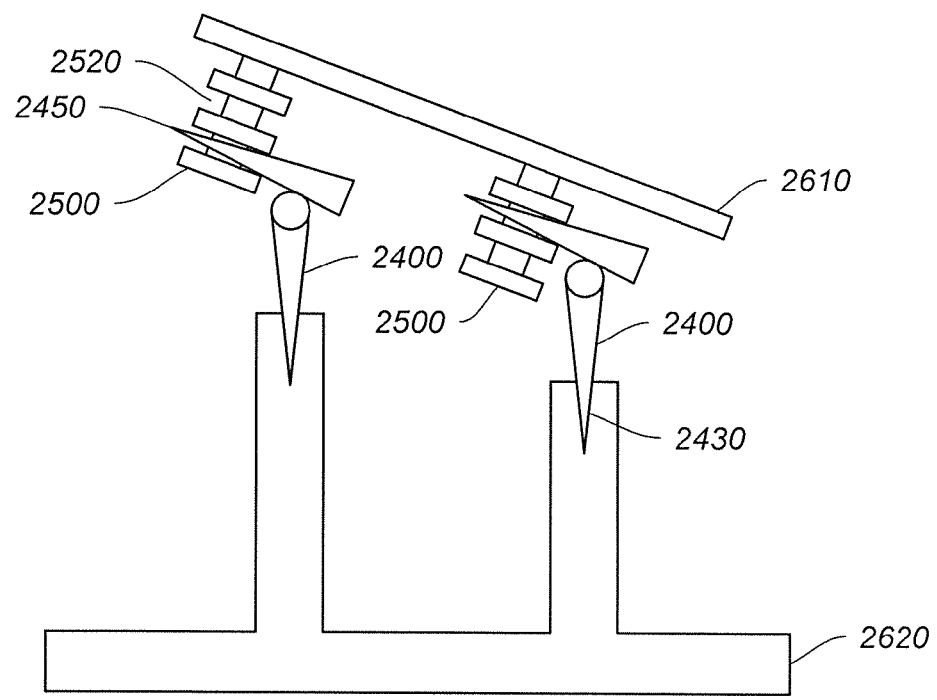
FIG. 26 is a simplified diagram showing a side view of a PV module mounting system using one or more notched mounts and one or more ribbed posts according to one embodiment of the present invention.

FIG. 26 is a simplified diagram showing a side view of a PV module mounting system using one or more notched mounts 2400 and one or more ribbed posts 2500 according to one embodiment of the present invention. This diagram is merely an example, which should not unduly limit the scope of the claims. One of ordinary skill in the art would recognize many variations, alternatives, and modifications. As shown in FIG. 26, a PV module 2610 is mounted to a modular rail 2620 using one or more notched mounts 2400 and one or more ribbed posts 2500. For example, each of the one or more ribbed posts 2500 is attached to the PV module 2610. In another example, an end of each of the one or more ribbed posts 2500 is attached to the PV module 2610 using one or more adhesive materials. In yet another example, the one or more adhesive materials are fast curing. In yet another example, the one or more adhesive materials form a flexible bond between the end of each of the one or more ribbed posts 2500 and the PV module 2610. In yet another example, the one or more adhesive materials are each selected from a group consisting of silicone, organo-silane modified ethylene-vinyl acetate (EVA), organo-silane modified thermoplastic polyolefin (TPO), epoxy, organo-silane modified epoxy, polyurethane, polyacrylic, organo-silane modified polyurethane, organo-silane modified acrylic, polydimethylsiloxane (PDMS), poly(methyl-phenylsiloxane) (PMPS), ether-type polyurethane, ester-type polyurethane, poly(methyl methacrylate) (PMMA), and the like. In yet another example, the PV module 2610 is primed with an organo-silane-containing primer and the one or more adhesive materials further include one or more general-purpose adhesive materials.

In yet another example, the modular rail 2620 is the modular rail 100 and/or the modular rail 300. In yet another example, the insertable end 2430 of each of the one or more notched mounts 2400 is inserted into the modular rail 2620. In yet another example, the insertable end 2430 of each of the one or more notched mounts 2400 is inserted into the modular rail 2620 to a depth between 5 mm and 500 mm.

In yet another example, each of the one or more ribbed posts 2500 is inserted into a corresponding receiving notch 2420 of one of the one or more notched mounts 2400. In yet another example, each of the one or more ribbed posts 2500 is inserted into a corresponding receiving notch 2420 of one of the one or more notched mounts 2400 at a position corresponding to one of the one or more grooves 2520 on each of the one or more ribbed posts 2500. In yet another example, each of the narrowed ends 2450 aids in aligning each of the one or more receiving notches 2420 with a corresponding one of the one or more grooves 2520. In yet another example, each of the flared openings 2460 aids in aligning the receiving notch 2420 with a corresponding one of the one or more grooves 2520. In yet another example, each of ribbed posts 2500 is held in place at the corresponding post retaining end 2480 by the corresponding neck 2470. In yet another example, each of ribbed posts 2500 is clicked into position at the corresponding post retaining end 2480. In yet another example, each of the grooves 2520 is approximately the same size and shape as each of the post retaining ends 2480. In yet another example, each of ribbed posts 2500 is held in place at the corresponding post retaining end 2480 by one or more adhesive materials. In yet another example, the one or more adhesive materials are each selected from a group consisting of epoxy, polyurethane, polyacrylic, silicone, ethylene-vinyl acetate (EVA), thermoplastic polyolefin (TPO), ether-type polyurethane, ester-type polyurethane, poly(methyl methacrylate) (PMMA), poly-dimethylsiloxane (PDMS), poly(methyl-phenylsiloxane) (PMPS), and the like. In yet another example, the one or more adhesive materials are fast curing.

According to some embodiments, the angle of the PV module 2610 relative to the sun is controlled through use of the one or more notched mounts 2400. For example, each of the one or more notched mounts 2400 is rotated at the respective rotatable joint 2440 to account for variations in the height of the modular rail 2620 and/or the desired angle of the PV module 2610 relative to the sun. In another example, the depth to which the insertable end 2430 of each of the one or more notched mounts 2400 is inserted into the modular rail 2620 is adjusted to account for variations in the height of the modular rail 2620 and/or the desired angle of the PV module 2610 relative to the sun. In yet another example, the respective groove 2520 on each of the one or more notched posts 2500 is selected to account for variations in the height of the modular rail 2620, the depth to which the insertable end 2430 of each of the one or more notched mounts 2400 is inserted into the modular rail 2620, and/or the desired angle of the PV module 2610 relative to the sun. In yet another example, a length and a size of the insertable end 2430 of each of the one or more notched mounts 2400 is selected to provide sufficient pull strength for the mounting system based on the wind loads to which the PV module 2610 is subjected. In yet another example, a size of each of the one or more ribbed posts 2500 is selected to provide sufficient pull strength for the mounting system based on the wind loads to which the PV module 2610 is subjected.

As discussed above and further emphasized here, FIG. 26 is merely an example, which should not unduly limit the scope of the claims. One of ordinary skill in the art would recognize many variations, alternatives, and modifications. In some embodiments, the number of notched mounts 2400 and corresponding ribbed posts 2500 is varied. For example, the PV module 2610 is mounted to the modular rail 2620 using only one notched mount 2400 and one ribbed posts 2500. In another example, four notched mounts 2400 and four corresponding ribbed posts 2500 are used. In yet another example, six or more notched mounts 2400 and six or more corresponding ribbed posts 2500 are used. In some embodiments, a different style of modular rail 2620 is used.

For example, the insertable end 2430 of each of the one or more notched mounts 2400 is inserted into the mounting surface 310 of the modular rail 300 as shown in FIG. 3.

Figure 27:
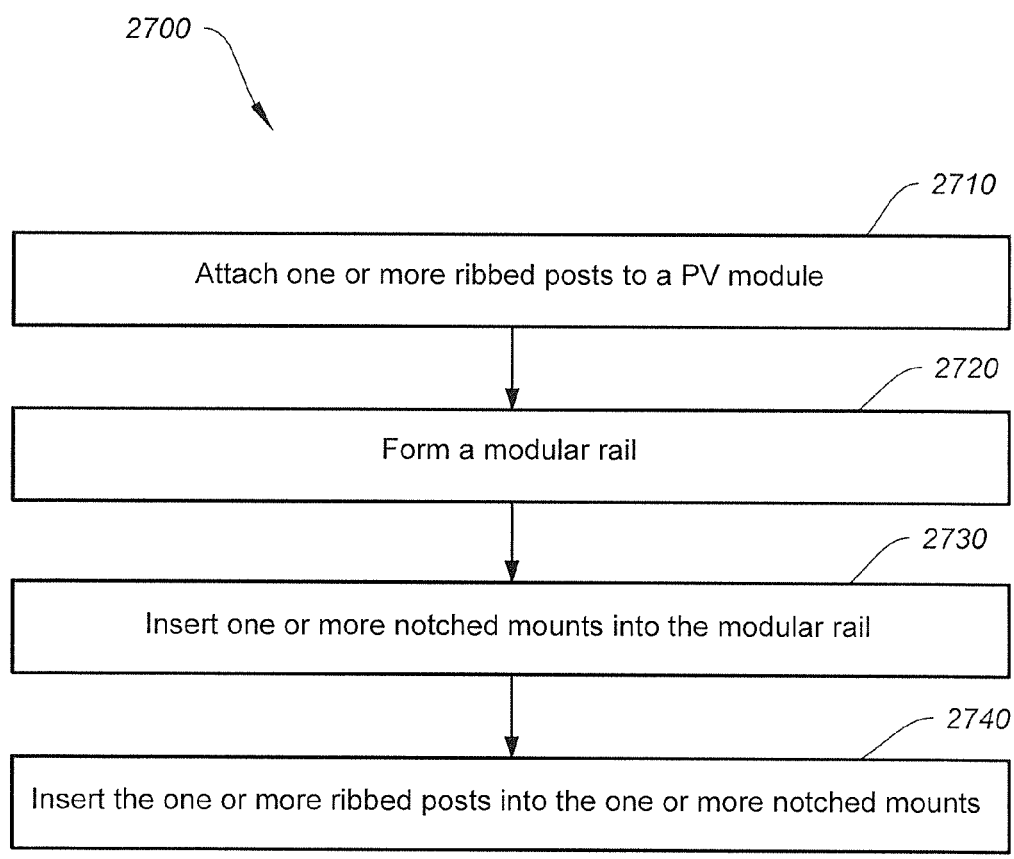
FIG. 27 is a simplified diagram showing a method of mounting a PV module to a modular rail using one or more notched mounts and one or more ribbed posts according to one embodiment of the present invention.

FIG. 27 is a simplified diagram showing a method of mounting a PV module 2610 to a modular rail 2620 using one or more notched mounts 2400 and one or more ribbed posts 2500 according to one embodiment of the present invention. This diagram is merely an example, which should not unduly limit the scope of the claims. One of ordinary skill in the art would recognize many variations, alternatives, and modifications. As shown in FIG. 27, the method 2700 includes a process 2710 for attaching one or more ribbed posts to a PV module, a process 2720 for forming a modular rail, a process 2730 for inserting one or more notched mounts into the modular rail, and a process 2740 for inserting the one or more ribbed posts into the one or more notched mounts. According to certain embodiments, the method 2700 of mounting a PV module to a modular rail using one or more notched mounts and one or more ribbed posts is performed using variations among the processes 2710-2740 as would be recognized by one of ordinary skill in the art.

At the process 2710, one or more ribbed posts 2500 are attached to a PV module 2610. For example, the PV module 2610 is the PV module 200. In another example, the one or more ribbed posts 2500 are attached to the PV module 2610 using one or more adhesive materials. In yet another example, the one or more adhesive materials form a flexible bond between each of the one or more ribbed posts 2500 and the PV module 2610. In yet another example, the one or more ribbed posts 2500 are arranged in a predetermined pattern. In yet another example, the PV module 2610 is primed before each of the one or more ribbed posts 2500 is attached. In yet another example, the surface of the PV module 2610 is roughened before the one or more ribbed posts 2500 is attached. In yet another example, the surface of the PV module 2610 is chemically modified using an atmospheric corona discharge and/or an atmospheric plasma discharge. In yet another example, the process 2710 is performed in the factory. In yet another example, the process 2710 is performed in the field.

At the process 2720, the modular rail 1820 is formed. For example, the modular rail 2620 is the modular rail 100, and/or the modular rail 300. In another example, the modular rail 2620 is formed in-situ in the field using a slip-form extrusion machine. In yet another example, the extrusion speed of the slip-form extrusion machine is varied. In yet another example, the extrusion speed should be slow enough to produce one or more mounting surfaces which are substantially planar. In yet another example, the extrusion speed should be slow enough to produce the one or more mounting surfaces with a high planarity and little sagging to allow for uniformity in the PV module mounting system. In yet another example, if a large planarity variability in the one or more mounting surfaces could be allowed, a much higher extrusion speed of slip-form extrusion machine could be achieved, causing reduction of the construction cost of the finished rail. In yet another example, the modular rail 2620 is preformed in the factory and transported to the installation site.

At the process 2730, the one or more notched mounts 2500 are inserted into the modular rail 2620. For example, the process 2730 occurs before the modular rail 2620 is substantially cured. In another example, the process 2730 is controlled so that the depth to which each insertable end 2430 of each of the one or more notched mounts 2500 is inserted into the modular rail 2620 is adjusted to account for variations in the height of the modular rail 2620 and/or the desired angle of the PV module 2610 relative to the sun. In yet another example, the process 2730 is controlled so that the insertable end 2430 of each of the one or more notched mounts 2500 is inserted a suitable distance into the modular rail 2620 so that after the modular rail 2620 substantially cures, the one or more notched mounts 2400 provide sufficient pull strength to account for the wind loads to which the PV module 2610 is subjected.

At the process 2740, the one or more ribbed posts 2500 are inserted into the one or more notched mounts 2400. For example, an angle of each mounting flange 2410 of each of the one or more notched posts 2400 is adjusted using the corresponding rotatable joint 2440 to account for variations in the height of the modular rail 2620 and/or the desired angle of the PV module 2610 relative to the sun. In another example, each of the one or more ribbed posts 2500 is inserted into a corresponding receiving notch 2420 of one of the one or more notched mounts 2400. In yet another example, each of the one or more ribbed posts 2500 is inserted into a corresponding receiving notch 2420 of one of the one or more notched mounts 2400 at a position corresponding to one of the one or more grooves 2520 on each of the one or more ribbed posts 2500. In yet another example, each of the narrowed ends 2450 aids in aligning each of the one or more receiving notches 2420 with a corresponding one of the one or more grooves 2520. In yet another example, each of the flared openings 2460 aids in aligning each of the one or more receiving notches 2420 with a corresponding one of the one or more grooves 2520. In yet another example, each of ribbed posts 2500 is held in place at the corresponding post retaining end 2480 by the corresponding neck 2470. In yet another example, each of ribbed posts 2500 is clicked into position at the corresponding post retaining end 2480. In yet another example, one or more adhesive materials are applied to each of the ribbed posts 2500 and/or each of the post retaining ends 2480 prior to inserting each of the one or more ribbed posts 2500 into a corresponding one of the one or more notched mounts 2400.

As discussed above and further emphasized here, FIGS. 24A, 24B, 25, 26, and 27 are merely examples, which should not unduly limit the scope of the claims. One of ordinary skill in the art would recognize many variations, alternatives, and modifications. In some embodiments, variations to the one or more notched mounts 2400 are possible. For example, the insertable end 2430 of each of the one or more notched mounts 2400 is replaced with a post similar to the post shown for the foldable mount 1300 as shown in FIGS. 13A and 13B, the post shown for the angled mount 2030 as shown in FIG. 20, and/or the post shown for the angled mount as shown in FIG. 22. In yet another example, the post of each of the one or more notched mounts is attached to the modular rail 2620 using a hole 1430 and/or 2060 and one or more adhesive materials 1440 and/or 2070 as shown for the foldable mount 1300 in FIG. 14 and/or as shown for the angled mount 2030 in FIG. 20. In yet another example, the post of each of the one or more notched mounts is attached to the modular rail 2620 using one or more adhesive materials 1630 and/or 2260 as shown for the foldable mount 1300 in FIG. 14 and/or as shown for the angled mount 2030 in FIG. 20. In yet another example, the process 2730 for inserting one or more notched mounts into the modular rail in method 2700 is replaced by variations in the processes 1550-1570 for the foldable mount 1300 in FIG. 15 and/or variations in the processes 2130-2150 as shown for the angled mount 2030 in FIG. 21. In yet another example, the process 2730 for inserting one or more notched mounts into the modular rail in method 2700 is replaced by variations in the processes 1750-1760 as shown for the foldable mount 1300 in FIG. 17 and/or variations in the process 2330 as shown for the angled mount 2130 in FIG. 23. In some embodiments, the one or more ribbed posts 2500 are replaced with one or more clip-on ribbed posts. For example, the one or more clip-on ribbed posts are clipped along one or more edges of the PV module 2610. In another example, one or more gasket materials are placed between the one or more clip-on ribbed posts and the PV module 2610. In yet another example, the one or more clip-on ribbed posts are further attached to the PV module 2610 using one or more adhesive materials.

Figure 28A:
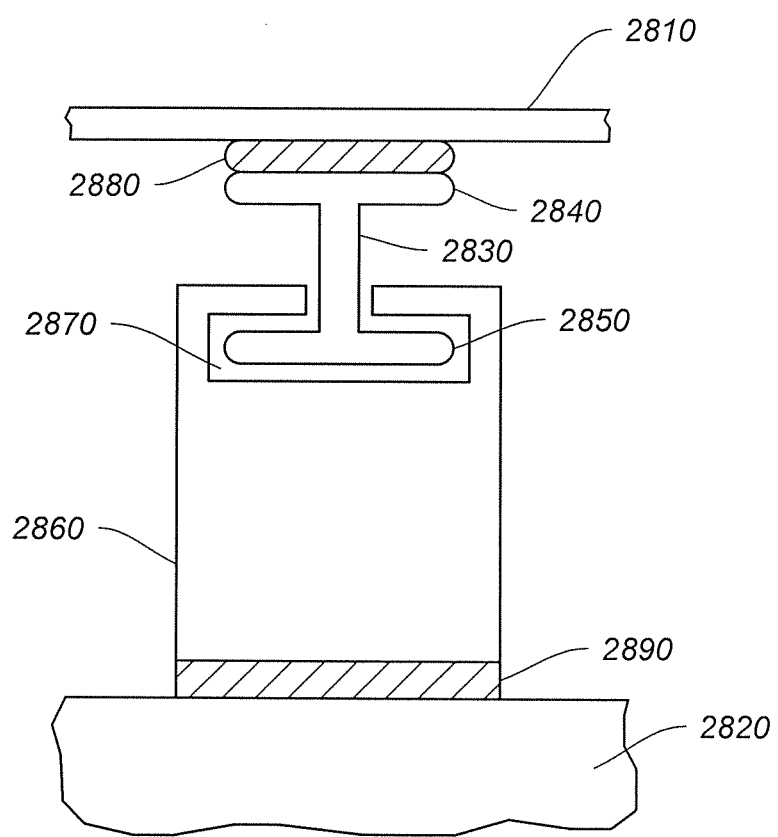
FIGS. 28A and 28B are simplified diagrams showing two views of a PV module mounting system using one or more flanged beams and one or more spacers according to some embodiments of the present invention.
Figure 28B:
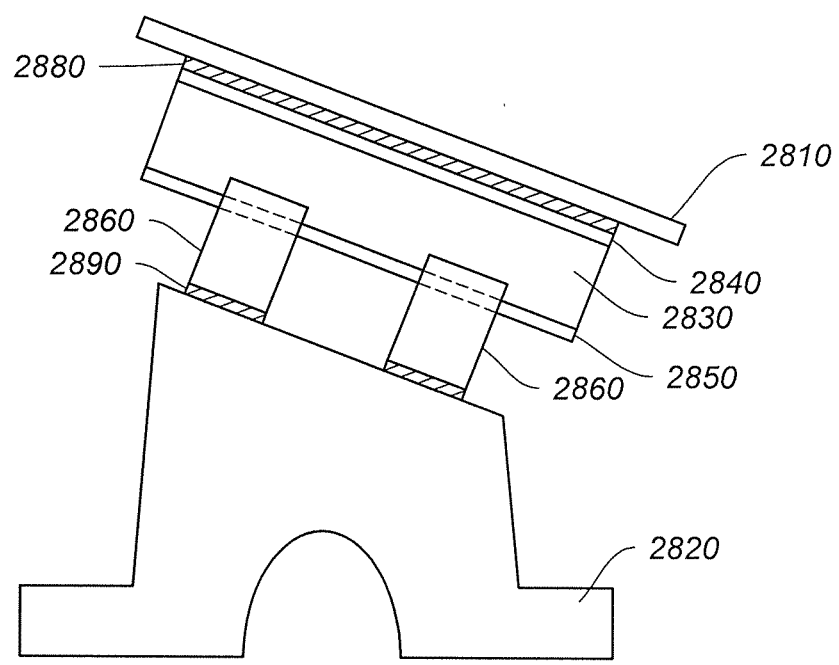

FIGS. 28A and 28B are simplified diagrams showing two views of a PV module mounting system using one or more flanged beams and one or more spacers according to some embodiments of the present invention. These diagrams are merely an example, which should not unduly limit the scope of the claims. One of ordinary skill in the art would recognize many variations, alternatives, and modifications. As shown in FIGS. 28A and 28B, a PV module 2810 is mounted to a modular rail 2820 using one or more flanged beams 2830 and one or more spacers 2860. For example, each of the one or more flanged beams 2830 is attached to the PV module 2810 using a respective flange 2840. In another example, each of the one or more flanged beams 2830 varies in length from a few centimeters to most of the span of the PV module 2810. In yet another example, the flange 2840 of each of the one or more flanged beams 2830 is attached to the PV module 2810 using one or more adhesive materials 2880. In yet another example, the one or more adhesive materials 2880 are fast curing. In yet another example, the one or more adhesive materials 2880 form a flexible bond between the flange 2840 of each of the one or more flanged beams 2830 and the PV module 2810. In yet another example, the one or more adhesive materials 2280 are each selected from a group consisting of silicone, organo-silane modified ethylene-vinyl acetate (EVA), organo-silane modified thermoplastic polyolefin (TPO), epoxy, organo-silane modified epoxy, polyurethane, polyacrylic, organo-silane modified polyurethane, organo-silane modified acrylic, polydimethylsiloxane (PDMS), poly (methyl-phenylsiloxane) (PMPS), ether-type polyurethane, ester-type polyurethane, poly(methyl methacrylate) (PMMA), and the like. In yet another example, the PV module 2810 is primed with an organo-silane-containing primer and the one or more adhesive materials 2280 further include one or more general-purpose adhesive materials.

In yet another example, each of the one or more flanged beams 2830 includes one or more materials. In yet another example, each of the one or more flanged beams 2830 is flexible. In yet another example, each of the one or more flanged beams 2830 adds stiffness to the PV module 2810. In yet another example, the one or more materials are selected from a group consisting of polyvinyl chloride (PVC), chlorinated polyvinyl chloride (CPVC), high-density polyethylene (HDPE), low-density polyethylene (LDPE), polypropylene (PP), poly(ethylene terephthalate) (PET), polycarbonate (PC), polyamide (PA), poly(methyl methacrylate) (PMMA), polyoxymethylene (POM), polyphenylene oxide (PPO), polyphenylene sulfide (PPS), polysulphone (PSU), polystyrene-butadiene-styrene (SBS), ethylene propylene diene monomer (EPDM), poly(ethylene terephthalate) (Rynite), polyphenylene ether (PPE) modified by polystyrene (PS) or polyamide (PA) (Xyron), acrylonitrile butadiene styrene (ABS), polyphenylene oxide (PPO) blended with polystyrene (PS) (Noryl), engineering polymers, non-engineering plastics, polyolefins, elastomeric polymers, hot-dipped zinc-coated steel, anodized aluminum, powder-coated metal, painted metal, polymeric over molded metal, polymer over extruded metal, and the like. In yet another example, each of the one or more flanged beams 2830 is coated with a non-conductive coating.

According to some embodiments, each of the one or more flanged beams 2830 is slid into one or more spacers 2860. For example, each of the one or more flanged beams 2830 includes a flange 2830, which is slid into a slot 2870 of each of the one or more spacers 2860. In another example, the flange 2830 is sized to provide a slip fit with the slot 2870 of each of the one or more spacers 2840. In yet another example, one or more adhesive materials is placed in the slot 2870 of each of the one or more spacers 2860 to further anchor the flange 2830. In yet another example, one or more mechanical fasteners attach the flange 2830 to the one or more spacers 2860.

In yet another example, each of the spacers 2840 includes one or more materials each selected from a group consisting of polyvinyl chloride (PVC), chlorinated polyvinyl chloride (CPVC), high-density polyethylene (HDPE), low-density polyethylene (LDPE), polypropylene (PP), poly(ethylene terephthalate) (PET), polycarbonate (PC), polyamide (PA), poly(methyl methacrylate) (PMMA), polyoxymethylene (POM), polyphenylene oxide (PPO), polyphenylene sulfide (PPS), polysulphone (PSU), polystyrene-butadiene-styrene (SBS), ethylene propylene diene monomer (EPDM), poly (ethylene terephthalate) (Rynite), polyphenylene ether (PPE) modified by polystyrene (PS) or polyamide (PA) (Xyron), acrylonitrile butadiene styrene (ABS), polyphenylene oxide (PPO) blended with polystyrene (PS) (Noryl), engineering polymers, non-engineering plastics, polyolefins, elastomeric polymers, hot-dipped zinc-coated steel, anodized aluminum, powder-coated metal, painted metal, polymeric over molded metal, polymer over extruded metal, and the like. In yet another example, each of the one or more spacers 2860 is coated with a non-conductive coating. In yet another example, each of the one or more spacers 2860 is partially hollow to reduce the amount of the one or more materials.

In yet another example, the modular rail 2820 is the modular rail 100 and/or the modular rail 300. In yet another example, each of the one or more spacers 2860 is attached to the modular rail 2820 using one or more adhesive materials 2890. In yet another example, the one or more adhesive materials 2890 are fast curing. In yet another example, the one or more adhesive materials 2890 form a rigid bond between each of the one or more spacers 2860 and the modular rail 2820. In yet another example, the one or more adhesive materials 2890 are each selected from a group consisting of silicone, ethylene-vinyl acetate (EVA), thermoplastic polyolefin (TPO), epoxy, polyurethane, polydimethylsiloxane (PDMS), poly(methyl-phenylsiloxane) (PMPS), ether-type polyurethane, ester-type polyurethane, poly(methyl methacrylate) (PMMA), and the like. In yet another example, the modular rail 2820 is first primed. In yet another example, the one or more adhesive materials 2890 are different from the one or more adhesive materials 2880.

In yet another example, a size of each of the one or more spacers 2860 is selected to provide sufficient pull strength of the mounting system based on the wind loads to which the PV module 2810 is subjected. In yet another example, the size of each of the one or more spacers 2860 is selected to provide sufficient surface area between each of the one or more spacers 2860 and the modular rail 2810 to provide sufficient attachment strength to withstand the wind loads to which the PV module 2810 is subjected. In yet another example, each of the one or more spacers 2860 varies in height from 2.5 cm to 15 cm. In yet another example, each of the one or more spacers 2860 varies in length from 1 cm to 25 cm. In yet another example, each of the one or more spacers 2860 varies in cross-sectional area from 25 mm$^2$ to 30,000 mm$^2$.

In yet another example, the one or more flanged beams 2830 reduces the flexibility of the PV module 2810. In yet another example, the one or more flanged beams 2930 stiffens the PV module 2810. In yet another example, a size of flange 2840 is selected to provide sufficient surface area between the each of the one or more flanged beams 2830 and the PV module 2810 to provide sufficient attachment strength to withstand the wind loads to which the PV module 2810 is subjected. In yet another example, the flange 2840 of each of the one or more flanged beams 2830 varies in width from 10 mm to 100 mm. In yet another example, a distance between the flange 2840 and the flange 2850 of each of the one or more flanged beams 2830 varies from 2 mm to 50 mm.

As discussed above and further emphasized here, FIGS. 28A and 28B are merely examples, which should not unduly limit the scope of the claims. One of ordinary skill in the art would recognize many variations, alternatives, and modifications. In some embodiments, the number of flanged beams 2830 is varied. For example, the PV module 2810 is mounted to the modular rail 2820 using only one flanged beam 2830. In another example, two or more flanged beams 2830 are used. According to some embodiments, the number of spacers 2860 used per flanged beam 2830 is varied. For example, only one spacer 2860 is used per flanged beam 2830. In yet another example, two or more spacers 2860 are used. In some embodiments, a different style of modular rail 2820 is used. For example, each of the one or more spacers 2860 for one of the one or more flanged beams 2830 is mounted into a different one of the one or more mounting surfaces 110 of the modular rail 100 as shown in FIG. 1. In some embodiments, the flange 2840 of each of the one or more flanged beams 2830 is attached to the PV module 2810 using bolts, screws, and/or other mechanical fasteners. In yet another example, one or more gasket materials are used between the flange 2840 of each of the one or more flanged beam 2830 and the PV module 2810. In yet another example, each of the one or more gasket materials is selected from a list consisting of ethylene propylene diene monomer (EPDM), UV-resistant rubber, and the like.

Figure 29:
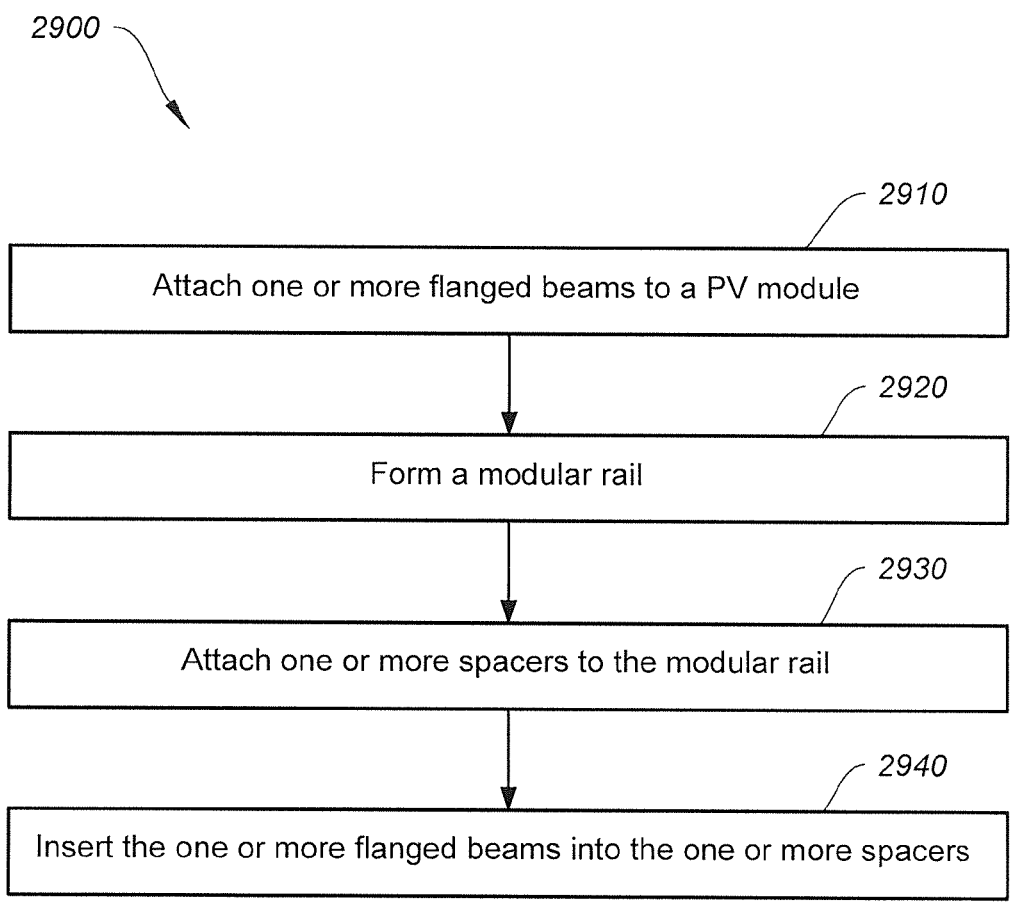
FIG. 29 is a simplified diagram showing a method of mounting a PV module to a modular rail using one or more flanged beams and one or more spacers according to one embodiment of the present invention.

FIG. 29 is a simplified diagram showing a method of mounting a PV module 2810 to a modular rail 2820 using one or more flanged beams 2830 and one or more spacers 2860 according to one embodiment of the present invention. This diagram is merely an example, which should not unduly limit the scope of the claims. One of ordinary skill in the art would recognize many variations, alternatives, and modifications. As shown in FIG. 29, the method 2900 includes a process 2910 for attaching one or more flanged beams to a PV module, a process 2920 for forming a modular rail, a process 2930 for attaching one or more spacers to the modular rail, and a process 2940 for inserting the one or more flanged beams into the one or more spacers. According to certain embodiments, the method 2900 of mounting a PV module to a modular rail using one or more notched mounts and one or more ribbed posts is performed using variations among the processes 2910-2940 as would be recognized by one of ordinary skill in the art.

At the process 2910, one or more flanged beams 2830 are attached to a PV module 2810. For example, the PV module 2810 is the PV module 200. In another example, the flange 2840 of each of the one or more flanged beams 2830 are attached to the PV module 2810 using one or more adhesive materials 2880. In yet another example, the one or more adhesive materials 2880 form a flexible bond between each of the one or more flanged beams 2830 and the PV module 2810. In yet another example, the flange 2840 of each of the one or more flanged beams 2830 is attached to the PV module 2810 using bolts, screws, and/or other mechanical fasteners. In yet another example, one or more gasket materials is placed on the PV module 2810 before the flange 2840 of each of the one or more flanged beams 2830 is attached. In yet another example, the one or more flanged beams 2830 are arranged in a predetermined pattern and spacing. In yet another example, the PV module 2810 is primed before each of the one or more flanged beams 2830 is attached. In yet another example, the surface of the PV module 2810 is roughened before the one or more flanged beams 2830 is attached. In yet another example, the surface of the PV module 2810 is chemically modified using an atmospheric corona discharge and/or an atmospheric plasma discharge. In yet another example, the process 2910 is performed in the factory. In yet another example, the process 2910 is performed in the field.

At the process 2920, the modular rail 1820 is formed. For example, the modular rail 2820 is the modular rail 100, and/or the modular rail 300. In another example, the modular rail 2820 is formed in-situ in the field using a slip-form extrusion machine. In yet another example, the extrusion speed of the slip-form extrusion machine is varied. In yet another example, the extrusion speed should be slow enough to produce one or more mounting surfaces which are substantially planar. In yet another example, the extrusion speed should be slow enough to produce the one or more mounting surfaces with a high planarity and little sagging to allow for uniformity in the PV module mounting system. In yet another example, if a large planarity variability in the one or more mounting surfaces could be allowed, a much higher extrusion speed of slip-form extrusion machine could be achieved, causing reduction of the construction cost of the finished rail. In yet another example, the modular rail 2820 is preformed in the factory and transported to the installation site.

At the process 2930, the one or more spacers 2860 are attached to the modular rail 2820. For example, each of the one or more spacers 2860 is attached to the modular rail 2220 using one or more adhesive materials 2890. In another example, the one or more adhesive materials 2290 form a rigid bond between each of the one or more spacers 2860 and the modular rail 2820. In yet another example, the mounting surface of the modular rail 2820 is roughened before the one or more spacers 2860 is attached. In yet another example, the one or more spacers 2860 are arranged to coincide with the predetermined pattern and spacing for the one or more flanged beams 2830 attached to the PV module 2010.

At the process 2940, each of the one or more flanged beams 2830 are inserted into one or more of the one or more spacers 2860. For example, the flange 2850 of each of the one or more flanged beams 2830 is slid into a corresponding slot 2870 of a corresponding one or more of the one or more spacers 2860. In another example, one or more adhesive materials are placed into the slot 2870 of each of the one or more spacers 2860 before the flange 2850 of each of the one or more flanged beams 2830 is slid into the corresponding slot 2870. In yet another example, the one or more flanged beams 2830 are further anchored to the one or more spacers 2860 by utilizing one or more mechanical fasteners.

Figure 30:
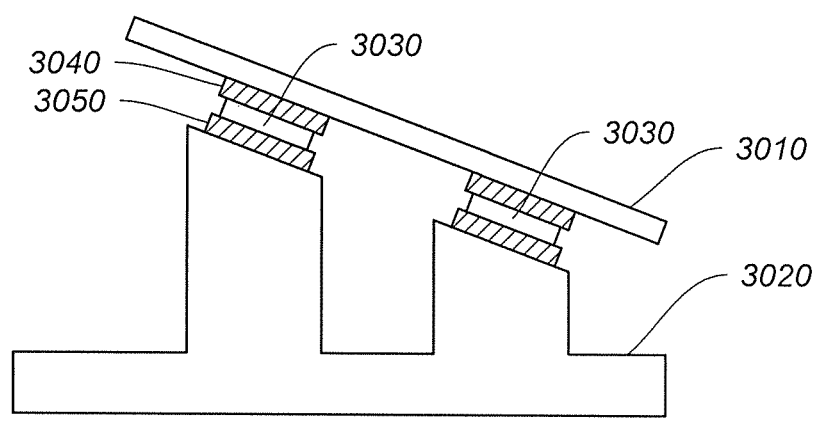
FIG. 30 is a simplified diagram showing a side view of a PV module mounting system using one or more spacers according to another embodiment of the present invention.

FIG. 30 is a simplified diagram showing a side view of a PV module mounting system using one or more spacers according to another embodiment of the present invention. This diagram is merely an example, which should not unduly limit the scope of the claims. One of ordinary skill in the art would recognize many variations, alternatives, and modifications. As shown in FIG. 30, a PV module 3010 is mounted to a modular rail 3020 using one or more spacers 3030. For example, each of the one or more spacers 3030 includes a first surface for mounting to the PV module 3010 and a second surface opposite the first surface for mounting to the modular rail 3020. In another example, each of the one or more spacers 3030 varies in thickness from 0.2 cm to 25 cm. In yet another example, each of the one or more spacers 3030 is flexible. In yet another example, each of the one or more spacers 3030 is attached to the PV module 3010 using one or more adhesive materials 3040. In yet another example, the one or more adhesive materials 3040 are fast curing. In yet another example, the one or more adhesive materials 3040 form a flexible bond between each of the one or more spacers 3030 and the PV module 3010. In yet another example, the one or more adhesive materials 3040 are each selected from a group consisting of silicone, organo-silane modified ethylene-vinyl acetate (EVA), organo-silane modified thermoplastic polyolefin (TPO), epoxy, organo-silane modified epoxy, polyurethane, polyacrylic, organo-silane modified polyurethane, organo-silane modified acrylic, polydimethylsiloxane (PDMS), poly (methyl-phenylsiloxane) (PMPS), ether-type polyurethane, ester-type polyurethane, poly(methyl methacrylate) (PMMA), and the like. In yet another example, the PV module 3010 is first primed with an organo-silane-containing primer and the one or more adhesive materials 3040 further include one or more general-purpose adhesive materials.

In yet another example, each of the one or more spacers 3030 includes one or more materials. In yet another example, each of the one or more spacers 3030 is flexible. In yet another example, each of the one or more spacers 3030 is sufficiently stiff to support part of the weight of a PV module. In yet another example, the one or more materials are selected from a group consisting of polyvinyl chloride (PVC), chlorinated polyvinyl chloride (CPVC), high-density polyethylene (HDPE), low-density polyethylene (LDPE), polypropylene (PP), poly(ethylene terephthalate) (PET), polycarbonate (PC), polyamide (PA), poly(methyl methacrylate) (PMMA), polyoxymethylene (POM), polyphenylene oxide (PPO), polyphenylene sulfide (PPS), polysulphone (PSU), polystyrene-butadiene-styrene (SBS), ethylene propylene diene monomer (EPDM), poly(ethylene terephthalate) (Rynite), polyphenylene ether (PPE) modified by polystyrene (PS) or polyamide (PA) (Xyron), acrylonitrile butadiene styrene (ABS), polyphenylene oxide (PPO) blended with polystyrene (PS) (Noryl), engineering polymers, non-engineering plastics, polyolefins, elastomeric polymers, hot-dipped zinc-coated steel, anodized aluminum, powder-coated metal, painted metal, polymeric over molded metal, polymer over extruded metal, and the like. In yet another example, each of the one or more spacers 3030 is coated with a non-conductive coating.

In yet another example, the modular rail 3020 is the modular rail 100 and/or the modular rail 300. In yet another example, each of the one or more spacers 3030 is attached to the modular rail 3020 using one or more adhesive materials 3050. In yet another example, the one or more adhesive materials 3050 are fast curing. In yet another example, the one or more adhesive materials 3050 form a rigid bond between each of the one or more spacers 3030 and the modular rail 3020. In yet another example, the one or more adhesive materials 3050 are each selected from a group consisting of silicone, ethylene-vinyl acetate (EVA), thermoplastic polyolefin (TPO), epoxy, polyurethane, polydimethylsiloxane (PDMS), poly(methyl-phenylsiloxane) (PMPS), ether-type polyurethane, ester-type polyurethane, poly(methyl methacrylate) (PMMA), and the like. In yet another example, the modular rail 3020 is first primed. In yet another example, the one or more adhesive materials 3050 are different from the one or more adhesive materials 3040.

In yet another example, a cross-sectional area of each of the one or more spacers 3030 is selected to provide sufficient pull strength of the mounting system based on the wind loads to which the PV module 3010 is subjected. In yet another example, the cross-sectional area of each of the one or more spacers 3030 is selected to provide sufficient surface area between the each of the one or more spacers 3030 and the PV module 3010 and/or the modular rail 3020 to provide sufficient attachment strength to withstand the wind loads to which the PV module 3010 is subjected. In yet another example, each of the one or more spacers 3030 varies in cross-sectional area from 25 mm$^2$ to 30,000 mm$^2$. In yet another example, a size of the one or more spacers 3030 is selected to provide sufficient pull strength for the mounting system based on the wind loads to which the PV module 3010 is subjected.

As discussed above and further emphasized here, FIG. 30 is merely an example, which should not unduly limit the scope of the claims. One of ordinary skill in the art would recognize many variations, alternatives, and modifications. In some embodiments, the number of spacers 3030 is varied. For example, the PV module 3010 is mounted to the modular rail 3020 using only one spacer 3030. In another example, four spacers 3030 are used. In yet another example, six or more spacers 3030 are used. In some embodiments, a different style of modular rail 3020 is used. For example, each of the one or more spacers 3030 is attached to the mounting surface 310 of the modular rail 300 as shown in FIG. 3.

Figure 31:
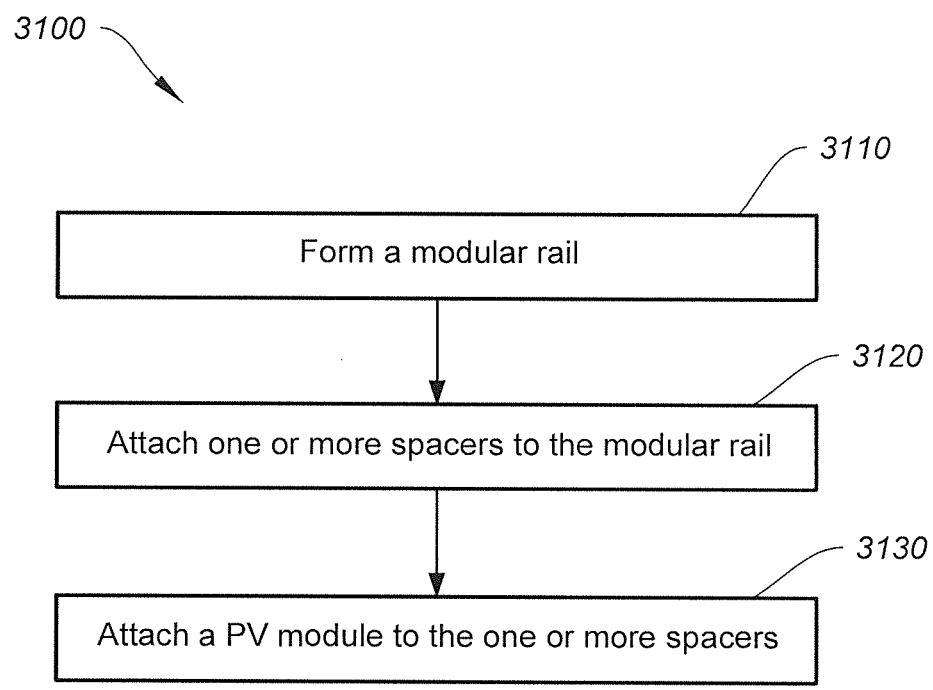
FIG. 31 is a simplified diagram showing a method of mounting a PV module to a modular rail using one or more spacers according to another embodiment of the present invention.

FIG. 31 is a simplified diagram showing a method of mounting a PV module 3010 to a modular rail 3020 using one or more spacers 3030 according to another embodiment of the present invention. This diagram is merely an example, which should not unduly limit the scope of the claims. One of ordinary skill in the art would recognize many variations, alternatives, and modifications. As shown in FIG. 31, the method 3100 includes a process 3110 for forming a modular rail, a process 3230 for attaching one or more spacers to the modular rail, and a process 3230 for attaching a PV module to the one or more spacers. According to certain embodiments, the method 3100 of method of mounting a PV module to a modular rail using one or more spacers is performed using variations among the processes 3110-3130 as would be recognized by one of ordinary skill in the art.

At the process 3110, the modular rail 3020 is formed. For example, the modular rail 3020 is the modular rail 100, and/or the modular rail 300. In another example, the modular rail 3020 is formed in-situ in the field using a slip-form extrusion machine. In yet another example, the extrusion speed of the slip-form extrusion machine is varied. In yet another example, the extrusion speed should be slow enough to produce one or more mounting surfaces which are substantially planar. In yet another example, the extrusion speed should be slow enough to produce the one or more mounting surfaces with a high planarity and little sagging to allow for uniformity in the PV module mounting system. In yet another example, if a large planarity variability in the one or more mounting surfaces could be allowed, a much higher extrusion speed of slip-form extrusion machine could be achieved, causing reduction of the construction cost of the finished rail. In yet another example, the modular rail 3020 is preformed in the factory and transported to the installation site.

At the process 3120, the one or more spacers 3030 are attached to the modular rail 3020. For example, each of the one or more spacers 3030 is attached to the modular rail 3020 using one or more adhesive materials 3050. In another example, the one or more adhesive materials 3050 form a rigid bond between each of the one or more spacers 3030 and the modular rail 3020. In yet another example, the mounting surface of the modular rail 3020 is roughened before the one or more spacers 3030 is attached. In yet another example, the one or more spacers 3030 are attached to the modular rail 3020 using a predetermined pattern and spacing.

At the process 3130, the PV module 3010 is attached to the one or more spacers 3030. For example, the PV module 3010 is the PV module 200. In another example, the one or more spacers 3030 are attached to the PV module 3010 using one or more adhesive materials 3040. In yet another example, the one or more adhesive materials 3040 form a flexible bond between each of the one or more spacers 3030 and the PV module 3010. In yet another example, the PV module 3010 is primed before each of the one or more spacers 3030 is attached. In yet another example, the surface of the PV module 3010 is roughened before the one or more spacers 3030 is attached. In yet another example, the surface of the PV module 3010 is chemically modified using an atmospheric corona discharge and/or an atmospheric plasma discharge. In yet another example, the process 3130 is performed in the factory. In yet another example, the process 3130 is performed in the field.

According to one embodiment, a system for mounting one or more photovoltaic modules includes one or more flexible rods, each of the one or more flexible rods including a first end and a second end opposite the first end, each of the one or more flexible rods further including an inner core and a first jacket surrounding the inner core between the first end and the second end. The first end is configured to be attached to at least one photovoltaic module using one or more first adhesive materials. The second end is configured to be inserted into at least one hole of a modular rail and attached to at least the modular rail using one or more second adhesive materials. The one or more flexible rods are configured to allow at least a lateral movement in a first direction between the photovoltaic module and the modular rail and support at least the photovoltaic module in a second direction. For example, the system is implemented according to at least FIG. 7 and/or FIG. 8.

In another example, the first direction is substantially parallel to a face of the photovoltaic module and the second direction is substantially vertical. In yet another example, the photovoltaic module includes a first glass panel and the first end is further configured to be attached to at least the first glass panel using the one or more first adhesive materials. In yet another example, the modular rail includes one or more concrete materials and the second end is further configured to be attached to at least the one or more concrete materials using the one or more second adhesive materials. In yet another example, the inner core includes one or more fibers. In yet another example, the one or more fibers are substantially parallel. In yet another example, the one or more fibers are braided. In yet another example, the first jacket is braided. In yet another example, each of the one or more flexible rods further includes a second jacket surrounding the first jacket between the first end and the second end. In yet another example, the second jacket is cross-braided. In yet another example, the one or more first adhesive materials are flexible. In yet another example, the one or more second adhesive materials are rigid. In yet another example, an excess of the one or more second adhesive materials are displaced from the hole.

According to another embodiment, a method for mounting one or more photovoltaic modules includes preparing one or more flexible rods, each of the one or more flexible rods including a first end and a second end opposite the first end, each of the one or more flexible rods further including an inner core and a first jacket surrounding the inner core between the first end and the second end, forming at least one hole in a modular rail, attaching the first end to at least one photovoltaic module using one or more first adhesive materials, placing one or more second adhesive materials in the at least one hole, inserting the second end into the at least one hole, allowing at least a lateral movement in a first direction between the photovoltaic module and the modular rail, and supporting at least the photovoltaic module in a second direction. For example, the method is implemented according to at least FIG. 9.

According to yet another embodiment, a system for mounting one or more photovoltaic modules includes one or more foldable mounts, each of the one or more foldable mounts including a mounting flange, a rotatable joint, and a mounting post. The rotatable joint is attached to the mounting flange and the mounting post. The mounting flange is configured to be rotated relative to the mounting post using the rotatable joint. The mounting flange is configured to be attached to at least one photovoltaic module and the mounting post is configured to be attached to at least one modular rail. The one or more foldable mounts are configured to allow at least a lateral movement in a first direction between the photovoltaic module and the modular rail and support at least the photovoltaic module in a second direction. For example, the system is implemented according to at least FIG. 10A, FIG. 10B, FIG. 11, FIG. 13A, FIG. 13B, FIG. 14, and/or FIG. 16.

In another example, the first direction is substantially parallel to a face of the photovoltaic module and the second direction is substantially vertical. In yet another example, the photovoltaic module includes a first glass panel and the mounting flange is further configured to be attached to at least the first glass panel. In yet another example, the modular rail includes one or more concrete materials and the mounting post is further configured to be attached to at least the one or more concrete materials. In yet another example, the rotatable joint includes at least one selected from a group consisting of a hinge and a ball and socket joint. In yet another example, the mounting post includes an insertable end distal to the rotatable joint, the insertable end being tapered and the insertable end is configured to be inserted into at least the modular rail. In yet another example, the insertable end includes at least one selected from a group consisting of barbs and ribs. In yet another example, the mounting post is configured to be attached to at least the modular rail using one or more adhesive materials. In yet another example, the mounting post is further configured to be inserted into at least one hole of the modular rail. In yet another example, an excess of the one or more adhesive materials are displaced from the hole. In yet another example, the mounting flange is configured to be attached to at least the photovoltaic module using one or more adhesive materials. In yet another example, the mounting flange is configured to be attached to at least the photovoltaic module using one or more mechanical fasteners.

According to yet another embodiment, a method for mounting one or more photovoltaic modules includes attaching one or more foldable mounts, each of the one or more foldable mounts including a mounting flange, a rotatable joint, and a mounting post, to at least a photovoltaic module using the mounting flange; rotating the mounting flange relative to the mounting post using the rotatable joint; attaching the mounting post to a modular rail; allowing at least a lateral movement in a first direction between the photovoltaic module and the modular rail; and supporting at least the photovoltaic module in a second direction. For example, the method is implemented according to at least FIG. 12, FIG. 15, and/or FIG. 17.

In yet another embodiment, a system for mounting one or more photovoltaic modules includes one or more angled mounts, each of the one or more angled mounts including a mounting post with a mounting face, the mounting post extending in a first direction. The mounting face is not perpendicular to the first direction. The mounting face is configured to be attached to at least one photovoltaic module using one or more first adhesive materials. The mounting post is configured to be attached to a modular rail. The one or more angled mounts are configured to allow at least a lateral movement in a second direction between the photovoltaic module and the modular rail and support at least the photovoltaic module in the first direction. For example, the system is implemented according to at least FIG. 18, FIG. 20, and/or FIG. 22.

In another example, the second direction is substantially parallel to a face of the photovoltaic module and the first direction is substantially vertical. In yet another example, the photovoltaic module includes a first glass panel and the mounting face is further configured to be attached to at least the first glass panel using the one or more first adhesive materials. In yet another example, the modular rail includes one or more concrete materials and the mounting post is further configured to be attached to at least the one or more concrete materials. In yet another example, the mounting post includes an insertable end distal to the rotatable joint, the insertable end being tapered and the insertable end is configured to be inserted into at least the modular rail. In yet another example, the insertable end includes at least one selected from a group consisting of barbs and ribs. In yet another example, the mounting post is configured to be attached to at least the modular rail using one or more second adhesive materials. In yet another example, the mounting post is further configured to be inserted into at least one hole of at least the modular rail. In yet another example, an excess of the one or more second adhesive materials are displaced from the hole.

According to yet another embodiment, a method for mounting one or more photovoltaic modules includes providing one or more angled mounts, each of the one or more angled mounts including a mounting post with a mounting face, the mounting post extending in a first direction; attaching the mounting face to at least a photovoltaic module using one or more adhesive materials; and attaching the mounting post to a modular rail, allowing at least a lateral movement in a second direction between the photovoltaic module and the modular rail, and supporting at least the photovoltaic module in the first direction. For example, the method is implemented according to at least FIG. 19, FIG. 21, and/or FIG. 23.

According to yet another embodiment, a system for mounting one or more photovoltaic modules includes one or more notched mounts and one or more ribbed posts. Each of the one or more notched mounts including a mounting flange, a rotatable joint, and a mounting post. Each of the one or more ribbed posts including one or more ribs alternating with one or more grooves. The rotatable joint is attached to the mounting flange and the mounting post. The mounting flange is configured to be rotated relative to the mounting post using the rotatable joint. The mounting flange includes a receiving notch, the receiving notch including an opening at a first end configured to receive at least one of the one or more grooves. Each of the one or more ribbed posts is configured to be attached to at least one photovoltaic module using one or more first adhesive materials. The mounting post is configured to be attached to at least one modular rail. The one or more notched mounts and the one or more ribbed posts are configured to allow at least a lateral movement in a first direction between the photovoltaic module and the modular rail and support at least the photovoltaic module in a second direction. For example, the system is implemented according to at least FIG. 24A, FIG. 24B, FIG. 25, and/or FIG. 26.

In another example, the first direction is substantially parallel to a face of the photovoltaic module and the second direction is substantially vertical. In yet another example, the photovoltaic module includes a first glass panel and the one or more ribbed posts are further configured to be attached to at least the first glass panel using the one or more first adhesive materials. In yet another example, the modular rail includes one or more concrete materials and the mounting post is further configured to be attached to at least the one or more concrete materials. In yet another example, the mounting post includes an insertable end distal to the rotatable joint, the insertable end being tapered and the insertable end is configured to be inserted into at least the modular rail. In yet another example, the insertable end includes at least one selected from a group consisting of barbs and ribs. In yet another example, the mounting post is configured to be attached to at least the modular rail using one or more second adhesive materials. In yet another example, the mounting post is further configured to be inserted into at least one hole of at least the modular rail. In yet another example, an excess of the one or more second adhesive materials are displaced from the hole. In yet another example, the receiving notch is flared. In yet another example, the receiving notch includes a neck, the neck being narrower than the opening. In yet another example, the receiving notch further includes a post retaining end and the post retaining end is configured to receive at least one of the one or more grooves.

According to yet another embodiment, a method for mounting one or more photovoltaic modules includes attaching one or more ribbed posts, each of the one or more ribbed posts including one or more ribs alternating with one or more grooves, to at least a photovoltaic module using one or more first adhesive materials; providing one or more notched mounts, each of the one or more notched mounts including a mounting flange, a rotatable joint, and a mounting post; attaching the mounting post to at least a modular rail; rotating the mounting flange relative to the mounting post using the rotatable joint; inserting at least one of the one or more grooves into the receiving notch; allowing at least a lateral movement in a first direction between the photovoltaic module and the modular rail; and supporting at least the photovoltaic module in a second direction. For example, the method is implemented according to at least FIG. 27.

According to yet another embodiment, a system for mounting one or more photovoltaic modules includes one or more flanged beams and one or more spacers. Each of the one or more flanged beams including a first flange and a second flange opposite the first flange. The one or more spacers include one or more slots respectively. The first flange is configured to be attached to at least one photovoltaic module. The second flange is configured to be inserted into the one or more slots. The one or more spacers are configured to be attached to at least one modular rail using one or more first adhesive materials. The one or more flanged beams and the one or more spacers are configured to allow at least a lateral movement in a first direction between the photovoltaic module and the modular rail and support at least the photovoltaic module in a second direction. For example, the system is implemented according to at least FIG. 28A and/or FIG. 28B.

In another example, the first direction is substantially parallel to a face of the photovoltaic module and the second direction is substantially vertical. In yet another example, the photovoltaic module includes a first glass panel and the flanged beams are further configured to be attached to at least the first glass panel. In yet another example, the modular rail includes one or more concrete materials and the one or more spacers are further configured to be attached to at least the one or more concrete materials using the one or more first adhesive materials. In yet another example, the one or more flanged beams are configured to stiffen the photovoltaic module. In yet another example, the second flange is configured to be attached to the one or more slots using one selected from a group consisting of one or more second adhesive materials and one or more mechanical fasteners. In yet another example, the first flange is configured to be attached to at least the photovoltaic module using one or more second adhesive materials.

According to yet another embodiment, a method for mounting one or more photovoltaic modules includes providing one or more flanged beams, each of the one or more flanged beams including a first flange and a second flange opposite the first flange; attaching the first flange to at least a photovoltaic module; attaching one or more spacers, each including one or more slots respectively, to a modular rail using one or more adhesive materials; inserting the second flange into the one or more slots; allowing at least a lateral movement in a first direction between the photovoltaic module and the modular rail; and supporting at least the photovoltaic module in a second direction. For example, the method is implemented according to at least FIG. 29.

According to yet another embodiment, a system for mounting one or more photovoltaic modules includes one or more flexible spacers. Each of the one or more flexible spacers including a first surface and a second surface opposite the first surface. The first surface is configured to be attached to at least one glass panel of a photovoltaic module using one or more first adhesive materials. The second surface is configured to be attached to at least one or more concrete materials of one modular rail using one or more second adhesive materials. The one or more flexible spacers are configured to allow at least a lateral movement in a first direction between the photovoltaic module and the modular rail and support at least the photovoltaic module in a second direction. Each of the one or more flexible spacers includes one selected from a group consisting of polyvinyl chloride (PVC), chlorinated polyvinyl chloride (CPVC), polysulphone (PSU), polystyrene-butadiene-styrene (SBS), ethylene propylene diene monomer (EPDM), polyolefins, and elastomeric polymers. For example, the system is implemented at least according to FIG. 30.

According to yet another embodiment, a method for mounting one or more photovoltaic modules includes forming a modular rail including one or more concrete materials; providing one or more flexible spacers, each of the one or more flexible spacers including a first surface and a second surface opposite the first surface, each of the one or more flexible spacers including one selected from a group consisting of polyvinyl chloride (PVC), chlorinated polyvinyl chloride (CPVC), polysulphone (PSU), polystyrene-butadiene-styrene (SBS), ethylene propylene diene monomer (EPDM), polyolefins, and elastomeric polymers; attaching the first surface to at least a glass panel using one or more first adhesive materials; attaching the second surface to at least the one or more concrete materials of the modular rail using one or more second adhesive materials; allowing at least a lateral movement in a first direction between the photovoltaic module and the modular rail; and supporting at least the photovoltaic module in a second direction. For example, the method is implemented at least according to FIG. 31.

Although specific embodiments of the present invention have been described, it will be understood by those of skill in the art that there are other embodiments that are equivalent to the described embodiments. For example, various embodiments and/or examples of the present invention can be combined. Accordingly, it is to be understood that the invention is not to be limited by the specific illustrated embodiments, but only by the scope of the appended claims.

What is claimed is:

1. A system for mounting a photovoltaic module, the system comprising:
    an elongated modular rail including a concrete material, the elongated modular rail including a first hole, a second hole, a third hole, a fourth hole, a fifth hole, and a sixth hole in the concrete material;
    a first foldable mount including a first mounting flange and a first mounting post, the first mounting post being rotatable between a first position and a second position and being attached to the first mounting flange, the first mounting flange being attached to the photovoltaic module;
    a second foldable mount including a second mounting flange and a second mounting post, the second mounting post being rotatable between a third position and a fourth position and being attached to the second mounting flange, the second mounting flange being attached to the photovoltaic module;
    a third foldable mount including a third mounting flange and a third mounting post, the third mounting post being rotatable between a fifth position and a sixth position and being attached to the third mounting flange, the third mounting flange being attached to the photovoltaic module;
    a fourth foldable mount including a fourth mounting flange and a fourth mounting post, the fourth mounting post being rotatable between a seventh position and an eighth position and being attached to the fourth mounting flange, the fourth mounting flange being attached to the photovoltaic module;
    a fifth foldable mount including a fifth mounting flange and a fifth mounting post, the fifth mounting post being rotatable between a ninth position and a tenth position and being attached to the fifth mounting flange, the fifth mounting flange being attached to the photovoltaic module;
    a sixth foldable mount including a sixth mounting flange and a sixth mounting post, the sixth mounting post being rotatable between an eleventh position and a twelfth position and being attached to the sixth mounting flange, the sixth mounting flange being attached to the photovoltaic module;
    one or more adhesive materials coupling the first mounting post through the first hole to the elongated modular rail in the first position, coupling the second mounting post through the second hole to the elongated modular rail in the third position, coupling the third mounting post through the third hole to the elongated modular rail in the fifth position, coupling the fourth mounting post through the fourth hole to the elongated modular rail in the seventh position, coupling the fifth mounting post through the fifth hole to the elongated modular rail in the ninth position, and coupling the sixth mounting post through the sixth hole to the elongated modular rail in the eleventh position; and
    one or more mechanical fasteners attaching all of the first mounting flange, the second mounting flange, the third mounting flange, the fourth mounting flange, the fifth mounting flange and the sixth mounting flange to the photovoltaic module;
    wherein:
        the first mounting post is substantially parallel to the first mounting flange in the second position, the second mounting post is substantially parallel to the second mounting flange in the fourth position, the third mounting post is substantially parallel to the third mounting flange in the sixth position, the fourth mounting post is substantially parallel to the fourth mounting flange in the eighth position, the fifth mounting post is substantially parallel to the fifth mounting flange in the tenth position, and the sixth mounting post is substantially parallel to the sixth mounting flange in the twelfth position, so as to increase a packing density of the first foldable mount, the second foldable mount, the third foldable mount, the fourth foldable mount, the fifth foldable mount, and the sixth foldable mount;
    wherein:
        a first excess of the one or more adhesive materials are displaced from the first hole responsive to insertion of the first mounting post into the first hole;
        a second excess of the one or more adhesive materials are displaced from the second hole responsive to insertion of the second mounting post into the second hole;
        a third excess of the one or more adhesive materials are displaced from the third hole responsive to insertion of the third mounting post into the third hole;
        a fourth excess of the one or more adhesive materials are displaced from the fourth hole responsive to insertion of the fourth mounting post into the fourth hole;
        a fifth excess of the one or more adhesive materials are displaced from the fifth hole responsive to insertion of the fifth mounting post into the fifth hole; and
        a sixth excess of the one or more adhesive materials are displaced from the sixth hole responsive to insertion of the sixth mounting post into the sixth hole;
    wherein:
        the photovoltaic module includes a glass panel; and the glass panel is attached to all of the first mounting flange, the second mounting flange, the third mounting flange, the fourth mounting flange, the fifth mounting flange, and the sixth mounting flange;

wherein the concrete material of the elongated modular rail is attached to all of the first mounting post, the second mounting post, the third mounting post, the fourth mounting post, the fifth mounting post, and the sixth mounting post.

2. The system of claim 1, wherein:

the first foldable mount further including a first rotatable joint, the first mounting post being attached to the first mounting flange through the first rotatable joint;

the second foldable mount further including a second rotatable joint, the second mounting post being attached to the second mounting flange through the second rotatable joint;

the third foldable mount further including a third rotatable joint, the third mounting post being attached to the third mounting flange through the third rotatable joint;

the fourth foldable mount further including a fourth rotatable joint, the fourth mounting post being attached to the fourth mounting flange through the fourth rotatable joint;

the fifth foldable mount further including a fifth rotatable joint, the fifth mounting post being attached to the fifth mounting flange through the fifth rotatable joint; and the sixth foldable mount further including a sixth rotatable joint, the sixth mounting post being attached to the sixth mounting flange through the sixth rotatable joint.

3. The system of claim 2 wherein each of the first rotatable joint, the second rotatable joint, the third rotatable joint, the fourth rotatable joint, the fifth rotatable joint, and the sixth rotatable joint includes at least one selected from a group consisting of a hinge and a ball and socket joint.

* * * * *